(12) United States Patent
Molin et al.

(10) Patent No.: US 8,391,661 B2
(45) Date of Patent: Mar. 5, 2013

(54) MULTIMODE OPTICAL FIBER

(75) Inventors: Denis Molin, Draveil (FR); Marianne Bigot-Astruc, Marcoussis (FR); Pierre Sillard, Le Chesnay (FR); Koen de Jongh, Son en Breugel (NL)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 13/362,395

(22) Filed: Jan. 31, 2012

(65) Prior Publication Data

US 2012/0195561 A1 Aug. 2, 2012

Related U.S. Application Data

(60) Provisional application No. 61/438,376, filed on Feb. 1, 2011.

(30) Foreign Application Priority Data

Jan. 31, 2011 (EP) .................................... 11305087

(51) Int. Cl.
*G02B 6/028* (2006.01)
(52) U.S. Cl. ...................................................... 385/124
(58) Field of Classification Search ........... 385/123–128
See application file for complete search history.

(56) References Cited

U.S. PATENT DOCUMENTS

| | | | |
|---|---|---|---|
| 4,111,525 A | 9/1978 | Kaminow et al. | |
| 4,184,744 A | 1/1980 | Onoda et al. | |
| 4,222,631 A | 9/1980 | Olshansky | |
| 4,229,070 A | 10/1980 | Olshansky et al. | |
| 4,230,396 A | 10/1980 | Olshansky et al. | |
| 4,339,174 A | 7/1982 | Levin | |
| 4,406,517 A | 9/1983 | Olshansky | |
| 4,465,335 A | 8/1984 | Eppes | |
| 4,636,235 A | 1/1987 | Glessner et al. | |
| 4,636,236 A | 1/1987 | Glessner et al. | |
| 4,653,042 A | 3/1987 | d'Auria et al. | |
| 4,715,695 A | 12/1987 | Nishimura et al. | |
| 4,723,828 A | 2/1988 | Garel-Jones et al. | |
| 4,838,643 A | 6/1989 | Hodges et al. | |
| 5,142,603 A | 8/1992 | Forrester | |
| 5,194,714 A | 3/1993 | Le Sergent | |
| 5,278,687 A | 1/1994 | Jannson et al. | |

(Continued)

FOREIGN PATENT DOCUMENTS

| EP | 0131729 A1 | 1/1985 |
|---|---|---|
| EP | 1515169 A1 | 3/2005 |

(Continued)

OTHER PUBLICATIONS

Freund, R.E., et al. "High-Speed Transmission in Multimode Optical fibers," JLT, vol. 28, No. 4, Feb. 2010, pp. 569-586.

(Continued)

*Primary Examiner* — Kevin S Wood
(74) *Attorney, Agent, or Firm* — Summa, Additon & Ashe, P.A.

(57) ABSTRACT

A multimode optical fiber includes a central core having a graded-index profile with a delta value of about 1.9 percent or greater. The graded-index core profile has at least two different alpha parameter values along the core radius, namely a first value in an inner zone of the central core and a second value in an outer zone of the central core. The second alpha parameter value is typically less than the first alpha parameter value. The graded-index core profile and its first derivative are typically substantially continuous over the width of the graded-index core.

25 Claims, 35 Drawing Sheets

DMD@850 nm of 80 μm MMF for α=2.04

U.S. PATENT DOCUMENTS

| | | | |
|---|---|---|---|
| 5,381,503 | A | 1/1995 | Kanamori et al. |
| 5,522,007 | A | 5/1996 | Drouart et al. |
| 5,574,816 | A | 11/1996 | Yang et al. |
| 5,702,497 | A | 12/1997 | Oh et al. |
| 5,717,805 | A | 2/1998 | Stulpin |
| 5,761,362 | A | 6/1998 | Yang et al. |
| 5,841,933 | A | 11/1998 | Hoaglin et al. |
| 5,911,023 | A | 6/1999 | Risch et al. |
| 5,982,968 | A | 11/1999 | Stulpin |
| 6,002,818 | A | 12/1999 | Fatehi et al. |
| 6,035,087 | A | 3/2000 | Bonicel et al. |
| 6,066,397 | A | 5/2000 | Risch et al. |
| 6,085,009 | A | 7/2000 | Risch et al. |
| 6,134,363 | A | 10/2000 | Hinson et al. |
| 6,175,677 | B1 | 1/2001 | Yang et al. |
| 6,181,857 | B1 | 1/2001 | Emeterio et al. |
| 6,185,346 | B1 | 2/2001 | Asawa et al. |
| 6,202,447 | B1 | 3/2001 | Drouart et al. |
| 6,210,802 | B1 | 4/2001 | Risch et al. |
| 6,215,931 | B1 | 4/2001 | Risch et al. |
| 6,269,663 | B1 | 8/2001 | Drouart et al. |
| 6,292,603 | B1 | 9/2001 | Mizuochi et al. |
| 6,292,612 | B1 | 9/2001 | Golowich et al. |
| 6,314,224 | B1 | 11/2001 | Stevens et al. |
| 6,321,012 | B1 | 11/2001 | Shen |
| 6,321,014 | B1 | 11/2001 | Overton et al. |
| 6,334,016 | B1 | 12/2001 | Greer, IV |
| 6,381,390 | B1 | 4/2002 | Hutton et al. |
| 6,470,126 | B1 | 10/2002 | Mukasa |
| 6,490,398 | B2 | 12/2002 | Gruner-Nielsen et al. |
| 6,493,491 | B1 | 12/2002 | Shen et al. |
| 6,580,863 | B2 | 6/2003 | Yegnanarayanan et al. |
| 6,603,908 | B2 | 8/2003 | Dallas et al. |
| 6,606,437 | B1 | 8/2003 | Mukasa et al. |
| 6,618,538 | B2 | 9/2003 | Nechitailo et al. |
| 6,658,184 | B2 | 12/2003 | Bourget et al. |
| 6,724,965 | B2 | 4/2004 | Abbott et al. |
| 6,724,966 | B2 | 4/2004 | Mukasa |
| 6,735,985 | B2 | 5/2004 | DiGiovanni et al. |
| 6,749,446 | B2 | 6/2004 | Nechitailo |
| 6,750,294 | B2 | 6/2004 | Sugiyama et al. |
| 6,771,865 | B2 | 8/2004 | Blaszyk et al. |
| 6,904,218 | B2 | 6/2005 | Sun et al. |
| 6,912,347 | B2 | 6/2005 | Rossi et al. |
| 6,922,515 | B2 | 7/2005 | Nechitailo et al. |
| 6,941,049 | B2 | 9/2005 | Risch et al. |
| 7,006,751 | B2 | 2/2006 | Provost et al. |
| 7,043,126 | B2 | 5/2006 | Guan et al. |
| 7,043,128 | B2 | 5/2006 | DiGiovanni et al. |
| 7,045,010 | B2 | 5/2006 | Sturman, Jr. |
| 7,089,765 | B2 | 8/2006 | Schaper et al. |
| 7,162,128 | B2 | 1/2007 | Lovie et al. |
| 7,315,677 | B1 | 1/2008 | Li et al. |
| 7,322,122 | B2 | 1/2008 | Overton et al. |
| 7,346,244 | B2 | 3/2008 | Gowan et al. |
| 7,356,234 | B2 | 4/2008 | de Montmorillon et al. |
| 7,400,835 | B2 | 7/2008 | Sardesai et al. |
| 7,406,235 | B2 | 7/2008 | Guan et al. |
| 7,421,172 | B2 | 9/2008 | Matthijsse et al. |
| 7,421,174 | B2 | 9/2008 | Fleming, Jr. et al. |
| 7,483,613 | B2 | 1/2009 | Bigot-Astruc et al. |
| 7,515,795 | B2 | 4/2009 | Overton et al. |
| 7,526,177 | B2 | 4/2009 | Matthijsse et al. |
| 7,539,381 | B2 | 5/2009 | Chen et al. |
| 7,555,186 | B2 | 6/2009 | Flammer et al. |
| 7,567,739 | B2 | 7/2009 | Overton et al. |
| 7,570,852 | B2 | 8/2009 | Nothofer et al. |
| 7,574,095 | B2 | 8/2009 | Lock et al. |
| 7,587,111 | B2 | 9/2009 | de Montmorillon et al. |
| 7,599,589 | B2 | 10/2009 | Overton et al. |
| 7,623,747 | B2 | 11/2009 | de Montmorillon et al. |
| 7,639,915 | B2 | 12/2009 | Parris et al. |
| 7,646,952 | B2 | 1/2010 | Parris |
| 7,646,954 | B2 | 1/2010 | Tatat |
| 7,646,955 | B2 | 1/2010 | Donlagic |
| 7,665,902 | B2 | 2/2010 | Griffioen et al. |
| 7,702,204 | B2 | 4/2010 | Gonnet et al. |
| 7,724,998 | B2 | 5/2010 | Parris et al. |
| 7,783,149 | B2 | 8/2010 | Fini |
| 7,787,731 | B2 | 8/2010 | Bookbinder et al. |
| 7,817,257 | B2 | 10/2010 | Takenaga et al. |
| 7,817,891 | B2 | 10/2010 | Lavenne et al. |
| 7,826,691 | B2 | 11/2010 | Matthijsse et al. |
| 7,865,050 | B1 | 1/2011 | Sun et al. |
| 7,878,712 | B2 | 2/2011 | Shimotakahara et al. |
| 7,889,960 | B2 | 2/2011 | de Montmorillon et al. |
| 7,903,918 | B1 | 3/2011 | Bickham et al. |
| 7,970,247 | B2 | 6/2011 | Barker |
| 7,974,507 | B2 | 7/2011 | Lovie et al. |
| 8,009,950 | B2 * | 8/2011 | Molin et al. .................. 385/124 |
| 8,031,997 | B2 | 10/2011 | Overton |
| 8,041,167 | B2 | 10/2011 | Overton |
| 8,041,168 | B2 | 10/2011 | Overton |
| 8,041,172 | B2 | 10/2011 | Sillard et al. |
| 8,055,111 | B2 | 11/2011 | Sillard et al. |
| 8,081,853 | B2 | 12/2011 | Overton |
| 8,184,936 | B2 | 5/2012 | Zhang et al. |
| 2002/0102082 | A1 | 8/2002 | Sarchi et al. |
| 2002/0176678 | A1 | 11/2002 | Mukasa |
| 2002/0197038 | A1 | 12/2002 | Abbott et al. |
| 2003/0024276 | A1 | 2/2003 | Anderson et al. |
| 2004/0247269 | A1 | 12/2004 | Hirano et al. |
| 2005/0008312 | A1 | 1/2005 | Jang et al. |
| 2005/0053351 | A1 | 3/2005 | Guan et al. |
| 2007/0172182 | A1 | 7/2007 | Lee et al. |
| 2008/0292262 | A1 | 11/2008 | Overton et al. |
| 2009/0059353 | A1 | 3/2009 | Fini |
| 2009/0092365 | A1 | 4/2009 | Donlagic |
| 2009/0154888 | A1 | 6/2009 | Abbott, III et al. |
| 2009/0169163 | A1 | 7/2009 | Abbott, III et al. |
| 2009/0175583 | A1 | 7/2009 | Overton |
| 2009/0214167 | A1 | 8/2009 | Lookadoo et al. |
| 2009/0279833 | A1 | 11/2009 | Overton et al. |
| 2009/0279835 | A1 | 11/2009 | de Montmorillon et al. |
| 2009/0297107 | A1 | 12/2009 | Tatat |
| 2010/0021170 | A1 | 1/2010 | Lumineau et al. |
| 2010/0028020 | A1 | 2/2010 | Gholami et al. |
| 2010/0040336 | A1 | 2/2010 | Chen et al. |
| 2010/0067858 | A1 | 3/2010 | Kim et al. |
| 2010/0092135 | A1 | 4/2010 | Barker et al. |
| 2010/0092138 | A1 | 4/2010 | Overton |
| 2010/0118388 | A1 | 5/2010 | Pastouret et al. |
| 2010/0119202 | A1 | 5/2010 | Overton |
| 2010/0135624 | A1 | 6/2010 | Overton et al. |
| 2010/0135627 | A1 | 6/2010 | Pastouret et al. |
| 2010/0142033 | A1 | 6/2010 | Regnier et al. |
| 2010/0142969 | A1 | 6/2010 | Gholami et al. |
| 2010/0150505 | A1 | 6/2010 | Testu et al. |
| 2010/0154478 | A1 | 6/2010 | Pimpinella et al. |
| 2010/0154479 | A1 | 6/2010 | Milicevic et al. |
| 2010/0166375 | A1 | 7/2010 | Parris |
| 2010/0171945 | A1 | 7/2010 | Gholami et al. |
| 2010/0183821 | A1 | 7/2010 | Hartsuiker et al. |
| 2010/0189397 | A1 | 7/2010 | Richard et al. |
| 2010/0189399 | A1 | 7/2010 | Sillard et al. |
| 2010/0189400 | A1 | 7/2010 | Sillard et al. |
| 2010/0202741 | A1 | 8/2010 | Ryan et al. |
| 2010/0214649 | A1 | 8/2010 | Burov et al. |
| 2010/0215328 | A1 | 8/2010 | Tatat et al. |
| 2010/0220966 | A1 | 9/2010 | Bennett |
| 2010/0254653 | A1 | 10/2010 | Molin et al. |
| 2010/0310218 | A1 | 12/2010 | Molin et al. |
| 2011/0002590 | A1 | 1/2011 | Ooizumi et al. |
| 2011/0026889 | A1 | 2/2011 | Risch et al. |
| 2011/0037183 | A1 | 2/2011 | Tudury et al. |
| 2011/0044594 | A1 | 2/2011 | Tudury et al. |
| 2011/0044596 | A1 | 2/2011 | Zhang et al. |
| 2011/0054861 | A1 | 3/2011 | Lane |
| 2011/0054862 | A1 | 3/2011 | Pimpinella et al. |
| 2011/0058781 | A1 | 3/2011 | Molin et al. |
| 2011/0064367 | A1 | 3/2011 | Molin et al. |
| 2011/0064371 | A1 | 3/2011 | Leatherman et al. |
| 2011/0069724 | A1 | 3/2011 | Richard et al. |
| 2011/0069932 | A1 | 3/2011 | Overton et al. |
| 2011/0085770 | A1 | 4/2011 | Bigot-Astruc et al. |
| 2011/0091171 | A1 | 4/2011 | Tatat et al. |
| 2011/0116160 | A1 | 5/2011 | Boivin et al. |

| | | | |
|---|---|---|---|
| 2011/0123161 A1 | 5/2011 | Molin et al. | |
| 2011/0123162 A1 | 5/2011 | Molin et al. | |
| 2011/0135262 A1 | 6/2011 | Molin et al. | |
| 2011/0135263 A1 | 6/2011 | Molin et al. | |
| 2011/0176782 A1 | 7/2011 | Parris | |
| 2011/0188823 A1 | 8/2011 | Sillard et al. | |
| 2011/0188826 A1 | 8/2011 | Sillard et al. | |
| 2011/0217012 A1 | 9/2011 | Bigot-Astruc et al. | |
| 2011/0229101 A1 | 9/2011 | de Montmorillon et al. | |
| 2011/0268398 A1 | 11/2011 | Quinn et al. | |
| 2011/0268400 A1 | 11/2011 | Lovie et al. | |
| 2011/0287195 A1 | 11/2011 | Molin | |
| 2011/0305423 A1* | 12/2011 | Molin et al. | 385/124 |
| 2012/0009358 A1 | 1/2012 | Gharbi et al. | |
| 2012/0014652 A1 | 1/2012 | Parris | |
| 2012/0040105 A1 | 2/2012 | Overton | |
| 2012/0040184 A1 | 2/2012 | de Montmorillon et al. | |
| 2012/0051703 A1 | 3/2012 | Bigot-Astruc et al. | |
| 2012/0057833 A1 | 3/2012 | Tatat | |
| 2012/0092651 A1 | 4/2012 | Molin et al. | |
| 2012/0134376 A1 | 5/2012 | Burov et al. | |
| 2012/0148206 A1 | 6/2012 | Boivin et al. | |
| 2012/0195561 A1 | 8/2012 | Molin et al. | |
| 2012/0243843 A1* | 9/2012 | Molin et al. | 385/124 |
| 2012/0251062 A1* | 10/2012 | Molin et al. | 385/124 |

FOREIGN PATENT DOCUMENTS

| | | |
|---|---|---|
| EP | 1921478 A1 | 5/2008 |
| EP | 2144096 A1 | 1/2010 |
| EP | 2482106 A1 | 8/2012 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2001-235648 A | 8/2001 |
| JP | 2002-318315 A | 10/2002 |
| JP | 2006-047719 A | 2/2006 |
| JP | 2006-078543 A | 3/2006 |
| JP | 2006-227173 A | 8/2006 |
| JP | 2007-272239 A | 10/2007 |
| WO | 00/50936 A1 | 8/2000 |
| WO | 03/081301 A1 | 10/2003 |
| WO | 2005/106544 A1 | 11/2005 |
| WO | 2008/008581 A1 | 7/2008 |
| WO | 2009/062131 A1 | 5/2009 |
| WO | 2009/078962 A1 | 6/2009 |
| WO | 2010/036684 A2 | 4/2010 |
| WO | 2011/040830 A1 | 4/2011 |

OTHER PUBLICATIONS

Gloge et al., "Multimode Theory of Graded-Core Fibers", Bell system Technical Journal 1973, pp. 1563-1578.

Yarbe, G., "Comprehensive Theory of Dispersion in Graded-Index Optical Fibers", Journal of Lightwave Technology, Feb. 2000, vol. 18, No. 2, pp. 166-177.

European Search Report and Written Opinion in counterpart European Application No. 11305087.6 dated Jul. 4, 2011, pp. 1-8.

Sasaki, P.L. Francois, D.N. Payne, "Accuracy and resolution of preform index-profiling by the spatial-filtering method," ECOC'81, 6.4-1, Copenhagen, Denmark.

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glasgow, Scotland, pp. 1-2.

Guan et al., "Multimode Fibers for Compensating Intermodal Dispersion of Graded-Index Multimode Fibers", Jul. 2004, Journal of Lightwave Technology, vol. 22, No. 7, pp. 1714-1719.

Pepeljugoski et al., "15.6-Gb/s Transmission Over 1 km of Next Generation Multimode Fiber", IEEE Photonics Technology Letters, vol. 14, No. 5, May 2002, pp. 1-3.

Kaminow et al., "Profile synthesis in multicomponent glass optical fibers", Applied Optics, vol. 16, No. 1, Jan. 1, 1977, pp. 108-112.

Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.

* cited by examiner

MMF 50 μm single alpha

MMF 50 μm twin alpha

MMF 62,5 µm single alpha

MMF 62,5 µm twin alpha

MMF 80 μm single alpha

MMF 80 μm twin alpha

| offset launch [μm] | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| Source 1 | 0 | 0.03 | 0.26 | 0.88 | 2.00 | 3.23 | 3.96 | 3.69 | 2.64 | 1.39 | 0.51 | 0.11 | 0.00 | 0.00 | 0.00 | 0.00 | 0.01 | 0.02 | 0.03 | 0.03 | 0.03 | 0.01 | 0.00 | 0.00 | 0.00 |
| | 3023 2463 | 4923 9102 | 1216 1956 | 4686 4369 | 7552 1827 | 0549 4097 | 0048 1111 | 5094 3918 | 632 6799 | 9465 2152 | 9992 8832 | 2612 0282 |
| Source 2 | 0 | 0.02 | 0.18 | 0.63 | 1.44 | 2.37 | 3.05 | 3.15 | 2.73 | 2.06 | 1.38 | 0.83 | 0.41 | 0.16 | 0.04 | 0.04 | 0.11 | 0.21 | 0.30 | 0.32 | 0.26 | 0.16 | 0.07 | 0.02 | 0.00 |
| | 3504 8044 | 4634 7235 | 6616 2908 | 0634 2324 | 0241 8339 | 4722 9715 | 0282 7143 | 4691 6152 | 9802 7088 | 9314 8541 | 697 3514 | 1793 2679 |
| Source 3 | 0 | 0 | 0 | 0 | 0 | 0 | 0.00 | 0.07 | 0.26 | 0.63 | 1.19 | 1.91 | 2.75 | 3.51 | 3.88 | 3.56 | 2.61 | 1.48 | 0.59 | 0.15 | 0.01 | 0 | 0 | 0 | 0 |
| | | | | | | | 7414 2928 | 2906 7117 | 7628 6841 | 5231 4797 | 3317 1955 | 7093 0325 | 3724 3006 2051 |
| Source 4 | 0 | 0 | 0 | 0 | 0.00 | 0.05 | 0.20 | 0.48 | 0.89 | 1.40 | 1.95 | 2.43 | 2.63 | 2.39 | 1.81 | 1.29 | 1.24 | 1.70 | 2.24 | 2.39 | 1.95 | 1.21 | 0.53 | 0.15 | 0.01 |
| | | | | | 5637 5488 | 005 3667 | 695 2833 | 7805 3247 | 9299 7238 | 6953 6977 | 0553 002 | 0664 4077 | 2429 3833 | 4474 8314 | 9738 |
| Source 5 | 0 | 0 | 0 | 0 | 0.00 | 0.02 | 0.10 | 0.25 | 0.45 | 0.66 | 0.82 | 1.00 | 1.29 | 1.81 | 2.50 | 3.16 | 3.57 | 3.61 | 3.32 | 2.74 | 1.95 | 1.13 | 0.49 | 0.14 | 0.01 |
| | | | | | 3034 9856 | 7634 8329 | 8494 1247 | 6035 0204 | 4439 3982 | 695 4213 | 2113 8037 | 9662 5395 | 3241 7762 | 4404 6517 | 8328 |
| Source 6 | 0 | 0.01 | 0.12 | 0.40 | 0.92 | 1.48 | 1.82 | 1.70 | 1.21 | 0.64 | 0.23 | 0.09 | 0.20 | 0.52 | 1.02 | 1.61 | 2.21 | 2.70 | 2.93 | 2.73 | 2.09 | 1.26 | 0.55 | 0.16 | 0.02 |
| | 5199 091 | 7702 5664 | 8762 5448 | 2306 8378 | 3911 8557 | 8956 4274 | 9982 4948 | 1695 0689 | 7415 88 | 9320 8741 | 564 214 | 3627 0443 |
| Source 7 | 0 | 0.01 | 0.12 | 0.43 | 0.98 | 1.58 | 1.94 | 1.81 | 1.29 | 0.68 | 0.25 | 0.13 | 0.32 | 0.84 | 1.56 | 2.22 | 2.55 | 2.46 | 2.08 | 1.57 | 1.05 | 0.59 | 0.25 | 0.07 | 0.00 |
| | 6253 9011 | 4844 7184 | 76 6614 | 5285 9241 | 6635 585 | 1429 7091 | 8323 7513 | 4027 506 | 4566 7879 | 7111 6343 | 5102 6718 | 6096 9446 |
| Source 8 | 0 | 0.02 | 0.17 | 0.59 | 1.35 | 2.17 | 2.66 | 2.48 | 1.78 | 0.94 | 0.36 | 0.16 | 0.31 | 0.77 | 1.38 | 1.85 | 1.91 | 1.51 | 0.90 | 0.38 | 0.11 | 0.01 | 0.00 | 0.00 | 0 |
| | 2057 639 | 5248 1845 | 4399 6278 | 6564 0897 | 5412 0494 | 3923 8712 | 8983 3174 | 3992 4123 | 1827 833 | 6991 176 | 4829 1818 | 054 |
| Source 9 | 0 | 0.01 | 0.08 | 0.28 | 0.65 | 1.13 | 1.62 | 2.04 | 2.29 | 2.28 | 1.93 | 1.38 | 0.87 | 0.67 | 0.81 | 1.07 | 1.25 | 1.25 | 1.11 | 0.87 | 0.60 | 0.34 | 0.15 | 0.04 | 0.00 |
| | 043 3496 | 1802 028 | 0599 7046 | 4326 172 | 0813 7545 | 3006 8798 | 9756 236 | 4702 7323 | 5967 2456 | 9309 8183 | 8921 112 | 4757 5639 |
| Source 10 | 0 | 0.01 | 0.12 | 0.42 | 0.95 | 1.53 | 1.88 | 1.76 | 1.29 | 0.79 | 0.55 | 0.67 | 1.04 | 1.58 | 2.13 | 2.47 | 2.36 | 1.79 | 1.05 | 0.44 | 0.12 | 0.01 | 0 | 0 | 0 |
| | 5681 4978 | 1548 7203 | 9535 7747 | 2955 2184 | 0844 938 | 3655 7689 | 9037 8626 | 0827 1764 | 8213 9264 | 4481 3304 | 2552 |
| Source 11 | 0 | 0 | 0.03 | 0.26 | 0.88 | 2.00 | 3.23 | 3.96 | 3.69 | 2.64 | 1.39 | 0.51 | 0.11 | 0.00 | 0.00 | 0.00 | 0.00 | 0.01 | 0.02 | 0.03 | 0.03 | 0.03 | 0.01 | 0.00 | 0.00 |
| | | 3023 2463 | 4923 9102 | 1216 1956 | 4686 4369 | 7552 1827 | 0549 4097 | 0048 1111 | 5094 3918 | 632 6799 | 9465 2152 | 9992 8832 | 2612 |
| Source 12 | 0 | 0 | 0.02 | 0.18 | 0.63 | 1.44 | 2.37 | 3.05 | 3.15 | 2.73 | 2.06 | 1.38 | 0.83 | 0.41 | 0.16 | 0.04 | 0.04 | 0.11 | 0.21 | 0.30 | 0.32 | 0.26 | 0.16 | 0.07 | 0.02 |
| | | 3504 8044 | 4634 7235 | 6616 2908 | 0634 2324 | 0241 8339 | 4722 9715 | 0282 7143 | 4691 6152 | 9802 7088 | 9314 8541 | 697 3514 | 1793 |

Fig. 11
Part 1 of 19

| | | | | | | | | | | | | | | | | | | |
|---|---|---|---|---|---|---|---|---|---|---|---|---|---|---|---|---|---|---|
| Source 13 | 0 | 0 | 0 | 0 | 0 | 0 | 0.00 | 0.07 | 0.26 | 0.63 | 1.19 | 1.91 | 2.75 | 3.51 | 3.88 | 3.56 | 2.61 | 1.48 | 0.59 0.15 0.01 0 0 0 |
| Source 14 | 0 | 0 | 0 | 0 | 0 | 0 | 7414 2928 2906 7117 7628 6841 5231 4797 3317 1955 7093 0325 3724 3006 2051 | | | | | | | | | | | | |
| Source 15 | 0 | 0 | 0 | 0 | 0 | 0 | 0.00 0.05 0.20 0.48 0.89 1.40 1.95 2.43 2.63 2.39 1.81 1.29 1.24 1.70 2.24 2.39 1.95 1.21 0.53 0.15 | | | | | | | | | | | | |
| Source 16 | 0 | 0 | 0 | 0 | 0 | 0 | 5637 5488 005 3667 695 2833 7805 3247 9299 7238 6953 6977 0553 002 0664 4077 2429 3833 4474 8314 | | | | | | | | | | | | |
| Source 17 | 0 | 0 | 0 | 0 | 0 | 0 | 0.00 0.02 0.10 0.25 0.45 0.66 0.82 1.00 1.29 1.81 2.50 3.16 3.57 3.61 3.32 2.74 1.95 1.13 0.49 0.14 | | | | | | | | | | | | |
| Source 18 | 0 | 0 | 0 | 0 | 0 | 0 | 3034 9856 7634 8329 8494 1247 6035 0204 4439 3982 695 4213 2113 8037 9662 5395 3241 7762 4404 6517 | | | | | | | | | | | | |
| Source 19 | 0 | 0.01 | 0.12 | 0.40 | 0.92 | 1.48 | 1.82 | 1.70 | 1.21 | 0.64 | 0.23 | 0.09 | 0.20 | 0.52 | 1.02 | 1.61 | 2.21 | 2.70 | 2.93 2.73 2.09 1.26 0.55 0.16 |
| Source 20 | 5199 091 7702 5664 8762 5448 2306 8378 3911 8557 8956 4274 9982 4948 1695 0689 7415 88 932 0874 1564 214 3627 | | | | | | | | | | | | | | | | | | |
| Source 21 | 0 | 0.01 | 0.12 | 0.43 | 0.98 | 1.58 | 1.94 | 1.81 | 1.29 | 0.68 | 0.25 | 0.13 | 0.32 | 0.84 | 1.56 | 2.22 | 2.55 | 2.46 | 2.08 1.57 1.05 0.59 0.25 0.07 |
| Source 22 | 6253 9011 4844 7184 76 6614 5285 9241 6635 585 1429 7091 8323 7513 4027 506 4566 7879 7111 6343 5102 6718 6096 | | | | | | | | | | | | | | | | | | |
| Source 23 | 0 | 0.02 | 0.17 | 0.59 | 1.35 | 2.17 | 2.66 | 2.48 | 1.78 | 0.94 | 0.36 | 0.16 | 0.31 | 0.77 | 1.38 | 1.85 | 1.91 | 1.51 | 0.90 0.38 0.11 0.01 0.00 0.00 |
| Source 24 | 2057 639 5248 1845 4399 6278 6564 0897 5412 0494 3923 8712 8983 3174 3992 4123 1827 833 6991 176 4829 1818 054 | | | | | | | | | | | | | | | | | | |
| Source 25 | 0 | 0.01 | 0.08 | 0.28 | 0.65 | 1.13 | 1.62 | 2.04 | 2.29 | 2.28 | 1.93 | 1.38 | 0.87 | 0.67 | 0.81 | 1.07 | 1.25 | 1.11 | 0.87 0.60 0.34 0.15 0.04 |
| Source 26 | 043 3496 1802 028 0599 7046 4326 172 0813 7545 3006 8798 9756 236 4702 7323 5967 2456 9309 8183 8921 112 4757 | | | | | | | | | | | | | | | | | | |
| Source 27 | 0 | 0.01 | 0.12 | 0.42 | 0.95 | 1.53 | 1.88 | 1.76 | 1.29 | 0.79 | 0.55 | 1.04 | 1.58 | 2.13 | 2.47 | 2.36 | 1.79 | 1.05 | 0.44 0.12 0.01 0 |
| Source 28 | 5681 4978 1548 7203 9535 7747 2955 2184 0844 938 3655 7689 9037 8626 0827 1764 8213 9264 4481 3304 2552 | | | | | | | | | | | | | | | | | | |

Fig. 11
Part 2 of 19

Fig. 11
Part 3 of 19

```
Source 29   0  0  0  0.01 0.08 0.28 0.65 1.13 1.62 2.04 2.29 2.28 1.93 1.38 0.87 0.67 0.81 1.07 1.25 1.25 1.11 0.87 0.60 0.34 0.15
            043 3496 1802 028 0599 7046 4326 172 0813 7545 3006 8798 9756 236 4702 7323 5967 2456 9309 8183 8921 112

Source 30   0  0  0  0.01 0.12 0.42 0.95 1.53 1.88 1.76 1.29 0.79 0.55 0.67 1.04 1.58 2.13 2.36 2.36 1.79 1.05 0.44 0.12 0.01  0
            5681 4978 1548 7203 9535 7747 2955 2184 0844 938 3655 7689 9037 8626 0827 1764 8213 9264 4481 3304 2552

Source 31   0  0  0  0.03 0.26 0.88 2.00 3.23 3.96 3.69 2.64 1.39 0.51 0.11 0.00 0.00 0.00 0.00 0.01 0.02 0.03 0.03 0.03 0.01
            3023 2463 4923 9102 1216 1956 4686 4369 7552 1827 0549 4097 0048 1111 5094 3918 632 6799 9465 2152 9992

Source 32   0  0  0.02 0.18 0.63 1.44 2.37 3.05 3.15 2.73 2.06 1.38 0.83 0.41 0.16 0.04 0.04 0.11 0.21 0.30 0.32 0.26 0.16
            3504 8044 4634 7235 6616 2908 0634 2324 0241 8339 4722 9715 0282 7143 4691 6152 9802 7088 9314 8541 697

Source 33   0  0  0  0  0.00 0.07 0.26 0.63 1.19 1.91 2.75 3.51 3.88 3.56 2.61 1.48 0.59 0.15 0.01  0    0
            7414 2928 2906 7117 7628 6841 5231 4797 3317 1955 7093 0325 3724 3006 2051

Source 34   0  0  0  0  0.00 0.05 0.20 0.48 0.89 1.40 1.95 2.43 2.39 1.81 1.29 1.24 1.70 2.24 2.39 1.95 1.21
            5637 5488 005 3667 695 2833 7805 3247 9299 7238 6953 6977 0553 002 0664 4077 2429 3833

Source 35   0  0  0  0  0.00 0.02 0.10 0.25 0.45 0.66 0.82 1.00 1.29 1.81 2.50 3.16 3.57 3.61 3.32 2.74 1.95 1.13
            3034 9856 7634 8329 8494 1247 6035 0204 4439 3982 695 4213 2113 8037 9662 5395 3241 7762

Source 36   0  0  0  0.01 0.12 0.40 0.92 1.48 1.82 1.70 1.21 0.64 0.23 0.09 0.20 0.52 1.02 1.61 2.21 2.70 2.93 2.73 2.09 1.26
            5199 091 7702 5664 8762 5448 2306 8378 3911 8557 8956 4274 9982 4948 1695 0689 7415 88 9320 874 1564

Source 37   0  0  0.01 0.12 0.43 0.98 1.58 1.94 1.81 1.29 0.68 0.25 0.13 0.32 0.84 1.56 2.22 2.55 2.46 2.08 1.57 1.05 0.59
            6253 9011 4844 7184 76 6614 5285 9241 6635 585 1429 7091 8323 7513 4027 506 4566 7879 7111 6343 5102

Source 38   0  0  0.02 0.17 0.59 1.35 2.17 2.66 2.48 1.78 0.94 0.36 0.16 0.31 0.77 1.38 1.85 1.91 1.51 0.90 0.38 0.11 0.01
            2057 639 5248 1845 4399 6278 6564 0897 5412 0494 3923 8712 8983 3174 3992 4123 1827 833 6991 176 4829

Source 39   0  0  0.01 0.08 0.28 0.65 1.13 1.62 2.04 2.29 2.28 1.93 1.38 0.87 0.67 0.81 1.07 1.25 1.25 1.11 0.87 0.60 0.34
            043 3496 1802 028 0599 7046 4326 172 0813 7545 3006 8798 9756 236 4702 7323 5967 2456 9309 8183 8921

Source 40   0  0  0.01 0.12 0.42 0.95 1.53 1.88 1.76 1.29 0.79 0.55 0.67 1.04 1.58 2.13 2.36 2.47 2.36 1.79 1.05 0.44 0.12 0.01
            5681 4978 1548 7203 9535 7747 2955 2184 0844 938 3655 7689 9037 8626 0827 1764 8213 9264 4481 3304 2552

Source 41   0  0  0.03 0.26 0.88 2.00 3.23 3.96 3.69 2.64 1.39 0.51 0.11 0.00 0.00 0.00 0.00 0.01 0.02 0.03 0.03 0.03
            3023 2463 4923 9102 1216 1956 4686 4369 7552 1827 0549 4097 0048 1111 5094 3918 632 6799 9465 2152

Source 42   0  0  0.02 0.18 0.63 1.44 2.37 3.05 3.15 2.73 2.06 1.38 0.83 0.41 0.16 0.04 0.04 0.11 0.21 0.30 0.32 0.26
            3504 8044 4634 7235 6616 2908 0634 2324 0241 8339 4722 9715 0282 7143 4691 6152 9802 7088 9314 8541

Source 43   0  0  0  0.00 0.07 0.26 0.63 1.19 1.91 2.75 3.51 3.88 3.56 2.61 1.48 0.59 0.15 0.01  0
            7414 2928 2906 7117 7628 6841 5231 4797 3317 1955 7093 0325 3724 3006 2051

Source 44   0  0  0  0.00 0.05 0.20 0.48 0.89 1.40 1.95 2.43 2.63 2.39 1.81 1.29 1.24 1.70 2.24 2.39 1.95
            5637 5488 005 3667 695 2833 7805 3247 9299 7238 6953 6977 0553 002 0664 4077 2429
```

| | | | | | | | | | | | | | |
|---|---|---|---|---|---|---|---|---|---|---|---|---|---|
| Source 45 | 0 | 0 | 0 | 0 | 0 | 0 | 0.00 | 0.02 | 0.10 | 0.25 | 0.45 | 0.66 | 0.82 | 1.00 | 1.29 | 1.81 | 2.50 | 3.16 | 3.57 | 3.61 | 3.32 | 2.74 | 1.95 |
| Source 46 | 0 | 0 | 0 | 0 | 0 | 0 | 3034 9856 7634 8329 8494 1247 6035 0204 4439 3982 695 4213 2113 8037 9662 5395 3241 |
| Source 47 | 0 | 0 | 0 | 0 | 0 | 0.01 | 0.12 | 0.40 | 0.92 | 1.48 | 1.82 | 1.70 | 1.21 | 0.64 | 0.23 | 0.09 | 0.20 | 0.52 | 1.02 | 1.61 | 2.21 | 2.70 | 2.93 | 2.73 | 2.09 |
| | 5199 091 7702 5664 8762 5448 2306 8378 3911 8557 8956 4274 9982 4948 1695 0689 7415 88 932 0874 |
| Source 48 | 0 | 0 | 0 | 0 | 0.01 | 0.12 | 0.43 | 0.98 | 1.58 | 1.94 | 1.81 | 1.29 | 0.68 | 0.25 | 0.13 | 0.32 | 0.84 | 1.56 | 2.22 | 2.55 | 2.46 | 2.08 | 1.57 | 1.05 |
| | 6253 9011 4844 7184 76 6614 5285 9241 6635 585 1429 7091 8323 7513 4027 506 4566 7879 7111 6343 |
| Source 49 | 0 | 0 | 0 | 0 | 0.02 | 0.17 | 0.59 | 1.35 | 2.17 | 2.66 | 2.48 | 1.78 | 0.94 | 0.36 | 0.16 | 0.31 | 0.77 | 1.38 | 1.85 | 1.91 | 1.51 | 0.90 | 0.38 | 0.11 |
| | 2057 639 5248 1845 4399 6278 6564 0897 5412 0494 3923 8712 8983 3174 3992 4123 1827 833 6991 176 |
| Source 50 | 0 | 0 | 0 | 0 | 0.01 | 0.08 | 0.28 | 0.65 | 1.13 | 1.62 | 2.04 | 2.29 | 2.28 | 1.93 | 1.38 | 0.87 | 0.67 | 0.81 | 1.07 | 1.25 | 1.25 | 1.11 | 0.87 | 0.60 |
| | 043 3496 1802 028 0599 7046 4326 172 0813 7545 3006 8798 9756 236 4702 7323 5967 2456 9309 8183 |
| Source 51 | 0 | 0 | 0 | 0 | 0.01 | 0.12 | 0.42 | 0.95 | 1.53 | 1.88 | 1.76 | 1.29 | 0.79 | 0.55 | 0.67 | 1.04 | 1.58 | 2.13 | 2.47 | 2.36 | 1.79 | 1.05 | 0.44 | 0.12 |
| | 5681 4978 1548 7203 9535 7747 2955 2184 0844 938 3655 7689 9037 8626 0827 1764 8213 9264 4481 3304 |
| Source 52 | 0 | 0 | 0 | 0 | 0 | 0.03 | 0.26 | 0.88 | 2.00 | 3.23 | 3.96 | 3.69 | 2.64 | 1.39 | 0.51 | 0.11 | 0.00 | 0.00 | 0.00 | 0.01 | 0.02 | 0.03 | 0.03 |
| | 3023 2463 4923 9102 1216 1956 4686 4369 7552 1827 0549 4097 0048 1111 5094 3918 632 6799 9465 |
| Source 53 | 0 | 0 | 0 | 0 | 0 | 0.02 | 0.18 | 0.63 | 1.44 | 2.37 | 3.05 | 3.15 | 2.73 | 2.06 | 1.38 | 0.83 | 0.41 | 0.16 | 0.04 | 0.04 | 0.11 | 0.21 | 0.30 | 0.32 |
| | 3504 8044 4634 7235 6616 2908 0634 2324 0241 8339 4722 9715 0282 7143 4691 6152 9802 7088 9314 |
| Source 54 | 0 | 0 | 0 | 0 | 0 | 0 | 0.00 | 0.07 | 0.26 | 0.63 | 1.19 | 1.91 | 2.75 | 3.51 | 3.88 | 3.56 | 2.61 | 1.48 | 0.59 | 0.15 | 0.01 | 0 |
| | 7414 2928 2906 7117 7628 6841 5231 4797 3317 1955 7093 0325 3724 3006 2051 |
| Source 55 | 0 | 0 | 0 | 0 | 0 | 0 | 0.00 | 0.05 | 0.20 | 0.48 | 0.89 | 1.40 | 1.95 | 2.43 | 2.63 | 2.39 | 1.81 | 1.29 | 1.24 | 1.70 | 2.24 | 2.39 |
| | 5637 5488 005 3667 695 2833 7805 3247 9299 7238 6953 6977 0553 002 0664 4077 |
| Source 56 | 0 | 0 | 0 | 0 | 0 | 0 | 0.00 | 0.02 | 0.10 | 0.25 | 0.45 | 0.66 | 0.82 | 1.00 | 1.29 | 1.81 | 2.50 | 3.16 | 3.57 | 3.61 | 3.32 | 2.74 |
| | 3034 9856 7634 8329 8494 1247 6035 0204 4439 3982 695 4213 2113 8037 9662 5395 |
| Source 57 | 0 | 0 | 0 | 0 | 0 | 0.01 | 0.12 | 0.40 | 0.92 | 1.48 | 1.82 | 1.70 | 1.21 | 0.64 | 0.23 | 0.09 | 0.20 | 0.52 | 1.02 | 1.61 | 2.21 | 2.70 | 2.93 | 2.73 |
| | 5199 091 7702 5664 8762 5448 2306 8378 3911 8557 8956 4274 9982 4948 1695 0689 7415 88 932 |
| Source 58 | 0 | 0 | 0 | 0 | 0.01 | 0.12 | 0.43 | 0.98 | 1.58 | 1.94 | 1.81 | 1.29 | 0.68 | 0.25 | 0.13 | 0.32 | 0.84 | 1.56 | 2.22 | 2.55 | 2.46 | 2.08 | 1.57 |
| | 6253 9011 4844 7184 76 6614 5285 9241 6635 585 1429 7091 8323 7513 4027 506 4566 7879 7111 |
| Source 59 | 0 | 0 | 0 | 0 | 0.02 | 0.17 | 0.59 | 1.35 | 2.17 | 2.66 | 2.48 | 1.78 | 0.94 | 0.36 | 0.16 | 0.31 | 0.77 | 1.38 | 1.85 | 1.91 | 1.51 | 0.90 | 0.38 |
| | 2057 639 5248 1845 4399 6278 6564 0897 5412 0494 3923 8712 8983 3174 3992 4123 1827 833 6991 |
| Source 60 | 0 | 0 | 0 | 0 | 0.01 | 0.08 | 0.28 | 0.65 | 1.13 | 1.62 | 2.04 | 2.29 | 2.28 | 1.93 | 1.38 | 0.87 | 0.67 | 0.81 | 1.07 | 1.25 | 1.25 | 1.11 | 0.87 |
| | 043 3496 1802 028 0599 7046 4326 172 0813 7545 3006 8798 9756 236 4702 7323 5967 2456 9309 |

Fig. 11
Part 4 of 19

Fig. 11
Part 5 of 19

Fig. 11
Part 6 of 19

| | | | | | | | | | | | | | | | | | | | | | | |
|---|---|---|---|---|---|---|---|---|---|---|---|---|---|---|---|---|---|---|---|---|---|---|
| Source 77 | 0 | 0 | 0 | 0 | 0 | 0 | 0 | 0.01 | 0.12 | 0.43 | 0.98 | 1.58 | 1.94 | 1.81 | 1.29 | 0.68 | 0.25 | 0.13 | 0.32 | 0.84 | 1.56 | 2.22 | 2.55 | 2.46 |
| | | | | | | | | 6253 9011 4844 7184 | | | | 76 6614 5285 9241 6635 | | | | | 585 1429 7091 8323 7513 4027 506 4566 | | | | | | | |
| Source 78 | 0 | 0 | 0 | 0 | 0 | 0 | 0 | 0.02 | 0.17 | 0.59 | 1.35 | 2.17 | 2.66 | 2.48 | 1.78 | 0.94 | 0.36 | 0.16 | 0.31 | 0.77 | 1.38 | 1.85 | 1.91 | 1.51 |
| | | | | | | | | 2057 | | 639 5248 1845 4399 6278 6564 0897 5412 0494 3923 8712 8983 3174 3992 4123 1827 | | | | | | | | | | | | | |
| Source 79 | 0 | 0 | 0 | 0 | 0 | 0 | 0 | 0.01 | 0.08 | 0.28 | 0.65 | 1.13 | 1.62 | 2.04 | 2.29 | 2.28 | 1.93 | 1.38 | 0.87 | 0.67 | 0.81 | 1.07 | 1.25 | 1.25 |
| | | | | | | | | 043 3496 1802 | | | 028 0599 7046 4326 172 0813 7545 3006 8798 9756 236 4702 7323 5967 | | | | | | | | | | | | |
| Source 80 | 0 | 0 | 0 | 0 | 0 | 0 | 0 | 0.01 | 0.12 | 0.42 | 0.95 | 1.53 | 1.88 | 1.76 | 1.29 | 0.79 | 0.55 | 0.67 | 1.04 | 1.58 | 2.13 | 2.47 | 2.36 | 1.79 |
| | | | | | | | | 5681 4978 1548 7203 9535 7747 2955 2184 0844 | | | | | | | 938 3655 7689 9037 8626 0827 1764 8213 | | | | | | | | |
| Source 81 | 0 | 0 | 0 | 0 | 0 | 0 | 0 | 0 | 0.03 | 0.26 | 0.88 | 2.00 | 3.23 | 3.96 | 3.69 | 2.64 | 1.39 | 0.51 | 0.11 | 0.00 | 0.00 | 0.00 | 0.00 | 0.01 |
| | | | | | | | | | 3023 2463 4923 9102 1216 1956 4686 4369 7552 1827 0549 4097 0048 1111 5094 3918 | | | | | | | | | | | | | |
| Source 82 | 0 | 0 | 0 | 0 | 0 | 0 | 0 | 0 | 0.02 | 0.18 | 0.63 | 1.44 | 2.37 | 3.15 | 2.73 | 2.06 | 1.38 | 0.83 | 0.41 | 0.16 | 0.04 | 0.04 | 0.04 | 0.11 |
| | | | | | | | | | 3504 8044 4634 7235 6616 2908 0634 2324 0241 8339 4722 9715 0282 7143 4691 6152 | | | | | | | | | | | | | |
| Source 83 | 0 | 0 | 0 | 0 | 0 | 0 | 0 | 0 | 0 | 0 | 0.00 | 0.07 | 0.26 | 0.63 | 1.19 | 1.91 | 2.75 | 3.51 | 3.88 | 3.56 | 2.61 | 1.48 | 0.59 |
| | | | | | | | | | | | 7414 2928 2906 7117 7628 6841 5231 4797 3317 1955 7093 0325 3724 | | | | | | | | | | | |
| Source 84 | 0 | 0 | 0 | 0 | 0 | 0 | 0 | 0 | 0 | 0 | 0 | 0.00 | 0.05 | 0.20 | 0.48 | 0.89 | 1.40 | 1.95 | 2.43 | 2.63 | 2.39 | 1.81 | 1.29 | 1.24 |
| | | | | | | | | | | | 5637 5488 | | | 005 3667 695 2833 7805 3247 9299 7238 6953 6977 0553 | | | | | | | | | |
| Source 85 | 0 | 0 | 0 | 0 | 0 | 0 | 0 | 0 | 0 | 0 | 0 | 0.00 | 0.02 | 0.10 | 0.25 | 0.45 | 0.66 | 0.82 | 1.00 | 1.29 | 1.81 | 2.50 | 3.16 | 3.57 |
| | | | | | | | | | | | 3034 9856 7634 8329 8494 1247 6035 0204 4439 3982 695 4213 2113 | | | | | | | | | | | |
| Source 86 | 0 | 0 | 0 | 0 | 0 | 0 | 0 | 0 | 0.01 | 0.12 | 0.40 | 0.92 | 1.48 | 1.82 | 1.70 | 1.21 | 0.64 | 0.23 | 0.09 | 0.20 | 0.52 | 1.02 | 1.61 | 2.21 |
| | | | | | | | | | 5199 | | 091 7702 5664 8762 5448 2306 8378 3911 8557 8956 4274 9982 4948 1695 0689 | | | | | | | | | | |
| Source 87 | 0 | 0 | 0 | 0 | 0 | 0 | 0 | 0.01 | 0.12 | 0.43 | 0.98 | 1.58 | 1.94 | 1.81 | 1.29 | 0.68 | 0.25 | 0.13 | 0.32 | 0.84 | 1.56 | 2.22 | 2.55 |
| | | | | | | | | 6253 9011 4844 7184 | | | | 76 6614 5285 9241 6635 | | | | | 585 1429 7091 8323 7513 4027 506 | | | | |
| Source 88 | 0 | 0 | 0 | 0 | 0 | 0 | 0 | 0.02 | 0.17 | 0.59 | 1.35 | 2.17 | 2.66 | 2.48 | 1.78 | 0.94 | 0.36 | 0.16 | 0.31 | 0.77 | 1.38 | 1.85 | 1.91 |
| | | | | | | | | 2057 | | 639 5248 1845 4399 6278 6564 0897 5412 0494 3923 8712 8983 3174 3992 4123 | | | | | | | | | | | |
| Source 89 | 0 | 0 | 0 | 0 | 0 | 0 | 0 | 0.01 | 0.08 | 0.28 | 0.65 | 1.13 | 1.62 | 2.04 | 2.29 | 2.28 | 1.93 | 1.38 | 0.87 | 0.67 | 0.81 | 1.07 | 1.25 |
| | | | | | | | | 043 3496 1802 | | | 028 0599 7046 4326 172 0813 7545 3006 8798 9756 236 4702 7323 | | | | | | | | | | | |
| Source 90 | 0 | 0 | 0 | 0 | 0 | 0 | 0 | 0.01 | 0.12 | 0.42 | 0.95 | 1.53 | 1.88 | 1.76 | 1.29 | 0.79 | 0.55 | 0.67 | 1.04 | 1.58 | 2.13 | 2.47 | 2.36 |
| | | | | | | | | 5681 4978 1548 7203 9535 7747 2955 2184 0844 | | | | | | | 938 3655 7689 9037 8626 0827 1764 | | | | | | | | |
| Source 91 | 0 | 0 | 0 | 0 | 0 | 0 | 0 | 0 | 0.03 | 0.26 | 0.88 | 2.00 | 3.23 | 3.96 | 3.69 | 2.64 | 1.39 | 0.51 | 0.11 | 0.00 | 0.00 | 0.00 | 0.00 |
| | | | | | | | | | 3023 2463 4923 9102 1216 1956 4686 4369 7552 1827 0549 4097 0048 1111 5094 | | | | | | | | | | | | | |
| Source 92 | 0 | 0 | 0 | 0 | 0 | 0 | 0 | 0 | 0.02 | 0.18 | 0.63 | 1.44 | 2.37 | 3.05 | 3.15 | 2.73 | 2.06 | 1.38 | 0.83 | 0.41 | 0.16 | 0.04 | 0.04 |
| | | | | | | | | | 3504 8044 4634 7235 6616 2908 0634 2324 0241 8339 4722 9715 0282 7143 4691 | | | | | | | | | | | | | |

Fig. 11
Part 7 of 19

| | | | | | | | | | | | | | | |
|---|---|---|---|---|---|---|---|---|---|---|---|---|---|---|
| Source 93 | 0 | 0 | 0 | 0 | 0 | 0 | 0 | 0 | 0.00 | 0.07 | 0.26 | 0.63 | 1.19 | 1.91 | 2.75 | 3.51 | 3.88 | 3.56 | 2.61 | 1.48 |
| Source 94 | 0 | 0 | 0 | 0 | 0 | 0 | 0 | 0 | 7414 2928 2906 7117 7628 6841 5231 4797 3317 1955 7093 0325 |
| Source 95 | 0 | 0 | 0 | 0 | 0 | 0 | 0 | 0 | 0.00 0.05 0.20 0.48 0.89 1.40 1.95 2.43 2.63 2.39 1.81 1.29 |
| Source 96 | 0 | 0 | 0 | 0 | 0 | 0 | 0 | 0 | 5637 5488 005 3667 695 2833 7805 3247 9299 7238 6953 6977 |
| Source 97 | 0 | 0 | 0 | 0 | 0 | 0 | 0 | 0 | 0.00 0.02 0.10 0.25 0.45 0.66 0.82 1.00 1.29 1.81 2.50 3.16 |
| Source 98 | 0 | 0 | 0 | 0 | 0 | 0 | 0 | 0.01 0.12 0.40 0.92 1.48 1.82 1.70 1.21 0.64 0.23 0.09 0.20 0.52 1.02 1.61 |
| Source 99 | 0 | 0 | 0 | 0 | 0 | 0 | 0 | 5199 091 7702 5664 8762 5448 2306 8378 3911 8557 8956 4274 9982 4948 1695 |
| Source 100 | 0 | 0 | 0 | 0 | 0 | 0 | 0 | 0.01 0.12 0.43 0.98 1.58 1.94 1.81 1.29 0.68 0.25 0.13 0.32 0.84 1.56 2.22 |
| Source 101 | 0 | 0 | 0 | 0 | 0 | 0 | 0 | 6253 9011 4844 7184 76 6614 5285 9241 6635 585 1429 7091 8323 7513 4027 |
| Source 102 | 0 | 0 | 0 | 0 | 0 | 0 | 0 | 0.02 0.17 0.59 1.35 2.17 2.66 2.48 1.78 0.94 0.36 0.16 0.31 0.77 1.38 1.85 |
| Source 103 | 0 | 0 | 0 | 0 | 0 | 0 | 0 | 2057 639 5248 1845 4399 6278 6564 0897 5412 0494 3923 8712 8983 3174 3992 |
| Source 104 | 0 | 0 | 0 | 0 | 0 | 0 | 0 | 0.01 0.08 0.28 0.65 1.13 1.62 2.04 2.29 2.28 1.93 1.38 0.87 0.67 0.81 1.07 |
| Source 105 | 0 | 0 | 0 | 0 | 0 | 0 | 0 | 043 3496 1802 028 0599 7046 4326 172 0813 7545 3006 8798 9756 236 4702 |
| Source 106 | 0 | 0 | 0 | 0 | 0 | 0 | 0 | 0.01 0.12 0.42 0.95 1.53 1.88 1.76 1.29 0.79 0.55 0.67 1.04 1.58 2.13 2.47 |
| Source 107 | 0 | 0 | 0 | 0 | 0 | 0 | 0 | 5681 4978 1548 7203 9535 7747 2955 2184 0844 938 3655 7689 9037 8626 0827 |
| Source 108 | 0 | 0 | 0 | 0 | 0 | 0 | 0 | 0 0.03 0.26 0.88 2.00 3.23 3.96 3.69 2.64 1.39 0.51 0.11 0.00 0.00 0.00 |

(Due to the extreme width and density of this numeric table, the above rendering combines multiple numeric sub-columns into single cells per source row. Full numeric content preserved below by source:)

- Source 93: 0, 0, 0, 0, 0, 0, 0, 0, 0.00, 0.07, 0.26, 0.63, 1.19, 1.91, 2.75, 3.51, 3.88, 3.56, 2.61, 1.48
- Source 94: 7414 2928 2906 7117 7628 6841 5231 4797 3317 1955 7093 0325
- Source 95: 0.00 0.05 0.20 0.48 0.89 1.40 1.95 2.43 2.63 2.39 1.81 1.29
- Source 96: 5637 5488 005 3667 695 2833 7805 3247 9299 7238 6953 6977
- Source 97: 0.00 0.02 0.10 0.25 0.45 0.66 0.82 1.00 1.29 1.81 2.50 3.16
- Source 98: 3034 9856 7634 8329 8494 1247 6035 0204 4439 3982 695 4213
- Source 99: 0.01 0.12 0.40 0.92 1.48 1.82 1.70 1.21 0.64 0.23 0.09 0.20 0.52 1.02 1.61
- Source 100: 5199 091 7702 5664 8762 5448 2306 8378 3911 8557 8956 4274 9982 4948 1695
- Source 101: 0.01 0.12 0.43 0.98 1.58 1.94 1.81 1.29 0.68 0.25 0.13 0.32 0.84 1.56 2.22
- Source 102: 6253 9011 4844 7184 76 6614 5285 9241 6635 585 1429 7091 8323 7513 4027
- Source 103: 0.02 0.17 0.59 1.35 2.17 2.66 2.48 1.78 0.94 0.36 0.16 0.31 0.77 1.38 1.85
- Source 104: 2057 639 5248 1845 4399 6278 6564 0897 5412 0494 3923 8712 8983 3174 3992
- Source 105: 0.01 0.08 0.28 0.65 1.13 1.62 2.04 2.29 2.28 1.93 1.38 0.87 0.67 0.81 1.07
- Source 106: 043 3496 1802 028 0599 7046 4326 172 0813 7545 3006 8798 9756 236 4702
- Source 107: 0.01 0.12 0.42 0.95 1.53 1.88 1.76 1.29 0.79 0.55 0.67 1.04 1.58 2.13 2.47
- Source 108: 5681 4978 1548 7203 9535 7747 2955 2184 0844 938 3655 7689 9037 8626 0827
- (continued) 0.03 0.26 0.88 2.00 3.23 3.96 3.69 2.64 1.39 0.51 0.11 0.00 0.00 0.00
- 3023 2463 4923 9102 1216 1956 4686 4369 7552 1827 0549 4097 0048 1111
- 0.02 0.18 0.63 1.44 2.37 3.05 3.15 2.73 2.06 1.38 0.83 0.41 0.16 0.04
- 3504 8044 4634 7235 6616 2908 0634 2324 0241 8339 4722 9715 0282 7143
- 0.00 0.07 0.26 0.63 1.19 1.91 2.75 3.51 3.88 3.56 2.61
- 7414 2928 2906 7117 7628 6841 5231 4797 3317 1955 7093
- 0.00 0.05 0.20 0.48 0.89 1.40 1.95 2.43 2.63 2.39 1.81
- 5637 5488 005 3667 695 2833 7805 3247 9299 7238 6953
- 0.00 0.02 0.10 0.25 0.45 0.66 0.82 1.00 1.29 1.81 2.50
- 3034 9856 7634 8329 8494 1247 6035 0204 4439 3982 695
- 0.01 0.12 0.40 0.92 1.48 1.82 1.70 1.21 0.64 0.23 0.09 0.20 0.52 1.02
- 5199 091 7702 5664 8762 5448 2306 8378 3911 8557 8956 4274 9982 4948
- 0.01 0.12 0.43 0.98 1.58 1.94 1.81 1.29 0.68 0.25 0.13 0.32 0.84 1.56
- 6253 9011 4844 7184 76 6614 5285 9241 6635 585 1429 7091 8323 7513
- 0.02 0.17 0.59 1.35 2.17 2.66 2.48 1.78 0.94 0.36 0.16 0.31 0.77 1.38
- 2057 639 5248 1845 4399 6278 6564 0897 5412 0494 3923 8712 8983 3174

Fig. 11
Part 8 of 19

Fig. 11
Part 9 of 19

| | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|
| Source 141 | 0 | 0 | 0 | 0 | 0 | 0 | 0 | 0 | 0 | 0 | 0 | 0 | 0 | 0 | 0 | 0 0.03 0.26 0.88 2.00 3.23 3.96 3.69 2.64 1.39 0.51 3023 2463 4923 9102 1216 1956 4686 4369 7552 1827 |
| Source 142 | 0 | 0 | 0 | 0 | 0 | 0 | 0 | 0 | 0 | 0 | 0 | 0 | 0 | 0 | 0 | 0 0.02 0.18 0.63 1.44 2.37 3.05 3.15 2.73 2.06 1.38 3504 8044 4634 7235 6616 2908 0634 2324 0241 8339 |
| Source 143 | 0 | 0 | 0 | 0 | 0 | 0 | 0 | 0 | 0 | 0 | 0 | 0 | 0 | 0 | 0 | 0 0 0.00 0.07 0.26 0.63 1.19 1.91 2.75 7414 2928 2906 7117 7628 6841 5231 |
| Source 144 | 0 | 0 | 0 | 0 | 0 | 0 | 0 | 0 | 0 | 0 | 0 | 0 | 0 | 0 | 0 | 0 0 0 0.00 0.05 0.20 0.48 0.89 1.40 1.95 5637 5488 005 3667 695 2833 7805 |
| Source 145 | 0 | 0 | 0 | 0 | 0 | 0 | 0 | 0 | 0 | 0 | 0 | 0 | 0 | 0 | 0 | 0 0 0.00 0.02 0.10 0.25 0.45 0.66 0.82 3034 9856 7634 8329 8494 1247 6035 |
| Source 146 | 0 | 0 | 0 | 0 | 0 | 0 | 0 | 0 | 0 | 0 | 0 | 0 | 0 | 0 | 0 | 0 0.01 0.12 0.40 0.92 1.48 1.82 1.70 1.21 0.64 0.23 5199 091 7702 5664 8762 5448 2306 8378 3911 8557 |
| Source 147 | 0 | 0 | 0 | 0 | 0 | 0 | 0 | 0 | 0 | 0 | 0 | 0 | 0 | 0 | 0 | 0 0.01 0.12 0.43 0.98 1.58 1.94 1.81 1.29 0.68 0.25 6253 9011 4844 7184 76 6614 5285 9241 6635 585 |
| Source 148 | 0 | 0 | 0 | 0 | 0 | 0 | 0 | 0 | 0 | 0 | 0 | 0 | 0 | 0 | 0 | 0 0.02 0.17 0.59 1.35 2.17 2.66 2.48 1.78 0.94 0.36 2057 639 5248 1845 4399 6278 6564 0897 5412 0494 |
| Source 149 | 0 | 0 | 0 | 0 | 0 | 0 | 0 | 0 | 0 | 0 | 0 | 0 | 0 | 0 | 0 | 0 0.01 0.08 0.28 0.65 1.13 1.62 2.04 2.29 2.28 1.93 043 3496 1802 028 0599 7046 4326 172 0813 7545 |
| Source 150 | 0 | 0 | 0 | 0 | 0 | 0 | 0 | 0 | 0 | 0 | 0 | 0 | 0 | 0 | 0 | 0 0.01 0.12 0.42 0.95 1.53 1.88 1.76 1.29 0.79 0.55 5681 4978 1548 7203 9535 7747 2955 2184 0844 938 |

| offset launch [μm] | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|
| Source 1 | 0 | 0 | 0 | 0 | 0 | 0 | 0 | 0 | 0 | 0 | 0 | 0 | 0 | 0 | 0 | 0 |
| Source 2 | 0 | 0 | 0 | 0 | 0 | 0 | 0 | 0 | 0 | 0 | 0 | 0 | 0 | 0 | 0 | 0 |
| Source 3 | 0 | 0 | 0 | 0 | 0 | 0 | 0 | 0 | 0 | 0 | 0 | 0 | 0 | 0 | 0 | 0 |
| Source 4 | 0 | 0 | 0 | 0 | 0 | 0 | 0 | 0 | 0 | 0 | 0 | 0 | 0 | 0 | 0 | 0 |
| Source 5 | 0 | 0 | 0 | 0 | 0 | 0 | 0 | 0 | 0 | 0 | 0 | 0 | 0 | 0 | 0 | 0 |
| Source 6 | 0 | 0 | 0 | 0 | 0 | 0 | 0 | 0 | 0 | 0 | 0 | 0 | 0 | 0 | 0 | 0 |

Fig. 11
Part 10 of 19

| | | | | | | | | | | | | | | | | | | | |
|---|---|---|---|---|---|---|---|---|---|---|---|---|---|---|---|---|---|---|---|
| Source 7 | 0 | 0 | 0 | 0 | o | o | o | o | o | o | o | o | o | o | o | o | o | o | o |
| Source 8 | 0 | 0 | 0 | 0 | o | o | o | o | o | o | o | o | o | o | o | o | o | o | o |
| Source 9 | 0 | 0 | 0 | 0 | o | o | o | o | o | o | o | o | o | o | o | o | o | o | o |
| Source 10 | 0 | 0 | 0 | 0 | o | o | o | o | o | o | o | o | o | o | o | o | o | o | o |
| Source 11 | 0.00 0282 | | | | o | o | o | o | o | o | o | o | o | o | o | o | o | o | o |
| Source 12 | 0.00 2679 | | | | o | o | o | o | o | o | o | o | o | o | o | o | o | o | o |
| Source 13 | 0 | | | | o | o | o | o | o | o | o | o | o | o | o | o | o | o | o |
| Source 14 | 0.01 9738 | | | | o | o | o | o | o | o | o | o | o | o | o | o | o | o | o |
| Source 15 | 0.01 8328 | | | | o | o | o | o | o | o | o | o | o | o | o | o | o | o | o |
| Source 16 | 0.02 0443 | | | | o | o | o | o | o | o | o | o | o | o | o | o | o | o | o |
| Source 17 | 0.00 9446 | | | | o | o | o | o | o | o | o | o | o | o | o | o | o | o | o |
| Source 18 | 0 | | | | o | o | o | o | o | o | o | o | o | o | o | o | o | o | o |
| Source 19 | 0.00 5639 | | | | o | o | o | o | o | o | o | o | o | o | o | o | o | o | o |
| Source 20 | 0 | | | | o | o | o | o | o | o | o | o | o | o | o | o | o | o | o |
| Source 21 | 0.00 2612 | 0.00 0282 | | | o | o | o | o | o | o | o | o | o | o | o | o | o | o | o |
| Source 22 | 0.02 1793 | 0.00 2679 | | | o | o | o | o | o | o | o | o | o | o | o | o | o | o | o |
| Source 23 | 0 | 0 | | | o | o | o | o | o | o | o | o | o | o | o | o | o | o | o |
| Source | 0.15 | 0.01 | | | o | o | o | o | o | o | o | o | o | o | o | o | o | o | o |

Fig. 11
Part 11 of 19

Fig. 11
Part 12 of 19

| | | | | | | | | | | | | | | | | |
|---|---|---|---|---|---|---|---|---|---|---|---|---|---|---|---|---|
| Source 40 | | | | | | | | | | | | | | | | |
| Source 41 | 0.01 0.00 0.00 0.00 9992 8832 2612 0282 | 0 | 0 | 0 | 0 | 0 | 0 | 0 | 0 | 0 | 0 | 0 | 0 | 0 | 0 | 0 |
| Source 42 | 0.16 0.07 0.02 0.00 697 3514 1793 2679 | 0 | 0 | 0 | 0 | 0 | 0 | 0 | 0 | 0 | 0 | 0 | 0 | 0 | 0 | 0 |
| Source 43 | 0 | 0 | 0 | 0 | 0 | 0 | 0 | 0 | 0 | 0 | 0 | 0 | 0 | 0 | 0 | 0 |
| Source 44 | 1.21 0.53 0.15 0.01 3833 4474 8314 9738 | 0 | 0 | 0 | 0 | 0 | 0 | 0 | 0 | 0 | 0 | 0 | 0 | 0 | 0 | 0 |
| Source 45 | 1.13 0.49 0.14 0.01 7762 4404 6517 8328 | 0 | 0 | 0 | 0 | 0 | 0 | 0 | 0 | 0 | 0 | 0 | 0 | 0 | 0 | 0 |
| Source 46 | 1.26 0.55 0.16 0.02 1564 214 3627 0443 | 0 | 0 | 0 | 0 | 0 | 0 | 0 | 0 | 0 | 0 | 0 | 0 | 0 | 0 | 0 |
| Source 47 | 0.59 0.25 0.07 0.00 5102 6718 6096 9446 | 0 | 0 | 0 | 0 | 0 | 0 | 0 | 0 | 0 | 0 | 0 | 0 | 0 | 0 | 0 |
| Source 48 | 0.01 0.00 0.00 0 4829 1818 054 | 0 | 0 | 0 | 0 | 0 | 0 | 0 | 0 | 0 | 0 | 0 | 0 | 0 | 0 | 0 |
| Source 49 | 0.34 0.15 0.04 0.00 8921 112 4757 5639 | 0 | 0 | 0 | 0 | 0 | 0 | 0 | 0 | 0 | 0 | 0 | 0 | 0 | 0 | 0 |
| Source 50 | 0.01 0 0 2552 | 0 | 0 | 0 | 0 | 0 | 0 | 0 | 0 | 0 | 0 | 0 | 0 | 0 | 0 | 0 |
| Source 51 | 0.03 0.01 0.00 0.00 0.00 2152 9992 8832 2612 0282 | 0 | 0 | 0 | 0 | 0 | 0 | 0 | 0 | 0 | 0 | 0 | 0 | 0 | 0 | 0 |
| Source 52 | 0.26 0.16 0.07 0.02 0.00 8541 697 3514 1793 2679 | 0 | 0 | 0 | 0 | 0 | 0 | 0 | 0 | 0 | 0 | 0 | 0 | 0 | 0 | 0 |
| Source 53 | 0 0 | 0 | 0 | 0 | 0 | 0 | 0 | 0 | 0 | 0 | 0 | 0 | 0 | 0 | 0 | 0 |
| Source 54 | 1.95 1.21 0.53 0.15 0.01 2429 3833 4474 8314 9738 | 0 | 0 | 0 | 0 | 0 | 0 | 0 | 0 | 0 | 0 | 0 | 0 | 0 | 0 | 0 |
| Source 55 | 1.95 1.13 0.49 0.14 0.01 3241 7762 4404 6517 8328 | 0 | 0 | 0 | 0 | 0 | 0 | 0 | 0 | 0 | 0 | 0 | 0 | 0 | 0 | 0 |
| Source | 2.09 1.26 0.55 0.16 0.02 | 0 | 0 | 0 | 0 | 0 | 0 | 0 | 0 | 0 | 0 | 0 | 0 | 0 | 0 | 0 |

Fig. 11
Part 13 of 19

Fig. 11
Part 14 of 19

| | | | | | | | | | | | | | | | | | | | |
|---|---|---|---|---|---|---|---|---|---|---|---|---|---|---|---|---|---|---|---|
| 56 | 0874 1564 | 214 3627 0443 | 0 | 0 | 0 | 0 | 0 | 0 | 0 | 0 | 0 | 0 | 0 | 0 | 0 | 0 | 0 | 0 | 0 |
| Source 57 | 1.05 0.59 | 0.25 0.07 0.00 | | | | | | | | | | | | | | | | | |
| 58 | 6343 5102 | 6718 6096 9446 | 0 | 0 | 0 | 0 | 0 | 0 | 0 | 0 | 0 | 0 | 0 | 0 | 0 | 0 | 0 | 0 | 0 |
| Source 59 | 0.11 0.01 | 0.00 0.00 | 054 | | | | | | | | | | | | | | | | |
| 60 | 176 4829 | 1818 054 | | | | | | | | | | | | | | | | | |
| Source 61 | 0.60 0.34 | 0.15 0.04 0.00 | | | | | | | | | | | | | | | | | |
| 62 | 8183 8921 | 112 4757 5639 | | | | | | | | | | | | | | | | | |
| Source 63 | 0.12 0.01 | 0 | 0 | 0 | | | | | | | | | | | | | | | |
| | 3304 2552 | | | | | | | | | | | | | | | | | | |
| Source | 0.03 0.03 | 0.01 0.00 0.00 0.00 | | | | | | | | | | | | | | | | | |
| | 9465 2152 | 9992 8832 2612 0282 | | | | | | | | | | | | | | | | | |
| Source | 0.32 0.26 | 0.16 0.07 0.02 0.00 | | | | | | | | | | | | | | | | | |
| | 9314 8541 | 697 3514 1793 2679 | | | | | | | | | | | | | | | | | |
| Source | 0 | 0 | 0 | | | | | | | | | | | | | | | | |
| Source | 2.39 1.95 | 1.21 0.53 0.15 0.01 | | | | | | | | | | | | | | | | | |
| | 4077 2429 | 3833 4474 8314 9738 | | | | | | | | | | | | | | | | | |
| Source | 2.74 1.95 | 1.13 0.49 0.14 0.01 | | | | | | | | | | | | | | | | | |
| | 5395 3241 | 7762 4404 6517 8328 | | | | | | | | | | | | | | | | | |
| Source | 2.73 2.09 | 1.26 0.55 0.16 0.02 | | | | | | | | | | | | | | | | | |
| | 932 0874 1564 | 214 3627 0443 | | | | | | | | | | | | | | | | | |
| Source | 1.57 1.05 | 0.59 0.25 0.07 0.00 | | | | | | | | | | | | | | | | | |
| | 7111 6343 5102 | 6718 6096 9446 | 0 | | | | | | | | | | | | | | | | |
| Source | 0.38 0.11 | 0.01 0.00 0.00 | | | | | | | | | | | | | | | | | |
| | 6991 176 4829 | 1818 054 | | | | | | | | | | | | | | | | | |
| Source | 0.87 0.60 | 0.34 0.15 0.04 0.00 | | | | | | | | | | | | | | | | | |
| | 9309 8183 8921 | 112 4757 5639 | | | | | | | | | | | | | | | | | |
| Source | 0.44 0.12 0.01 | 0 | 0 | | | | | | | | | | | | | | | | |
| | 4481 3304 2552 | | | | | | | | | | | | | | | | | | |
| Source | 0.03 0.03 | 0.03 0.01 0.00 0.00 0.00 0.00 | | | | | | | | | | | | | | | | | |
| | 6799 9465 2152 | 9992 8832 2612 0282 | | | | | | | | | | | | | | | | | |
| Source | 0.30 0.32 | 0.26 0.16 0.07 0.02 0.00 | | | | | | | | | | | | | | | | | |

| | | | | | | | | | | | | | | | | | | |
|---|---|---|---|---|---|---|---|---|---|---|---|---|---|---|---|---|---|---|
| Source 72 | 7088 9314 8541 | 697 3514 1793 2679 | 0 | 0 | 0 | 0 | 0 | 0 | 0 | 0 | 0 | 0 | 0 | 0 | 0 | 0 | 0 | 0 |
| Source 73 | 0.01 2051 | 0 | 0 | 0 | 0 | 0 | 0 | 0 | 0 | 0 | 0 | 0 | 0 | 0 | 0 | 0 | 0 | 0 |
| Source 74 | 2.24 2.39 1.95 1.21 0.53 0.15 0.01 0664 4077 2429 3833 4474 8314 9738 | | 0 | 0 | 0 | 0 | 0 | 0 | 0 | 0 | 0 | 0 | 0 | 0 | 0 | 0 | 0 | 0 |
| Source 75 | 3.32 2.74 1.95 1.13 0.49 0.14 0.01 9662 5395 3241 7762 4404 6517 8328 | | 0 | 0 | 0 | 0 | 0 | 0 | 0 | 0 | 0 | 0 | 0 | 0 | 0 | 0 | 0 | 0 |
| Source 76 | 2.93 2.73 2.09 1.26 0.55 0.16 0.02 88 932 0874 1564 214 3627 0443 | | 0 | 0 | 0 | 0 | 0 | 0 | 0 | 0 | 0 | 0 | 0 | 0 | 0 | 0 | 0 | 0 |
| Source 77 | 2.08 1.57 1.05 0.59 0.25 0.07 0.00 7879 7111 6343 5102 6718 6096 9446 | | 0 | 0 | 0 | 0 | 0 | 0 | 0 | 0 | 0 | 0 | 0 | 0 | 0 | 0 | 0 | 0 |
| Source 78 | 0.90 0.38 0.11 0.01 0.00 0.00 833 6991 176 4829 1818 054 | | 0 | 0 | 0 | 0 | 0 | 0 | 0 | 0 | 0 | 0 | 0 | 0 | 0 | 0 | 0 | 0 |
| Source 79 | 1.11 0.87 0.60 0.34 0.15 0.04 0.00 2456 9309 8183 8921 112 4757 5639 | | 0 | 0 | 0 | 0 | 0 | 0 | 0 | 0 | 0 | 0 | 0 | 0 | 0 | 0 | 0 | 0 |
| Source 80 | 1.05 0.44 0.12 0.01 9264 4481 3304 2552 | 0 | 0 | 0 | 0 | 0 | 0 | 0 | 0 | 0 | 0 | 0 | 0 | 0 | 0 | 0 | 0 | 0 |
| Source 81 | 0.02 0.03 0.03 0.01 0.00 0.00 0.00 632 6799 9465 2152 9992 8832 2612 0282 | | 0 | 0 | 0 | 0 | 0 | 0 | 0 | 0 | 0 | 0 | 0 | 0 | 0 | 0 | 0 | 0 |
| Source 82 | 0.21 0.30 0.32 0.26 0.16 0.07 0.02 0.00 9802 7088 9314 8541 697 3514 1793 2679 | | 0 | 0 | 0 | 0 | 0 | 0 | 0 | 0 | 0 | 0 | 0 | 0 | 0 | 0 | 0 | 0 |
| Source 83 | 0.15 0.01 3006 2051 | 0 | 0 | 0 | 0 | 0 | 0 | 0 | 0 | 0 | 0 | 0 | 0 | 0 | 0 | 0 | 0 | 0 |
| Source 84 | 1.70 2.24 2.39 1.95 1.21 0.53 0.15 0.01 002 0664 4077 2429 3833 4474 8314 9738 | | 0 | 0 | 0 | 0 | 0 | 0 | 0 | 0 | 0 | 0 | 0 | 0 | 0 | 0 | 0 | 0 |
| Source 85 | 3.61 3.32 2.74 1.95 1.13 0.49 0.14 0.01 8037 9662 5395 3241 7762 4404 6517 8328 | | 0 | 0 | 0 | 0 | 0 | 0 | 0 | 0 | 0 | 0 | 0 | 0 | 0 | 0 | 0 | 0 |
| Source 86 | 2.70 2.93 2.73 2.09 1.26 0.55 0.16 0.02 7415 88 932 0874 1564 214 3627 0443 | | 0 | 0 | 0 | 0 | 0 | 0 | 0 | 0 | 0 | 0 | 0 | 0 | 0 | 0 | 0 | 0 |
| Source 87 | 2.46 2.08 1.57 1.05 0.59 0.25 0.07 0.00 4566 7879 7111 6343 5102 6718 6096 9446 | | 0 | 0 | 0 | 0 | 0 | 0 | 0 | 0 | 0 | 0 | 0 | 0 | 0 | 0 | 0 | 0 |
| Source | 1.51 0.90 0.38 0.11 0.01 0.00 0.00 | 0 | 0 | 0 | 0 | 0 | 0 | 0 | 0 | 0 | 0 | 0 | 0 | 0 | 0 | 0 | 0 | 0 |

Fig. 11
Part 15 of 19

Fig. 11
Part 16 of 19

| | | | | | | | | | | | | | | | | | | | | | | |
|---|---|---|---|---|---|---|---|---|---|---|---|---|---|---|---|---|---|---|---|---|---|---|
| 88 | 1827 | 833 6991 | 176 4829 1818 | 054 | | | | | | | | | | | | | | | | | | |
| Source 89 | 1.25 | 1.11 0.87 | 0.60 0.34 0.15 | 0.04 0.00 | 0 | 0 | 0 | 0 | 0 | 0 | 0 | 0 | 0 | 0 | 0 | 0 | 0 | 0 | 0 | 0 | 0 | 0 |
| 90 | 5967 2456 9309 8183 8921 | | | 112 4757 5639 | | | | | | | | | | | | | | | | | | |
| Source 91 | 1.79 1.05 0.44 0.12 0.01 | | | 0 | 0 | 0 | 0 | 0 | 0 | 0 | 0 | 0 | 0 | 0 | 0 | 0 | 0 | 0 | 0 | 0 | 0 | 0 |
| 92 | 8213 9264 4481 3304 2552 | | | | | | | | | | | | | | | | | | | | | |
| Source 93 | 0.01 0.02 0.03 0.03 0.01 0.00 0.00 0.00 | | | | | | | | 0 | 0 | 0 | 0 | 0 | 0 | 0 | 0 | 0 | 0 | 0 | 0 | 0 |
| 94 | 3918 632 6799 9465 2152 9992 8832 2612 0282 | | | | | | | | | | | | | | | | | | | | | |
| Source 95 | 0.11 0.21 0.30 0.32 0.26 0.16 0.07 0.02 0.00 | | | | | | | | | 0 | 0 | 0 | 0 | 0 | 0 | 0 | 0 | 0 | 0 | 0 | 0 |
| 96 | 6152 9802 7088 9314 8541 697 3514 1793 2679 | | | | | | | | | | | | | | | | | | | | | |
| Source 97 | 0.59 0.15 0.01 | | | 0 | 0 | 0 | 0 | 0 | 0 | 0 | 0 | 0 | 0 | 0 | 0 | 0 | 0 | 0 | 0 | 0 | 0 |
| 98 | 3724 3006 2051 | | | | | | | | | | | | | | | | | | | | | |
| Source 99 | 1.24 1.70 2.24 2.39 1.95 1.21 0.53 0.15 0.01 | | | | | | | | | 0 | 0 | 0 | 0 | 0 | 0 | 0 | 0 | 0 | 0 | 0 | 0 |
| 100 | 0553 002 0664 4077 2429 3833 4474 8314 9738 | | | | | | | | | | | | | | | | | | | | | |
| Source 101 | 3.57 3.61 3.32 2.74 1.95 1.13 0.49 0.14 0.01 | | | | | | | | | 0 | 0 | 0 | 0 | 0 | 0 | 0 | 0 | 0 | 0 | 0 | 0 |
| 102 | 2113 8037 9662 5395 3241 7762 4404 6517 8328 | | | | | | | | | | | | | | | | | | | | | |
| Source 103 | 2.21 2.70 2.93 2.73 2.09 1.26 0.55 0.16 0.02 | | | | | | | | | 0 | 0 | 0 | 0 | 0 | 0 | 0 | 0 | 0 | 0 | 0 | 0 |
| | 0689 7415 88 932 0874 1564 2143 627 0443 | | | | | | | | | | | | | | | | | | | | | |
| Source | 2.55 2.46 2.08 1.57 1.05 0.59 0.25 0.07 0.00 | | | | | | | | | 0 | 0 | 0 | 0 | 0 | 0 | 0 | 0 | 0 | 0 | 0 | 0 |
| | 506 4566 7879 7111 6343 5102 6718 6096 9446 | | | | | | | | | | | | | | | | | | | | | |
| Source | 1.91 1.51 0.90 0.38 0.11 0.01 0.00 0.00 | | | | | | | | 0 | 0 | 0 | 0 | 0 | 0 | 0 | 0 | 0 | 0 | 0 | 0 | 0 |
| | 4123 1827 8336991 1764829 1818 054 | | | | | | | | | | | | | | | | | | | | | |
| Source | 1.25 1.25 1.11 0.87 0.60 0.34 0.15 0.04 0.00 | | | | | | | | | 0 | 0 | 0 | 0 | 0 | 0 | 0 | 0 | 0 | 0 | 0 | 0 |
| | 7323 5967 2456 9309 8183 8921 112 4757 5639 | | | | | | | | | | | | | | | | | | | | | |
| Source | 2.36 1.79 1.05 0.44 0.12 0.01 | | | | | 0 | 0 | 0 | 0 | 0 | 0 | 0 | 0 | 0 | 0 | 0 | 0 | 0 |
| | 1764 8213 9264 4481 3304 2552 | | | | | | | | | | | | | | | | | | | | | |
| Source | 0.00 0.01 0.02 0.03 0.03 0.03 0.01 0.00 0.00 0.00 | | | | | | | | | | 0 | 0 | 0 | 0 | 0 | 0 | 0 | 0 | 0 | 0 | 0 |
| | 5094 3918 632 6799 9465 2152 9992 8832 2612 0282 | | | | | | | | | | | | | | | | | | | | | |
| Source | 0.04 0.11 0.21 0.30 0.32 0.26 0.16 0.07 0.02 0.00 | | | | | | | | | | 0 | 0 | 0 | 0 | 0 | 0 | 0 | 0 | 0 | 0 | 0 |
| | 4691 6152 9802 7088 9314 8541 697 3514 1793 2679 | | | | | | | | | | | | | | | | | | | | | |
| Source | 1.48 0.59 0.15 0.01 | | | 0 | 0 | 0 | 0 | 0 | 0 | 0 | 0 | 0 | 0 | 0 | 0 | 0 | 0 | 0 | 0 | 0 |
| | 0325 3724 3006 2051 | | | | | | | | | | | | | | | | | | | | | |
| Source | 1.29 1.24 1.70 2.24 1.70 2.24 2.39 1.95 1.21 0.53 0.15 0.01 | | | | | | | | | | | 0 | 0 | 0 | 0 | 0 | 0 | 0 | 0 | 0 | 0 |

| | | | | | | | | | | | | | | | | | | | | | | |
|---|---|---|---|---|---|---|---|---|---|---|---|---|---|---|---|---|---|---|---|---|---|---|
| 104 | 6977 0553 | 002 0664 | 4077 2429 | 3833 4474 | 8314 9738 | | | | | | | | | | | | | | | | | |
| Source 105 | 3.16 3.57 | 3.61 3.32 | 2.74 1.95 | 1.13 0.49 | 0.14 0.01 | 0 | | | | | | | | | | | | | | | | |
| 106 | 4213 2113 | 8037 9662 | 5395 3241 | 7762 4404 | 6517 8328 | | | | | | | | | | | | | | | | | |
| Source 107 | 1.61 2.21 | 2.70 2.93 | 2.73 2.09 | 1.26 0.55 | 0.16 0.02 | 0 | 0 | | | | | | | | | | | | | | | |
| 108 | 1695 0689 | 7415 88 | 932 0874 | 1564 214 | 3627 0443 | | | | | | | | | | | | | | | | | |
| Source 109 | 2.22 2.55 | 2.46 2.08 | 1.57 1.05 | 0.59 0.25 | 0.07 0.00 | 0 | 0 | 0 | | | | | | | | | | | | | | |
| 110 | 4027 506 | 4566 7879 | 7111 6343 | 5102 6718 | 6096 9446 | | | | | | | | | | | | | | | | | |
| Source 111 | 1.85 1.91 | 1.51 0.90 | 0.38 0.11 | 0.01 0.00 | 0.00 0 | 0 | 0 | 0 | 0 | | | | | | | | | | | | | |
| 112 | 3992 4123 | 1827 833 | 6991 176 | 4829 1818 | 054 | | | | | | | | | | | | | | | | | |
| Source 113 | 1.07 1.25 | 1.25 1.11 | 0.87 0.60 | 0.34 0.15 | 0.04 0.00 | 0 | 0 | 0 | 0 | 0 | | | | | | | | | | | | |
| 114 | 4702 7323 | 5967 2456 | 9309 8183 | 8921 112 | 4757 5639 | | | | | | | | | | | | | | | | | |
| Source 115 | 2.47 2.36 | 1.79 1.05 | 0.44 0.12 | 0.01 0 | 0 0 | 0 | 0 | 0 | 0 | 0 | 0 | | | | | | | | | | | |
| 116 | 0827 1764 | 8213 9264 | 4481 3304 | 2552 | | | | | | | | | | | | | | | | | | |
| Source 117 | 0.00 0.00 | 0.01 0.02 | 0.03 0.03 | 0.03 0.01 | 0.00 0.00 | 0.00 | 0 | 0 | 0 | 0 | 0 | 0 | | | | | | | | | | |
| 118 | 1111 5094 | 3918 632 | 6799 9465 | 2152 9992 | 8832 2612 | 0282 | | | | | | | | | | | | | | | | |
| Source 119 | 0.04 0.04 | 0.11 0.21 | 0.30 0.32 | 0.26 0.16 | 0.07 0.02 | 0.00 | 0 | 0 | 0 | 0 | 0 | 0 | 0 | | | | | | | | | |
| 120 | 7143 4691 | 6152 9802 | 7088 9314 | 8541 697 | 3514 1793 | 2679 | | | | | | | | | | | | | | | | |
| Source 121 | 2.61 1.48 | 0.59 0.15 | 0.01 0 | 0 0 | 0 0 | 0 | 0 | 0 | 0 | 0 | 0 | 0 | 0 | 0 | | | | | | | | |
| 122 | 7093 0325 | 3724 3006 | 2051 | | | | | | | | | | | | | | | | | | | |
| Source 123 | 1.81 1.29 | 1.24 1.70 | 2.24 2.39 | 1.95 1.21 | 0.53 0.15 | 0.01 | 0 | 0 | 0 | 0 | 0 | 0 | 0 | 0 | 0 | | | | | | | |
| 124 | 6953 6977 | 0553 002 | 0664 4077 | 2429 3833 | 4474 8314 | 9738 | | | | | | | | | | | | | | | | |
| Source 125 | 2.50 3.16 | 3.57 3.61 | 3.32 2.74 | 1.95 1.13 | 0.49 0.14 | 0.01 | 0 | 0 | 0 | 0 | 0 | 0 | 0 | 0 | 0 | 0 | | | | | | |
| 126 | 695 4213 | 2113 8037 | 9662 5395 | 3241 7762 | 4404 6517 | 8328 | | | | | | | | | | | | | | | | |
| Source 127 | 1.02 1.61 | 2.21 2.70 | 2.93 2.73 | 2.09 1.26 | 0.55 0.16 | 0.02 | 0 | 0 | 0 | 0 | 0 | 0 | 0 | 0 | 0 | 0 | 0 | | | | | |
| 128 | 4948 1695 | 0689 7415 | 88 932 | 0874 1564 | 214 3627 | 0443 | | | | | | | | | | | | | | | | |
| Source 129 | 1.56 2.22 | 2.55 2.46 | 2.08 1.57 | 1.05 0.59 | 0.25 0.07 | 0.00 | 0 | 0 | 0 | 0 | 0 | 0 | 0 | 0 | 0 | 0 | 0 | 0 | | | | |
| 130 | 7513 4027 | 506 4566 | 7879 7111 | 6343 5102 | 6718 6096 | 9446 | | | | | | | | | | | | | | | | |
| Source 131 | 1.38 1.85 | 1.91 1.51 | 0.90 0.38 | 0.11 0.01 | 0.00 0.00 | 0.00 | 0 | 0 | 0 | 0 | 0 | 0 | 0 | 0 | 0 | 0 | 0 | 0 | 0 | | | |
| 132 | 3174 3992 | 4123 1827 | 833 6991 | 176 4829 | 1818 054 | | | | | | | | | | | | | | | | | |
| Source 133 | 0.81 1.07 | 1.25 1.25 | 1.11 0.87 | 0.60 0.34 | 0.15 0.04 | 0.00 | 0 | 0 | 0 | 0 | 0 | 0 | 0 | 0 | 0 | 0 | 0 | 0 | 0 | 0 | | |
| 134 | 236 4702 | 7323 5967 | 2456 9309 | 8183 8921 | 112 4757 | 5639 | | | | | | | | | | | | | | | | |
| Source 135 | 2.13 2.47 | 2.36 1.79 | 1.05 0.44 | 0.12 0.01 | 0 0 | 0 | 0 | 0 | 0 | 0 | 0 | 0 | 0 | 0 | 0 | 0 | 0 | 0 | 0 | 0 | 0 | |

Fig. 11
Part 17 of 19

| | | | | | | | | | | | | | | | | | | | | | | |
|---|---|---|---|---|---|---|---|---|---|---|---|---|---|---|---|---|---|---|---|---|---|---|
| 120 | 8626 0827 1764 8213 9264 4481 3304 2552 | | | | | | | | | | | | | | | | | | | | | |
| Source 121 | 0.00 | 0.00 | 0.00 | 0.01 | 0.02 | 0.03 | 0.03 | 0.01 | 0.00 | 0.00 | 0.00 | | | | | | | | | | | |
| 122 | 0048 1111 5094 3918 | | | | 632 6799 9465 2152 9992 8832 2612 0282 | | | | | | | | | | | | | | | | | |
| Source 123 | 0.16 | 0.04 | 0.04 | 0.11 | 0.21 | 0.30 | 0.32 | 0.26 | 0.16 | 0.07 | 0.02 | 0.00 | | | | | | | | | | |
| 124 | 0282 7143 4691 6152 9802 7088 9314 8541 | | | | | | | 697 3514 1793 2679 | | | | | | | | | | | | | |
| Source 125 | 3.56 | 2.61 | 1.48 | 0.59 | 0.15 | 0.01 | 0 | 0 | 0 | 0 | 0 | 0 | 0 | | | | | | | | | |
| 126 | 1955 7093 0325 3724 3006 2051 | | | | | | | | | | | | | | | | | | | | | |
| Source 127 | 2.39 | 1.81 | 1.29 | 1.24 | 1.70 | 2.24 | 2.39 | 1.95 | 1.21 | 0.53 | 0.15 | 0.01 | 0 | 0 | | | | | | | | |
| 128 | 7238 6953 6977 0553 | | | | 002 0664 4077 2429 3833 4474 8314 9738 | | | | | | | | | | | | | | | | | |
| Source 129 | 1.81 | 2.50 | 3.16 | 3.57 | 3.61 | 3.32 | 2.74 | 1.95 | 1.13 | 0.49 | 0.14 | 0.01 | 0 | 0 | 0 | | | | | | | |
| 130 | 3982 | 695 4213 2113 8037 9662 5395 3241 7762 4404 6517 8328 | | | | | | | | | | | | | | | | | | | | |
| Source 131 | 0.52 | 1.02 | 1.61 | 2.21 | 2.70 | 2.93 | 2.73 | 2.09 | 1.26 | 0.55 | 0.16 | 0.02 | 0 | 0 | 0 | 0 | | | | | | |
| 132 | 9982 4948 1695 0689 7415 | | | | | 88 | 932 0874 1564 | | | 214 3627 0443 | | | | | | | | | | | | |
| Source 133 | 0.84 | 1.56 | 2.22 | 2.55 | 2.46 | 2.08 | 1.57 | 1.05 | 0.59 | 0.25 | 0.07 | 0.00 | 0 | 0 | 0 | 0 | 0 | | | | | |
| 134 | 8323 7513 4027 | | | 506 4566 7879 7111 6343 5102 6718 6096 9446 | | | | | | | | | | | | | | | | | | |
| Source 135 | 0.77 | 1.38 | 1.85 | 1.91 | 1.51 | 0.90 | 0.38 | 0.11 | 0.01 | 0.00 | 0.00 | 0 | 0 | 0 | 0 | 0 | 0 | 0 | | | | |
| 128 | 8983 3174 3992 4123 1827 | | | | | 833 6991 | | 176 4829 1818 | | | 054 | | | | | | | | | | | |
| Source | 0.67 | 0.81 | 1.07 | 1.25 | 1.25 | 1.11 | 0.87 | 0.60 | 0.34 | 0.15 | 0.04 | 0.00 | 0 | 0 | 0 | 0 | 0 | 0 | 0 | | | |
| 129 | 9756 | 236 4702 7323 5967 2456 9309 8183 8921 | | | | | | | | 112 4757 5639 | | | | | | | | | | | | |
| Source | 1.58 | 2.13 | 2.47 | 2.36 | 1.79 | 1.05 | 0.44 | 0.12 | 0.01 | 0 | 0 | 0 | 0 | 0 | 0 | 0 | 0 | 0 | 0 | 0 | | |
| 130 | 9037 8626 0827 1764 8213 9264 4481 3304 2552 | | | | | | | | | | | | | | | | | | | | | |
| Source 131 | 0.00 | 0.00 | 0.00 | 0.00 | 0.01 | 0.02 | 0.03 | 0.03 | 0.03 | 0.01 | 0.00 | 0.00 | 0.00 | 0 | 0 | 0 | 0 | 0 | 0 | 0 | 0 | |
| 132 | 4097 0048 1111 5094 3918 | | | | | 632 6799 9465 2152 9992 8832 2612 0282 | | | | | | | | | | | | | | | | | |
| Source 133 | 0.41 | 0.16 | 0.04 | 0.04 | 0.11 | 0.21 | 0.30 | 0.32 | 0.26 | 0.16 | 0.07 | 0.02 | 0.00 | 0 | 0 | 0 | 0 | 0 | 0 | 0 | 0 | 0 |
| 134 | 9715 0282 7143 4691 6152 9802 7088 9314 8541 | | | | | | | | | 697 3514 1793 2679 | | | | | | | | | | | | |
| Source 135 | 3.88 | 3.56 | 2.61 | 1.48 | 0.59 | 0.15 | 0.01 | 0 | 0 | 0 | 0 | 0 | 0 | 0 | 0 | 0 | 0 | 0 | 0 | 0 | 0 | 0 |
| | 3317 1955 7093 0325 3724 3006 2051 | | | | | | | | | | | | | | | | | | | | | |
| Source | 2.63 | 2.39 | 1.81 | 1.29 | 1.24 | 1.70 | 2.24 | 2.39 | 1.95 | 1.21 | 0.53 | 0.15 | 0.01 | 0 | 0 | 0 | 0 | 0 | 0 | 0 | 0 | 0 |
| | 9299 7238 6953 6977 0553 | | | | | 002 0664 4077 2429 3833 4474 8314 9738 | | | | | | | | | | | | | | | | | |
| Source | 1.29 | 1.81 | 2.50 | 3.16 | 3.57 | 3.61 | 3.32 | 2.74 | 1.95 | 1.13 | 0.49 | 0.14 | 0.01 | 0 | 0 | 0 | 0 | 0 | 0 | 0 | 0 | 0 |
| | 4439 3982 | | 695 4213 2113 8037 9662 5395 3241 7762 4404 6517 8328 | | | | | | | | | | | | | | | | | | | |
| Source | 0.20 | 0.52 | 1.02 | 1.61 | 2.21 | 2.70 | 2.93 | 2.73 | 2.09 | 1.26 | 0.55 | 0.16 | 0.02 | 0 | 0 | 0 | 0 | 0 | 0 | 0 | 0 | 0 |

Fig. 11
Part 18 of 19

| | | | | | | | | | | | | |
|---|---|---|---|---|---|---|---|---|---|---|---|---|
| Source 136 | 4274 9982 4948 1695 0689 7415 | 88 | 932 0874 | 1564 | 214 3627 0443 | | | | | | | |
| Source 137 | 0.32 0.84 1.56 2.22 2.55 2.46 | 2.08 | 1.57 1.05 | 0.59 | 0.25 0.07 0.00 | 0 | | | | | | |
| Source 138 | 7091 8323 7513 4027 506 4566 7879 | 7111 | 6343 5102 | 6718 | 6096 9446 | 0 | | | | | | |
| Source 139 | 0.31 0.77 1.38 1.85 1.91 1.51 | 0.90 | 0.38 0.11 | 0.01 | 0.00 0.00 | 0 | | | | | | |
| Source 140 | 8712 8983 3174 3992 4123 1827 | 833 6991 | 176 4829 | 1818 | 054 | 0 | | | | | | |
| Source 141 | 0.87 0.67 0.81 1.07 1.25 1.25 | 1.11 | 0.87 0.60 | 0.34 | 0.15 0.04 0.00 | 0 | | | | | | |
| Source 142 | 8798 9756 236 4702 7323 5967 2456 9309 | 8183 | 8921 | 112 4757 5639 | | 0 | | | | | | |
| Source 143 | 1.04 1.58 2.13 2.47 2.36 1.79 | 1.05 | 0.44 0.12 | 0.01 | 0 | 0 | | | | | | |
| Source 144 | 7689 9037 8626 0827 1764 8213 9264 4481 3304 2552 | | | | | 0 | | | | | | |
| Source 145 | 0.11 0.00 0.00 0.00 0.01 0.02 | 0.03 | 0.03 0.03 | 0.01 | 0.00 0.00 0.00 | 0 | | | | | | |
| Source 146 | 0549 4097 0048 1111 5094 3918 | 632 6799 9465 | 2152 | 9992 8832 2612 0282 | | 0 | | | | | | |
| Source 147 | 0.83 0.41 0.16 0.04 0.04 0.11 | 0.21 | 0.30 0.32 | 0.26 | 0.16 0.07 0.02 0.00 | 0 | | | | | | |
| Source 148 | 4722 9715 0282 7143 4691 6152 9802 7088 | 9314 | 8541 | 697 3514 1793 2679 | | 0 | | | | | | |
| Source 149 | 3.51 3.88 3.56 2.61 1.48 0.59 | 0.15 | 0.01 | 0 | 0 | 0 | 0 | | | | | |
| Source 150 | 4797 3317 1955 7093 0325 3724 3006 2051 | | | | | | | | | | | |
| Source 143 | 2.43 2.63 2.39 1.81 1.29 1.24 | 1.70 | 2.24 2.39 | 1.95 | 1.21 0.53 0.15 | 0.01 | | | | | | |
| Source 144 | 3247 9299 7238 6953 6977 0553 | 002 0664 4077 | 2429 | 3833 4474 8314 9738 | | | | | | | | |
| Source 145 | 1.00 1.29 1.81 2.50 3.16 3.57 | 3.61 | 3.32 2.74 | 1.95 | 1.13 0.49 0.14 | 0.01 | | | | | | |
| Source 146 | 0204 4439 3982 695 4213 2113 8037 9662 5395 | 3241 | 7762 4404 6517 8328 | | | | | | | | | |
| Source 147 | 0.09 0.20 0.52 1.02 1.61 2.21 | 2.70 | 2.93 2.73 | 2.09 | 1.26 0.55 0.16 | 0.02 | | | | | | |
| Source 148 | 8956 4274 9982 4948 1695 0689 7415 | 88 | 932 0874 | 1564 | 214 3627 0443 | | | | | | | |
| Source 149 | 0.13 0.32 0.84 1.56 2.22 2.55 | 2.46 | 2.08 1.57 | 1.05 | 0.59 0.25 0.07 | 0.00 | | | | | | |
| Source 150 | 1429 7091 8323 7513 4027 | 506 4566 7879 | 7111 | 6343 5102 | 6718 | 6096 9446 | 0 | | | | | | |
| Source 147 | 0.16 0.31 0.77 1.38 1.85 1.91 | 1.51 | 0.90 0.38 | 0.11 | 0.01 0.00 0.00 | | | | | | | |
| Source 148 | 3923 8712 8983 3174 3992 4123 1827 | 833 6991 | 176 4829 1818 | 054 | | | | | | | | |
| Source 149 | 1.38 0.87 0.67 0.81 1.07 1.25 | 1.11 | 0.87 0.60 | 0.34 | 0.15 0.04 0.00 | | | | | | | |
| Source 150 | 3006 8798 9756 236 4702 7323 5967 2456 9309 | 8183 | 8921 | 112 4757 5639 | | | | | | | | |
| | 0.67 1.04 1.58 2.13 2.47 2.36 | 1.79 | 1.05 0.44 | 0.12 | 0.01 | | | | | | | |
| | 3655 7689 9037 8626 0827 1764 8213 9264 4481 3304 2552 | | | | | | | | | | | |

Fig. 11

MULTIMODE OPTICAL FIBER

CROSS-REFERENCE TO PRIORITY APPLICATIONS

This application hereby claims the benefit of pending European Application No. 11305087, for "Multimode Optical Fiber" (filed Jan. 31, 2011 at the European Patent Office), which is hereby incorporated by reference in its entirety.

This application further claims the benefit of commonly assigned U.S. Provisional Patent Application Ser. No. 61/438,376, for "Multimode Optical Fiber" (filed Feb. 1, 2011), which is hereby incorporated by reference in its entirety.

FIELD OF THE INVENTION

The present invention relates to the field of optical fibers, and, more specifically, to a multimode optical fiber for short-distance transmission systems requiring a large bandwidth.

BACKGROUND

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

For short-distance applications and for local networks, multimode optical fibers are frequently used. The core of a multimode optical fiber typically has a diameter of between about 50 microns and 62.5 microns, whereas the core of a single-mode optical fiber typically has a diameter of between about 6 microns and 9 microns. In a multimode optical fiber, for a given wavelength, several optical modes are propagated simultaneously along the optical fiber, conveying the same information. The bandwidth is directly linked to the group velocity of the optical modes propagating in the multimode core of the optical fiber. Thus, to guarantee a broad bandwidth, it is desirable for the group velocities of all the modes at a given wavelength to be identical. Stated differently, the intermodal dispersion should be zero, or at least minimized, for a given wavelength.

Multimode optical fibers having a diameter of 50 microns have been the subject of international standardization under the ITU-T G.651.1 recommendations, which, in particular, define criteria (e.g., bandwidth, numerical aperture, and core diameter) that relate to the requirements for optical fiber compatibility. The ITU-T G.651.1 standard (July 2007) is hereby incorporated by reference in its entirety.

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, "trapezoidal" profile, "triangular" profile, or "parabolic" profile (e.g., a graded profile or an "alpha" profile) for graphs having the respective shapes of a step, a trapezoid, a triangle, or a parabola. These curves are generally representative of the optical fiber's theoretical or set profile. Constraints in the manufacture of the optical fiber, however, may result in a slightly different actual profile.

For the same propagation medium (i.e., in a step-index multimode optical fiber), the different modes have different group delay times. This difference in group delay times results in a time lag between the pulses propagating along different radial offsets of the optical fiber. This delay causes a broadening of the resulting light pulse. Broadening of the light pulse increases the risk of the pulse being superimposed onto a trailing pulse and reduces the bandwidth (i.e., data rate) supported by the optical fiber.

To reduce intermodal dispersion, the multimode optical fibers used in telecommunications generally have a core with a refractive index that decreases progressively from the center of the optical fiber to its interface with a cladding (i.e., an "alpha" core profile). Such an optical fiber has been used for a number of years, and its characteristics have been described in "*Multimode Theory of Graded-Core Fibers*" by D. Gloge et al., Bell system Technical Journal 1973, pp. 1563-1578, and summarized in "*Comprehensive Theory of Dispersion in Graded-Index Optical Fibers*" by G. Yabre, Journal of Lightwave Technology, February 2000, Vol. 18, No. 2, pp. 166-177. Each of the above-referenced articles is hereby incorporated by reference in its entirety.

A graded-index profile (i.e., an alpha-index profile) can be described by a relationship between the refractive index value n and the distance r from the center of the optical fiber according to the following equation:

$$n = n_0 \sqrt{1 - 2\Delta\left(\frac{r}{a}\right)^\alpha} \quad \text{(Equation 1)}$$

wherein, $\alpha \geq 1$, and $\alpha$ is a non-dimensional parameter that is indicative of the shape of the index profile;

$n_0$ is the maximum refractive index of the optical fiber's core;

a is the radius of the optical fiber's core; and $$\Delta = \frac{(n_0^2 - n_{cl}^2)}{2n_0^2} \quad \text{(Equation 2)}$$

where $n_{cl}$ is the minimum refractive index of the multimode core, which may correspond to the refractive index of the outer cladding (most often made of silica).

A multimode optical fiber with a graded index (i.e., an alpha profile) therefore has a core profile with a rotational symmetry such that along any radial direction of the optical fiber the value of the refractive index decreases continuously from the center of the optical fiber's core to its periphery. When a multimode light signal propagates in such a graded-index core, the different optical modes experience differing propagation mediums (i.e., because of the varying refractive indices). This, in turn, affects the propagation speed of each optical mode differently. Thus, by adjusting the value of the parameter $\alpha$, it is possible to obtain a group delay time that is virtually equal for all of the modes. Stated differently, the refractive index profile can be modified to reduce or even eliminate intermodal dispersion.

Typically, a multimode optical fiber should have the largest possible bandwidth to perform well in a high-bandwidth application. The TIA-492AAAC-A standard, which is hereby incorporated by reference in its entirety, specifies the performance requirements for 50-micron-diameter multimode optical fibers used over long distances in Ethernet high-bandwidth transmission network applications. In particular, the OM3 and OM4 standards, each of which is hereby incorporated by reference in its entirety, have been adopted to meet the demands of high-bandwidth applications (i.e., a data rate higher than 1 GbE) over long distances (i.e., distances greater than 300 meters). The OM3 standard requires, at a wavelength of 850 nanometers, an effective modal bandwidth (EMB) of at least 2,000 MHz·km. The OM3 standard assures error-free transmissions for a data rate of 10 Gb/s (10 GbE) up to a distance of 300 meters. The OM4 standard requires, at a wavelength of 850 nanometers, an EMB of at least 4,700 MHz·km to obtain error-free transmissions for a data rate of 10 Gb/s (10 GbE) up to a distance of 550 meters.

For a given wavelength, the bandwidth of an optical fiber may be characterized in several different ways. In particular, the characterization of bandwidth depends on the source used with the optical fiber. On the one hand, determination of the overfilled launch bandwidth OFL-BW assumes the use of a light source exhibiting uniform excitation over the entire radial surface of the optical fiber (e.g., using a laser diode or light emitting diode (LED)). On the other hand, the effective modal bandwidth EMB is more appropriate for determining the optical fiber bandwidth in use with VCSEL sources (Vertical Cavity Surface Emitting Laser).

The effective modal bandwidth can be calculated by measuring the delay caused by modal dispersion (i.e., the dispersion mode delay, or DMD). An exemplary method of measuring DMD and calculating the effective modal bandwidth can be found in the FOTP-220 standard and the IEC 60793-1-49 standard, each of which is hereby incorporated by reference in its entirety. To carry out a DMD measurement, care is generally taken to use a source or an optical fiber length such that the chromatic dispersion is actually negligible, because the purpose is to characterize the modal dispersion of the fiber. The effective modal bandwidth corresponds to the smallest bandwidth for all the EMBs of Source-Optical fiber pairs when the chromatic dispersion is disregarded for all standardized sources in 10 GbE applications.

A DMD graph is obtained by successively injecting into the multimode optical fiber a light pulse having a given wavelength $\lambda_0$ with a radial offset between each successive pulse. The delay of each pulse is then measured after a given length of fiber L. Multiple identical light pulses (i.e., light pulses having the same amplitude, wavelength, and frequency) are injected with different radial offsets with respect to the center of the multimode optical fiber's core. From these measurements a map 23 of the DMD, or "DMD graph," may be generated depicting the pulse delay (e.g., in nanoseconds) as a function of radial offset (e.g., in microns).

When the parameter a is set to an optimum value $\alpha_{optimum}$, there is virtually no shift in the light pulse delay for a given wavelength $\lambda_0$ regardless of the radius r along which the pulse propagates. Thus, the intermodal dispersion is low and the effective modal bandwidth is significant. Commonly-assigned European Publication No. EP 2144096, which is hereby incorporated by reference in its entirety, describes an exemplary DMD graphical representation and calculated EMB.

U.S. Patent Publication No. 2010/0154478, which is hereby incorporated by reference in its entirety, discloses graded-index profiles in which the core follows a modified power law equation. The inner part follows the standard Equation 1, while the refractive index profile deviates from the power law equation with smaller refractive index. Such refractive index profiles lead to DMD degradations and limited effective modal bandwidth.

U.S. Pat. No. 7,315,677, which is hereby incorporated by reference in its entirety, discloses "double alpha profiles" based on co-doping. Each dopant profile exhibits its own alpha. DMD performances are not disclosed. Based on calculations, the disclosed optical fibers have relatively small numerical apertures of about 0.2 or less.

International Publication No. WO 00/50936, which is hereby incorporated by reference in its entirety, discloses graded-index profiles in which the core's refractive index profile follows a modified power law equation providing a DMD plot at 1300 nanometers with two different slopes over two different regions of the core. This publication, however, fails to disclose the exponent controlling its power law equation or a DMD plot at 850 nanometers.

Japanese Publication No. 2007-272239, which is hereby incorporated by reference in its entirety, is related to the compensation of the deleterious effect of the tail/skirt at the core cladding interface inherent to VAD process. The publication, however, fails to disclose a central core maximum refractive index and is, therefore, likely a standard central core leading to a standard numerical aperture.

Japanese Publication No. 2001-235648, which is hereby incorporated by reference in its entirety, is related to the compensation of the deleterious effect of the tail/skirt at the core cladding interface inherent to VAD process. The publication, however, fails to disclose a central core maximum refractive index and is, therefore, likely a standard central core leading to a standard numerical aperture.

R. E. Freund, "*High-Speed Transmission in Multimode Optical fibers*," JLT, Vol. 28, No. 4, February 2010, which is hereby incorporated by reference in its entirety, discloses a double-alpha profile. However, this profile was set up to simulate manufacturing defects in the optical fiber. The continuity of the first derivative of this profile is not ensured and leads to poor DMD performances.

Graded-index multimode optical fibers are typically dedicated to high-speed data communications. They efficiently utilize low-cost high-speed sources based on VCSEL technology. Because these sources are divergent, multimode optical fibers are typically designed to provide a large numerical aperture—larger numerical apertures are generally better. Typical 50-micron-core multimode optical fibers dedicated to high-speed transmissions exhibit numerical apertures around 0.200.

Emerging optical-fiber applications like supercomputer or consumer electronic devices require additional flexibility that can be provided by an even larger numerical aperture. That said, conventionally a large numerical aperture generally leads to modal bandwidth degradation. Therefore, a need exists for a multimode optical fiber with high modal bandwidth and large numerical aperture.

Moreover, depending on applications, optical fibers with larger core size than a standard 50-micron core (e.g., an 80-micron core) may be used. Therefore, a need also exists for a multimode optical fiber having a large numerical aperture with high modal bandwidth regardless of core size, particular when the core size is increased beyond the standard 50-micron core.

SUMMARY

Accordingly, in one aspect, the present invention embraces a multimode optical fiber that includes a central core surrounded by an outer cladding. The central core has a graded-index profile n(r) with a delta $\Delta$ value of about 1.9 percent or greater. The delta $\Delta$ value is defined by the following equation:

$$\Delta = \frac{(n_0^2 - n_{cl}^2)}{2n_0^2}$$

where $n_0$ is the central core's maximum refractive index value and $n_{cl}$ is the central core's minimum refractive index value. The central core's graded-index profile n(r) has at least two different alpha parameter values $\alpha_1$ and $\alpha_2$ along the central core's radius. The first alpha parameter value $\alpha_1$ applies to an inner portion of the central core, and the second alpha parameter value $\alpha_2$ applies to an outer portion of the central core. Additionally, the central core's graded-index profile n(r) and its first derivative dn(r)/dr are continuous over the width of the central core.

In an exemplary embodiment, at a wavelength of 850 nanometers, the multimode optical fiber has an effective modal bandwidth (EMB) of about 1000 MHz·km or greater (e.g., about 2000 MHz·km or greater, or even about 3000 MHz·km or greater).

In another exemplary embodiment, at a wavelength of 850 nanometers, the multimode optical fiber has an overfilled launch bandwidth (OFL-BW) of about 1000 MHz·km or greater (e.g., about 1500 MHz·km or greater, or even about 3000 MHz·km or greater).

In yet another exemplary embodiment, the central core's graded-index profile n(r) is defined by the following power equation:

$$n(r) = \begin{cases} n_1 \cdot \sqrt{1 - 2 \cdot \Delta_1 \cdot \left(\frac{r}{a}\right)^{\alpha_1}} & 0 \le r \le r_t \\ n_2 \cdot \sqrt{1 - 2 \cdot \Delta_2 \cdot \left(\frac{r}{a}\right)^{\alpha_2}} & r_t \le r \le a \\ n_{cl}(r) & a < r, \end{cases}$$

where a is the central core's outer radius, $r_t$ is the transition radius defining the inner and outer zones of the central core, $$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}},$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1},$$

$$n_1 = \frac{n_{cl}}{\sqrt{1 - 2\Delta}}, \text{ and}$$

$$n_2 = n_{cl} \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left((\alpha_1 - \alpha_2) \cdot \left(\frac{r_t}{a}\right)^{\alpha_2} - \alpha_1\right)}}.$$

In yet another exemplary embodiment, the central core's graded-index profile n(r) has a first alpha parameter $\alpha_1$ of between about 2.05 and 2.10, and the second alpha parameter $\alpha_2$ is at least 0.04 less than the first alpha parameter $\alpha_1$ (i.e., $\alpha_1 > \alpha_2 + 0.04$). The ratio $r_t/a$ of (i) the transition radius $r_t$ that defines the inner and outer zones of the central core to (ii) the central core's outer radius a is between about 0.5 and 0.7.

In yet another exemplary embodiment, the central core has a diameter of about 50 microns.

In yet another exemplary embodiment, the central core has a diameter of about 50 microns, and at a wavelength of 850 nanometers, the multimode optical fiber has a DMD value on the outer mask 0-23 microns of about 0.40 ps/m or less (e.g., about 0.20 ps/m or less, or even about 0.14 ps/m or less).

In yet another exemplary embodiment, the central core has a diameter of about 80 microns.

In yet another exemplary embodiment, the central core has a diameter of about 80 microns, and at a wavelength of 850 nanometers, the multimode optical fiber has a DMD value on the outer mask 0-37 microns of about 0.40 ps/m or less (e.g., about 0.20 ps/m or less, or even about 0.14 ps/m or less).

In yet another exemplary embodiment, the central core has a diameter of about 62.5 microns.

In yet another exemplary embodiment, the central core has a diameter of about 62.5 microns, and at a wavelength of 850 nanometers, the multimode optical fiber has a DMD value on the outer mask 0-29 microns of about 0.40 ps/m or less (e.g., about 0.20 ps/m or less, or even about 0.14 ps/m or less).

In yet another exemplary embodiment, the optical fiber includes a depressed-index inner cladding positioned between the central core and the outer cladding.

In yet another exemplary embodiment, the optical fiber includes a step cladding positioned between the central core and the outer cladding and a depressed-index inner cladding positioned between the step cladding and the outer cladding.

In another aspect, the present invention embraces a multimode optical system that includes an optical fiber in accordance with the foregoing.

In an exemplary embodiment, the multimode optical system is a Local Area Network.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 11 provides the weight functions used to calculate the calculated effective modal bandwidth (EMBc) for 62.5-micron core and 80-micron core multimode optical fibers.

DETAILED DESCRIPTION

The present invention embraces a multimode optical fiber with high modal bandwidth and large numerical aperture. Numerical aperture NA can be calculated using the following equation:

$$NA = n_0\sqrt{2\Delta} \quad \text{(Equation 3)}$$

where:
$n_0$ is the maximum refractive index of the optical fiber's core; and
$\Delta$ is defined by Equation 2.

Conventional 50-micron core multimode optical fibers have the following characteristics: $\Delta=0.01$; a=25 microns; $\alpha\approx2$; and a numerical aperture NA of about 0.2.

It has already been proposed to tune the value $\alpha$ for multimode optical fibers following the well-known power law Equation 1 to maximize the effective modal bandwidth. However, this conventional solution provides limited minimum effective modal bandwidth, particularly when $\Delta$ is greater than 0.01 (e.g., 0.019).

Figure 1A:
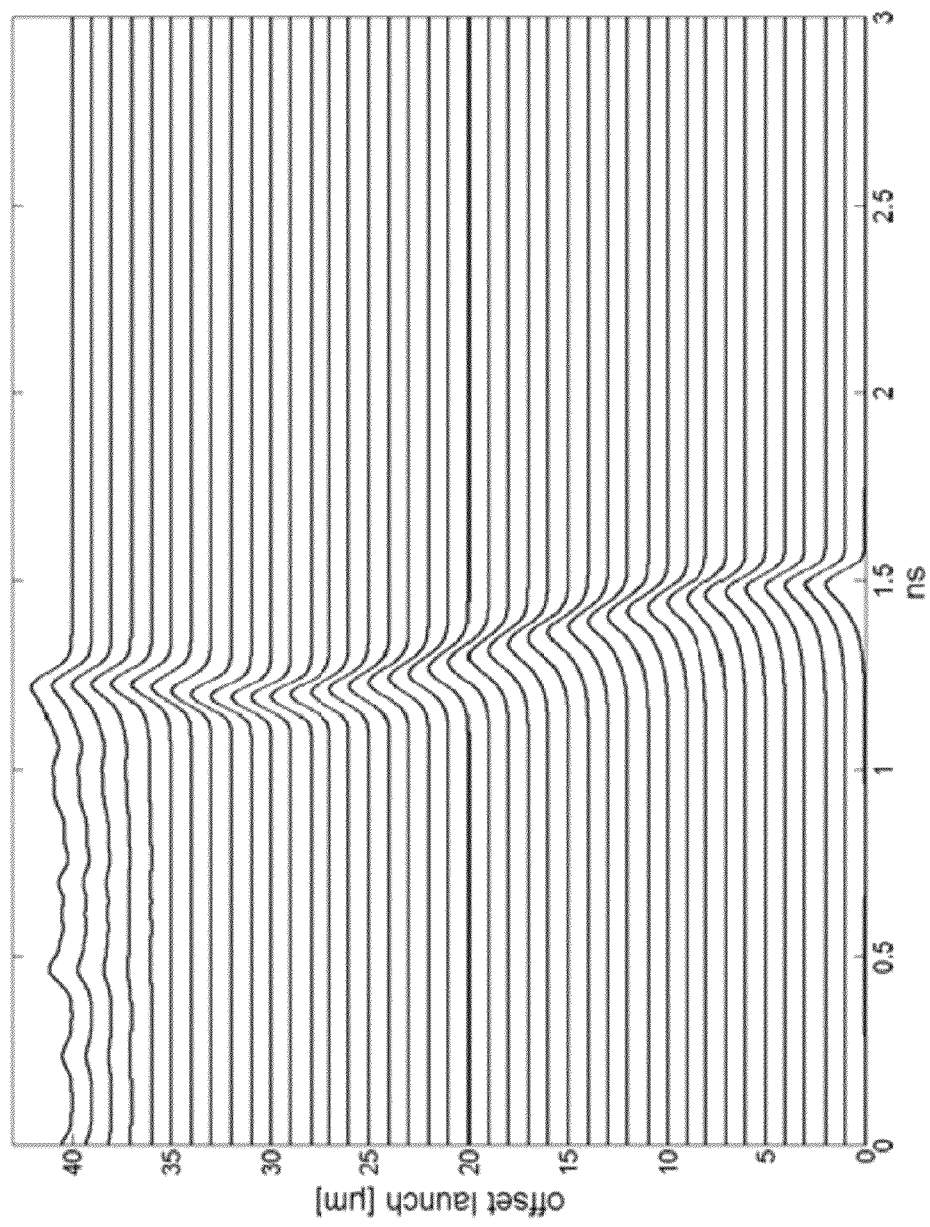
FIGS. 1A, 1B, and 1C graphically depict DMD plots of an 80-micron core multimode optical fiber having a delta value of 2.04 percent that provides a numerical aperture of about 0.3 for three different values of alpha.
Figure 1B:
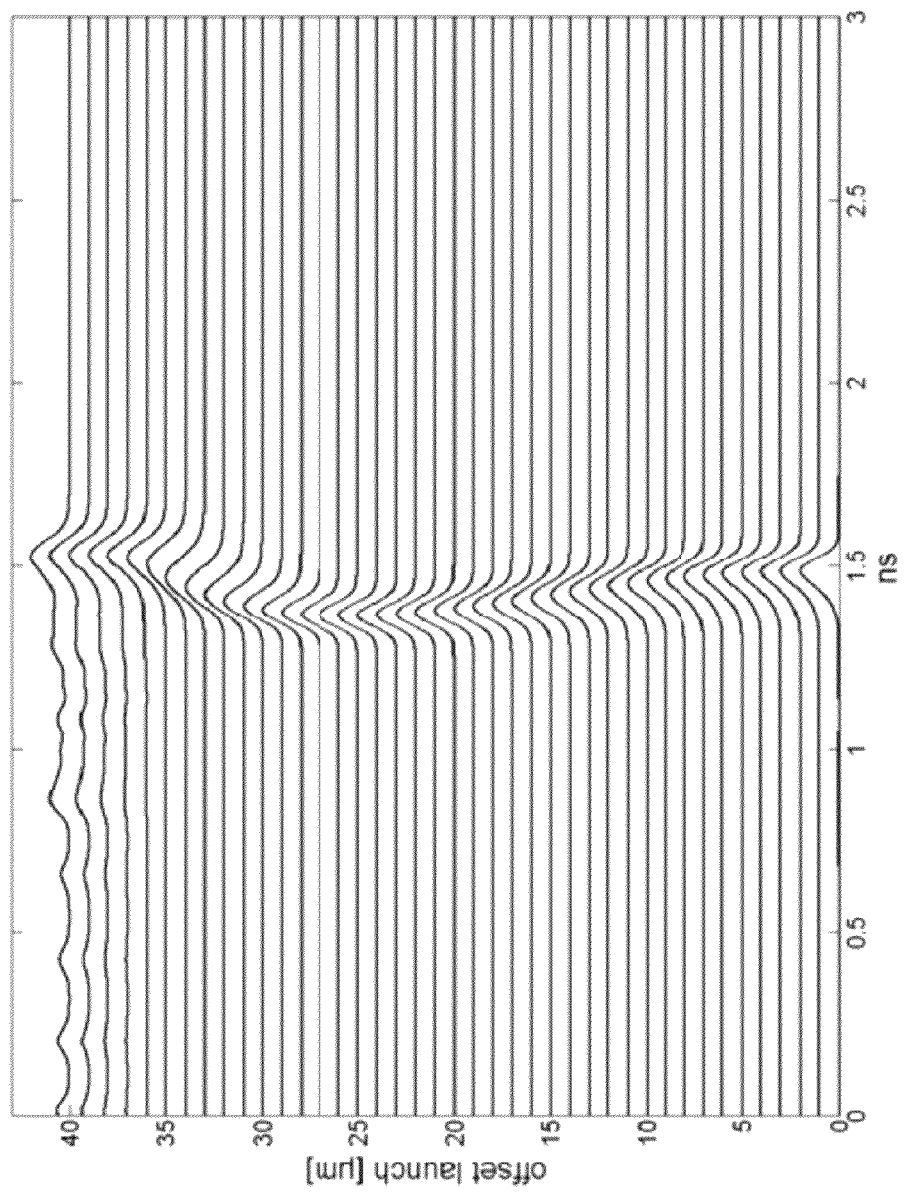
Figure 1C:
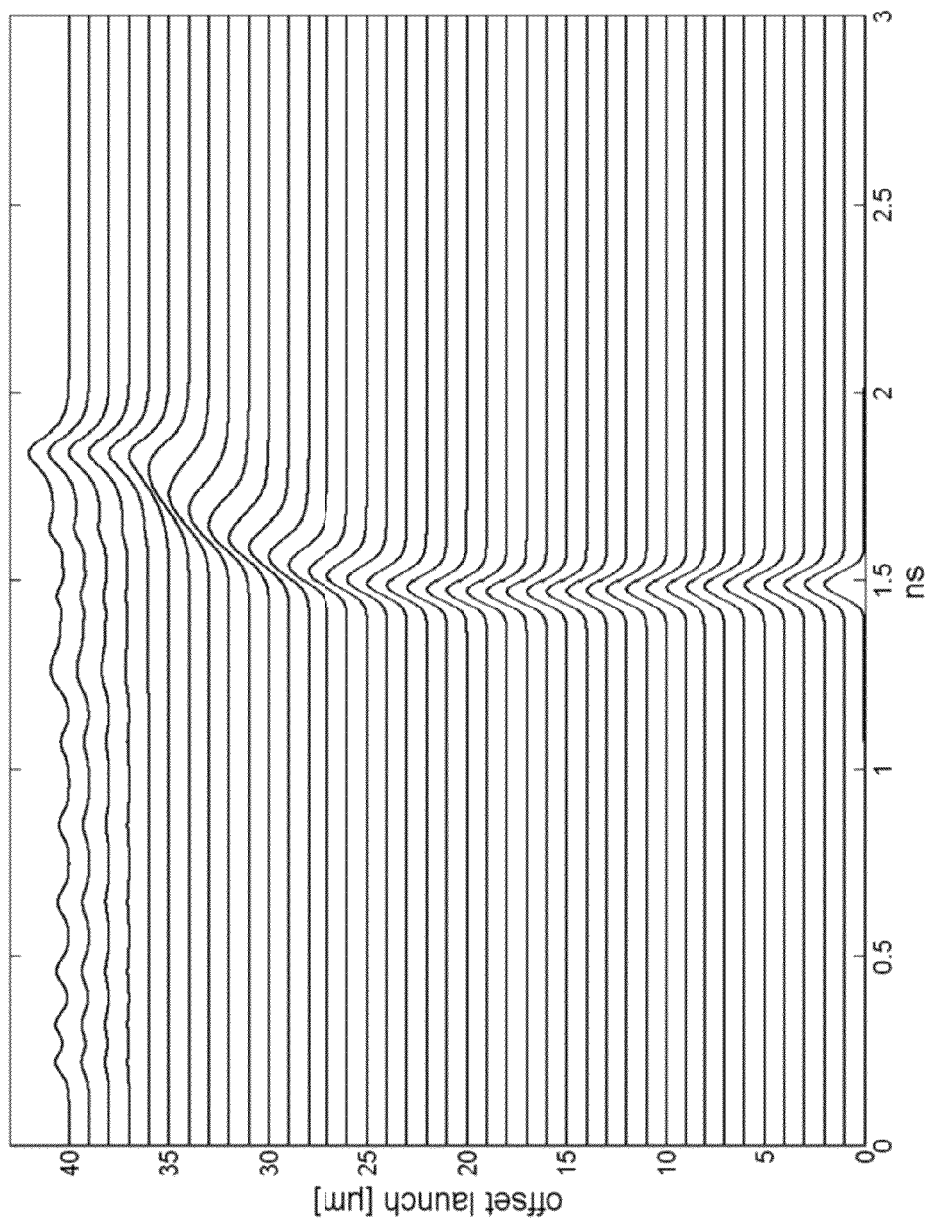

FIGS. 1A, 1B, and 1C graphically depict DMD plots of an 80-micron core multimode optical fiber having a delta value of 2.04 percent that provides a numerical aperture of about 0.3 for three different values of alpha. The graded-index core follows Equation 1. FIGS. 1A, 1B, and 1C, respectively, depict the expected DMD plots for 750 meters of optical fiber for a=2.04, a=2.06, and a=2.08. It can be seen from these plots that modal dispersion typically cannot be compensated simply by tuning the value $\alpha$ for optical fibers having a high numerical aperture. Indeed, the delay is not constant throughout the core radius whatever the value of $\alpha$. From these DMD plots, made according to FOTP-220, it is possible to compute effective modal bandwidths using weight functions.

Figure 2:
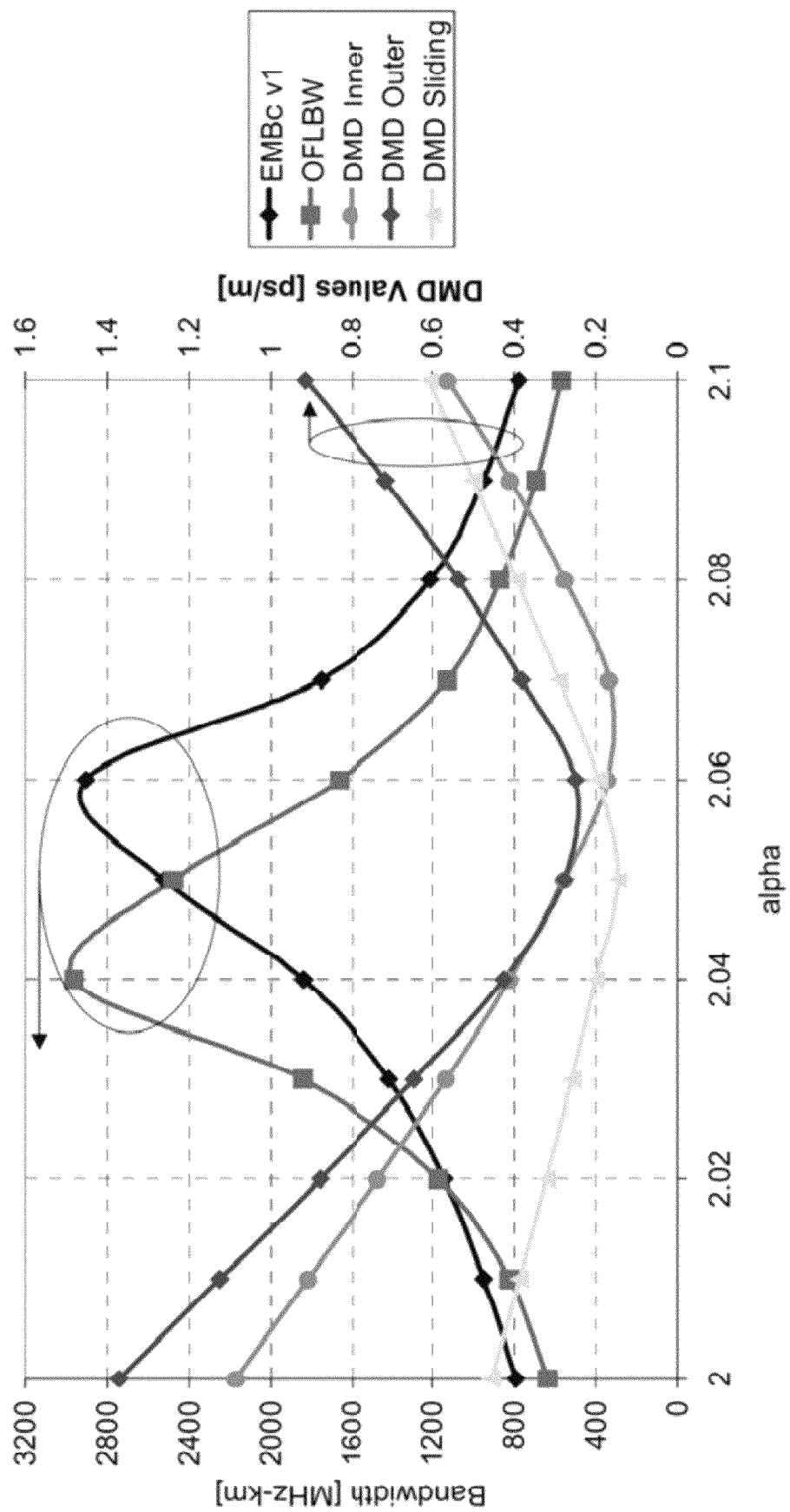
FIG. 2 graphically depicts DMD values, the minimum calculated effective modal bandwidth (EMBc) and the overfilled launch bandwidth (OFL-BW) for multimode optical fiber having a graded-index core following Equation 1 with a delta ($\Delta$) value of 2.04 percent.

FIG. 2 graphically depicts DMD values, the minimum calculated effective modal bandwidth (EMBc), and the overfilled launch bandwidth (OFL-BW) for multimode optical fiber having a graded-index core following Equation 1 with a delta (A) value of 2.04 percent. As shown, the DMD values are over 0.15 ps/m for each of the alpha parameter values. Such high DMD values reduce the effective modal bandwidth (EMBc) and overfilled launch bandwidth (OFL-BW). Moreover, for a given value of alpha providing the highest EMBc, the OFL-BW is low and vice-versa. A multimode optical fiber having a high numerical aperture with a graded-index core following Equation 1 thus has limited bandwidths both in effective modal bandwidth (EMBc) and overfilled launch bandwidth (OFL-BW). Applications for such a multimode optical fiber are therefore limited.

As noted, the present invention embraces a multimode optical fiber with high modal bandwidth and large numerical aperture. To this end, exemplary optical fibers have a large numerical aperture and include a central core that follows a modified power-law equation with an exponent alpha (e.g., an alpha parameter) that depends on radial position within the optical fiber. The exponent alpha has at least two different values along the central core's radius. A first alpha parameter value $\alpha_1$ controls shape of the graded index in an inner—or central—zone of the central core. Similarly, a second alpha parameter value $\alpha_2$ controls the shape of the graded-index in an outer—or peripheral—zone of the central core. Thus, the alpha parameter may be a function $\alpha(r)$ of the radial distance r from the center of the optical fiber. The alpha parameter values or alpha parameter function $\alpha(r)$ control the graded-index central core to achieve a multimode optical fiber that exhibits a DMD profile having a substantially constant delay over the entire central core (i.e., a low intermodal dispersion). Thus, the calculated effective modal bandwidth EMBc is high.

The multimode optical fiber includes a central core having a graded-index profile n(r) surrounded by an outer cladding (e.g., an external cladding or an outer optical cladding). For reasons of cost, the outer optical cladding is typically made of natural silica, but it may also be made of doped silica. In exemplary embodiments, the optical fiber might include an intermediate cladding positioned between the central core and the outer cladding. The intermediate cladding may have a constant refractive index. Alternatively, the intermediate cladding may include a number of cladding layers, such as step claddings, inner claddings, rings, and/or depressed trenches. For example, European Patent Publication No. 0131729 and International Publication No. WO 2008/08581, each of which is hereby incorporated by reference in its entirety, describe multimode optical fibers that include depressed trenches.

In exemplary embodiments, the central core's graded-index profile has a delta $\Delta$ value of 1.9 percent or more. The delta $\Delta$ value is typically determined using Equation 2. Such delta values facilitate the achievement of numerical apertures of 0.28 or more (e.g., as calculated using Equation 3 and an $n_0$ value of 1.45). In this regard, the central core's minimum and maximum refractive index values typically ensure a large numerical aperture. Furthermore, the central core's graded-index profile produces exemplary optical fibers exhibiting high EMB and OFL-BW.

In this regard, an exemplary optical fiber's central core has a graded-index profile that follows a power equation n(r) with at least two different values of exponent along the core radius, a first alpha value $\alpha_1$ in an inner zone of the core and a second alpha value $\alpha_2$ in an outer zone of the core. The second value $\alpha_2$ of exponent is typically less than the first value $\alpha_1$ of exponent. Thus, the exemplary optical fiber's refractive index is greater throughout the central core's outer zone in comparison with a conventional, graded-index multimode optical fiber.

In exemplary embodiments, the central core's graded-index profile n(r) is defined by the following power equation:

$$n(r) = \begin{cases} n_1 \cdot \sqrt{1 - 2\Delta_1 \cdot \left(\frac{r}{a}\right)^{\alpha_1}} & 0 \le r \le r_t \\ n_2 \cdot \sqrt{1 - 2 \cdot \Delta_2 \cdot \left(\frac{r}{a}\right)^{\alpha_2}} & r_t \le r \le a \\ n_{cl}(r) & a < r, \end{cases} \quad \text{(Equation 4)}$$

where a is the central core's outer radius, and $r_t$ is the transition radius defining the inner and outer zones of the central core.

The values of $\Delta_1$, $\Delta_2$, $n_1$ and $n_2$ in Equation 4 ensure that the central core's graded-index profile n(r) and its first derivative dn(r)/dr are substantially continuous over the entire graded-index core (i.e., from the center of the central core to its outer radius a). This provides fewer modal perturbations and ensures higher bandwidth.

In particular exemplary embodiments, $\Delta_1$, $\Delta_2$, $n_1$ and $n_2$ are defined by the following equations:

$$\Delta_1 = \frac{\alpha_2 \Delta \left(\frac{r_t}{a}\right)^{\alpha_2-\alpha_1}}{\alpha_1 + (\alpha_2 - \alpha_1)\left(\frac{r_t}{a}\right)^{\alpha_2}} \quad \text{(Equation 5)}$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1} \quad \text{(Equation 6)}$$

$$n_1 = \frac{n_{cl}}{\sqrt{1 - 2\Delta}} \quad \text{(Equation 7)}$$

$$n_2 = n_{cl} \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left((\alpha_1 - \alpha_2) \cdot \left(\frac{r_t}{a}\right)^{\alpha_2} - \alpha_1\right)}} \quad \text{(Equation 8)}$$

In a standard multimode optical fiber with a graded-index profile according to Equation 1, the highest order modes typically exhibit a slower group velocity than others, leading to a DMD plot bent to the right for largest offset launches. In exemplary optical fibers according to the present invention, the refractive index at the outer part of the core is increased compared with a graded-index standard profile. This increase in refractive index at the outer part of the graded-index core offsets the highest order modes from the center of the core by relaxing their guidance. This offset by relaxing causes the highest order modes to propagate through or "see" a lower refractive index leading to a smaller modal delay and a slightly higher group velocity. Increasing the refractive index at the outer part of the graded-index core would seem to reduce the group velocity of the higher order modes, thereby increasing intermodal dispersion. The relaxed guidance of the higher order modes, however, actually increases the group velocity of the higher order modes and reduces intermodal dispersion.

Lowering the second value of alpha $\alpha_2$ with respect to the first value of alpha $\alpha_1$, while maintaining the continuity of the graded-index profile n(r) and its first derivative dn(r)/dr, leads to a refractive index increase in the outer part of the central core. The modal dispersion can be minimized efficiently by tuning the alpha values and the transition radius $r_t$ between the two regions defined by the different alpha values. In this regard, twin alpha-profiles preserve the benefits of the alpha-profile shape, namely maintaining mode group structure and achieving low modal dispersion levels.

Figure 3A:
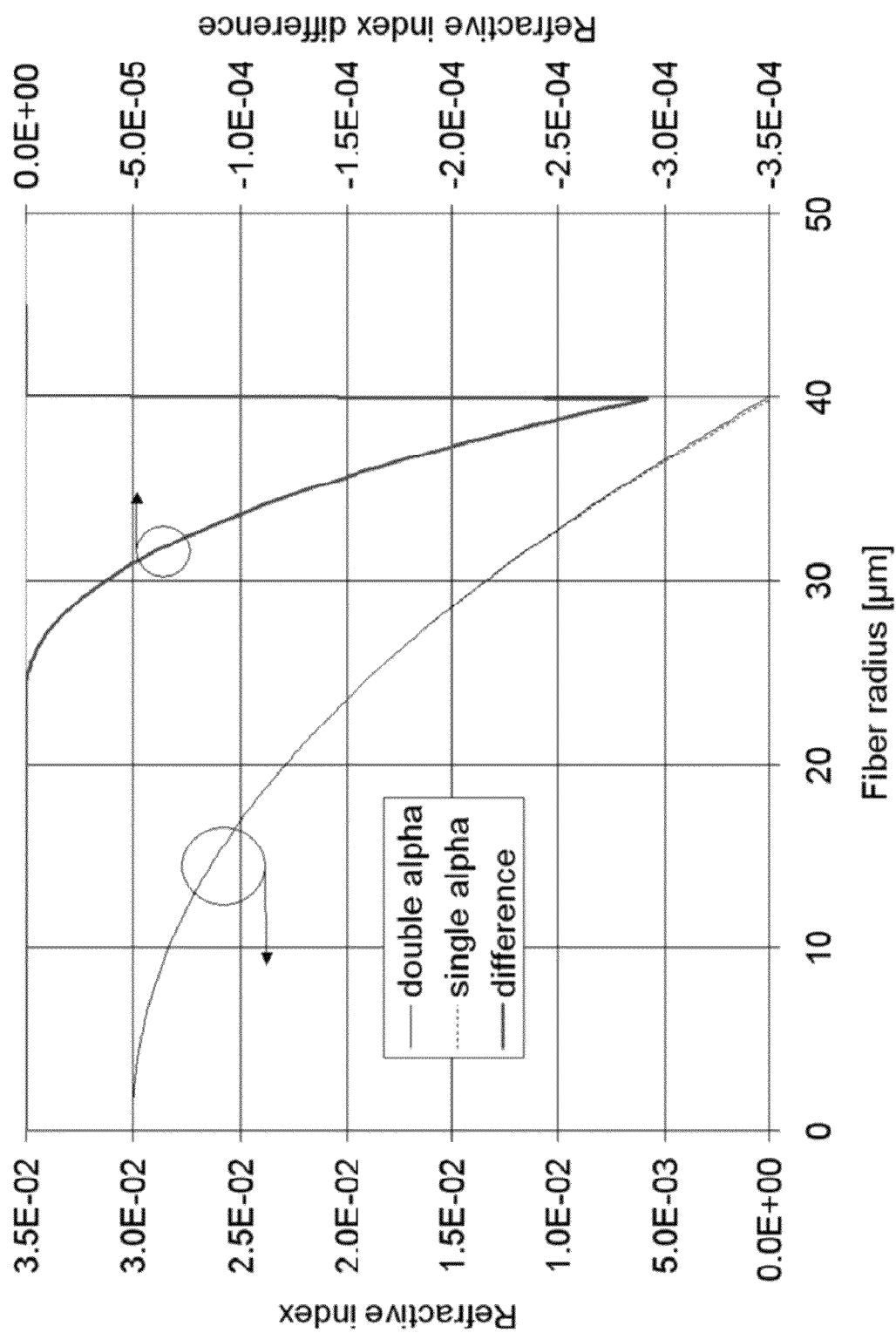
FIG. 3A graphically depicts the refractive index profiles of an exemplary 80-micron core optical fiber according to the present invention and a comparative 80-micron core optical fiber.
Figure 3B:
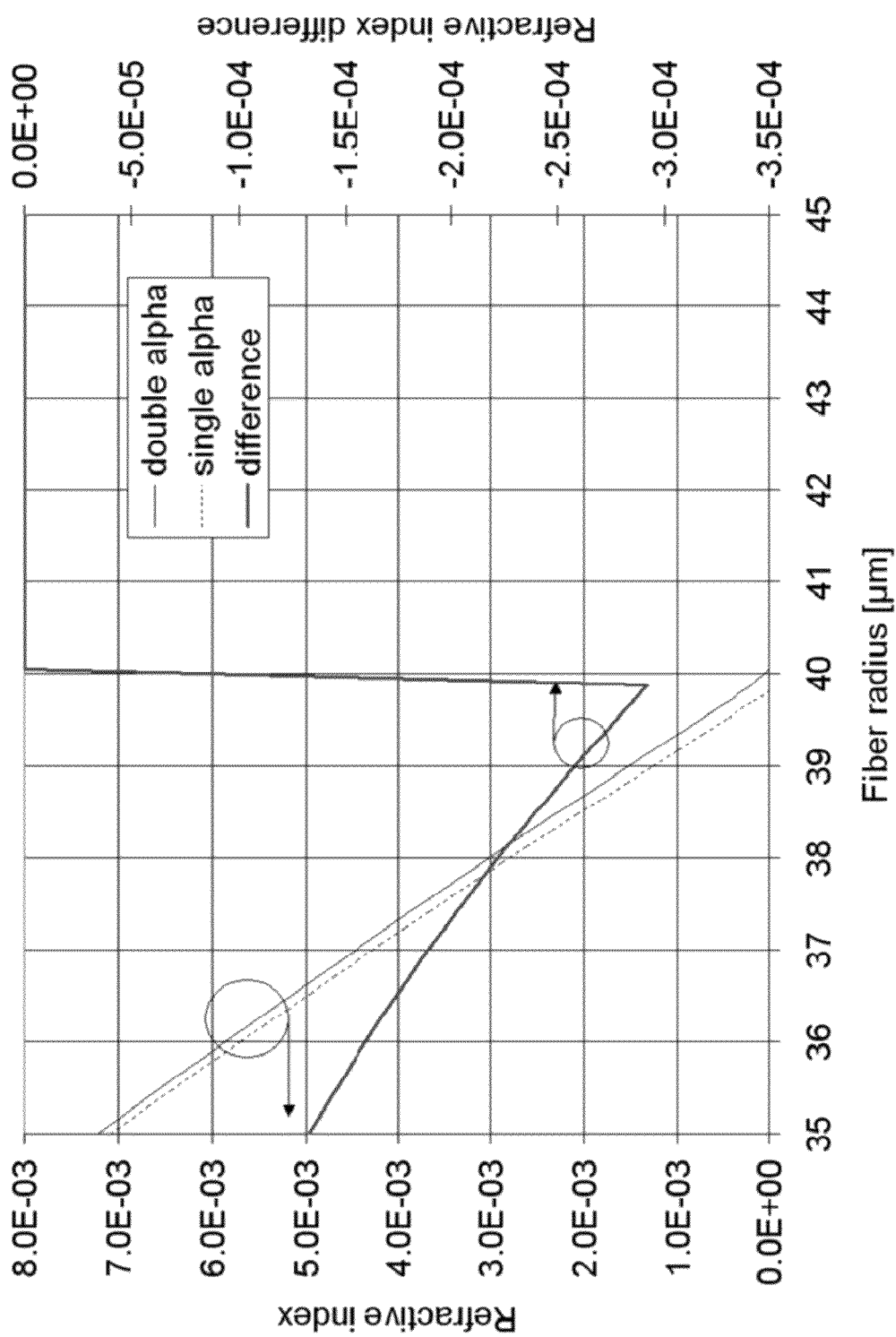
FIG. 3B graphically depicts a portion of the refractive index profiles of FIG. 3A in more detail.

FIG. 3A graphically depicts the refractive index profiles of a prophetic exemplary 80-micron core optical fiber according to the present invention and a prophetic comparative 80-micron core optical fiber. FIG. 3B graphically depicts a portion of the refractive index profiles of FIG. 3A in more detail. In particular, FIG. 3B depicts a zoomed view, or close-up view, of the outer zone of the cores of the optical fibers in FIG. 3A. As noted, refractive index profiles, such as in FIGS. 3A and 3B, are generally representative of the optical fiber's theoretical or set profile.

The exemplary optical fiber of FIGS. 3A and 3B includes a graded-index core profile having a first alpha value $\alpha_1$ of 2.07, a second alpha value $\alpha_2$ of 2.02, a ratio $r_t/a$ of 0.6, and a delta $\Delta$ value of 2.0 percent. The comparative optical fiber of FIGS. 3A and 3B has a graded-index core profile having a single alpha value of 2.07 (i.e., the same alpha value as the exemplary optical fiber's first alpha value $\alpha_1$) and delta $\Delta$ value of 2.0 percent. In FIGS. 3A and 3B, the left-hand y-axis provides the refractive index difference of the exemplary and comparative optical fibers with respect to pure silica. The right-hand y-axis provides the comparative optical fiber's refractive index difference with respect to the exemplary optical fiber's refractive index. FIG. 3B clearly shows that the refractive index of the optical fiber of the invention is greater throughout the central core's outer zone in comparison with a conventional, graded-index multimode optical fiber.

Figure 4A:
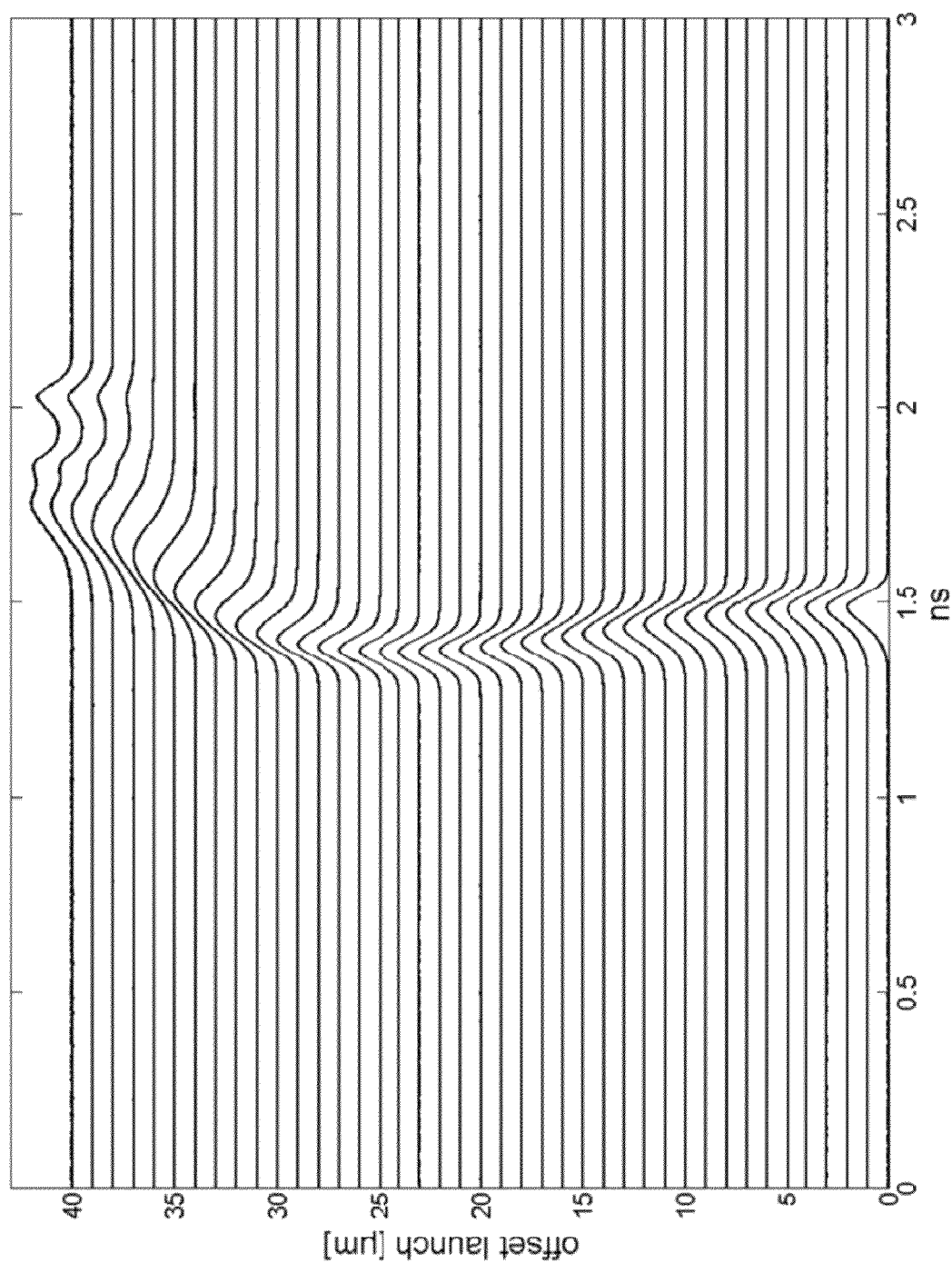
FIGS. 4A and 4B, respectively, graphically depict DMD plots of a comparative 80-micron core multimode optical fiber having a graded-index core following Equation 1 and an exemplary 80-micron core multimode optical fiber according to the present invention.
Figure 4B:
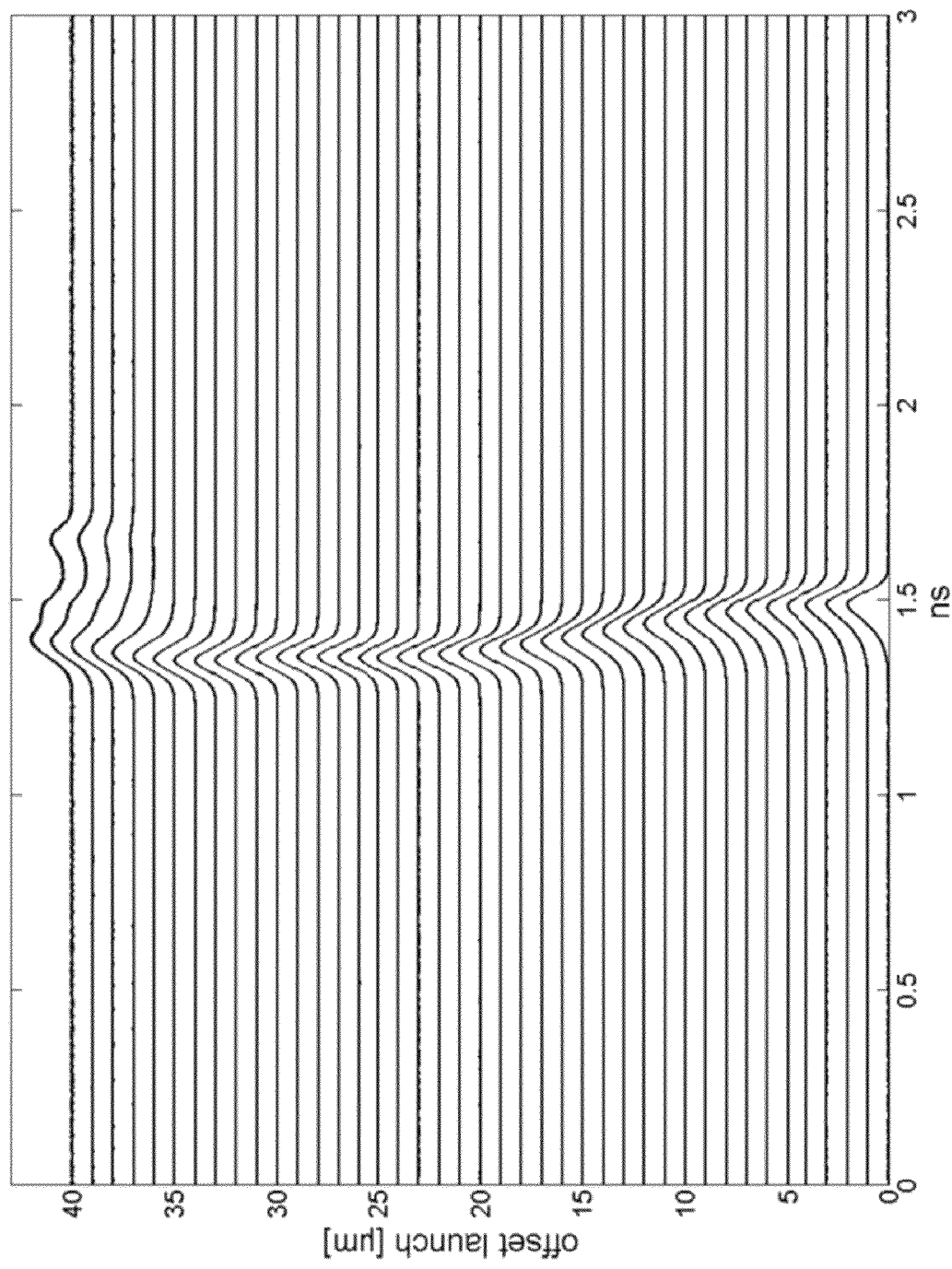

FIGS. 4A and 4B, respectively, graphically depict, for a wavelength of 850 nanometers, DMD plots of a prophetic comparative 80-micron core multimode optical fiber having a graded-index core following Equation 1 and a prophetic exemplary 80-micron core multimode optical fiber according to the present invention. As noted, refractive index profiles, such as in FIGS. 4A and 4B, are generally representative of the optical fiber's theoretical or set profile. The comparative multimode optical fiber has a standard alpha-profile with an alpha value of 2.06 and a delta value of 2.0 percent. The exemplary multimode optical fiber has a first alpha value $\alpha_1$ of 2.06, a second alpha value $\alpha_2$ of 2.01, a ratio $r_t/a$ of 0.675, and a delta $\Delta$ value of 2.0 percent. Both multimode optical fibers have constant outer claddings.

As shown in FIG. 4B, the exemplary optical fiber according to the present invention produces a DMD plot with a delay that is substantially constant over the entire central core, particularly as compared to the comparative optical fiber's DMD plot in FIG. 4A. At a wavelength of 850 nanometers, the exemplary optical fiber's DMD value on the outer mask 0-37 microns is less than 0.40 ps/m. Such a low DMD value typically ensures a high effective modal bandwidth (EMB). In particular, at a wavelength of 850 nanometers, exemplary optical fibers exhibit an EMB of more than 1000 MHz·km (e.g., more than 3000 MHz·km).

Figure 5A:
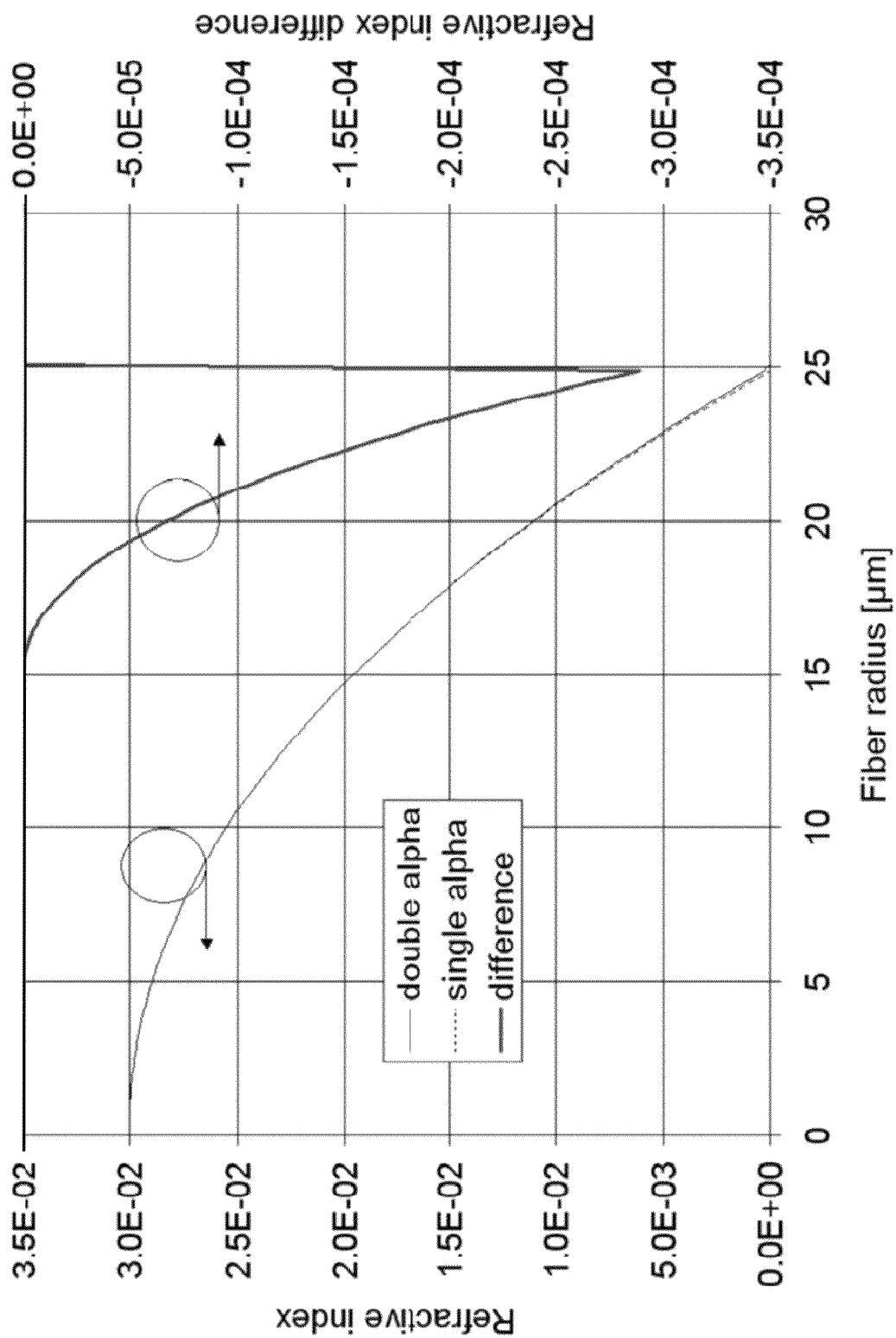
FIG. 5A graphically depicts the refractive index profiles of an exemplary 50-micron core optical fiber according to the present invention and a comparative 50-micron core optical fiber.
Figure 5B:
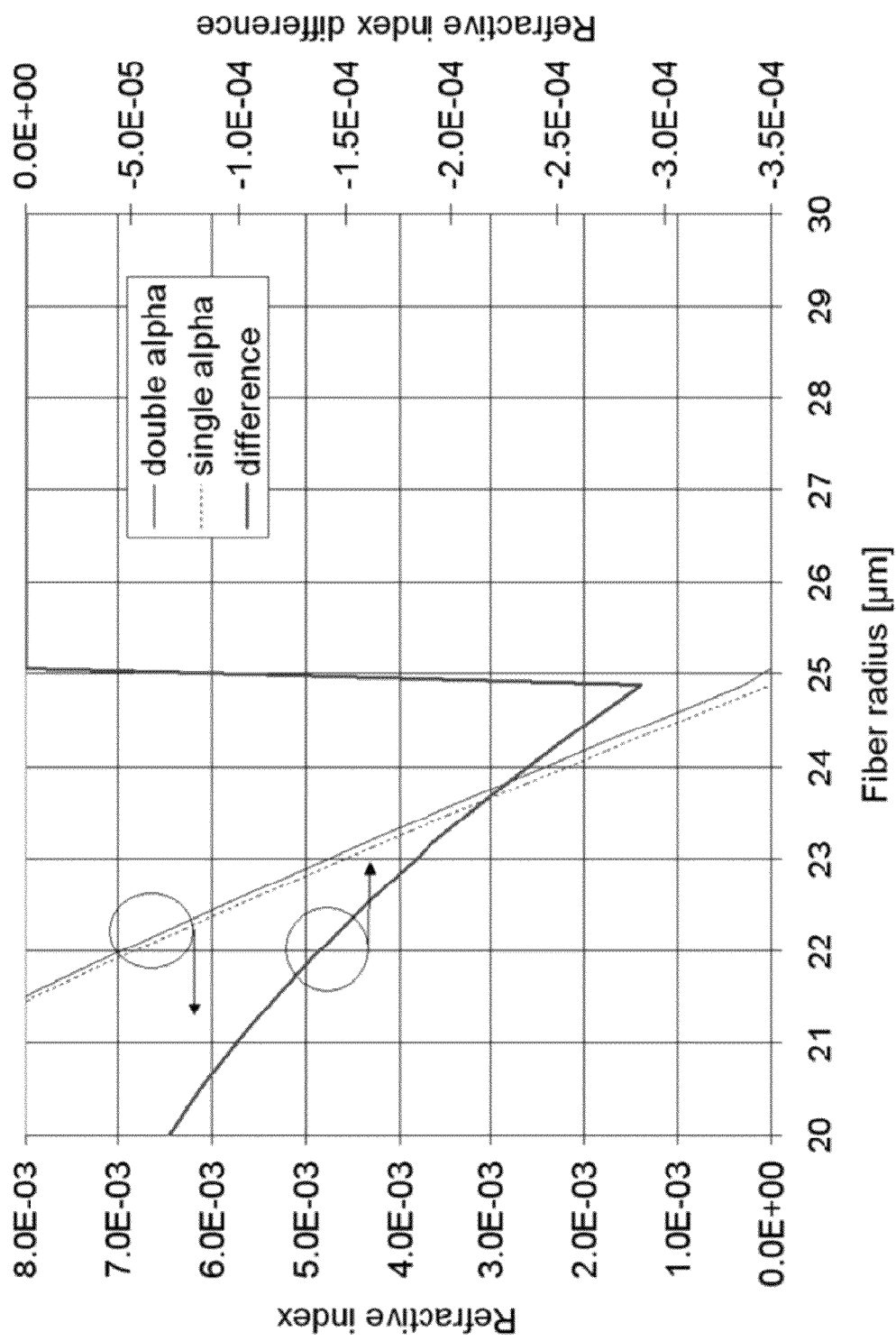
FIG. 5B graphically depicts a portion of the refractive index profiles of FIG. 5A in more detail.

FIG. 5A graphically depicts the refractive index profiles of a prophetic exemplary 50-micron core optical fiber according to the present invention and a prophetic comparative 50-micron core optical fiber. FIG. 5B graphically depicts a portion of the refractive index profiles of FIG. 5A in more detail. In particular, FIG. 5B depicts a zoomed view, or close-up view, of the outer zone of the cores of the optical fibers in FIG. 5A. As noted, refractive index profiles, such as in FIGS. 5A and 5B, are generally representative of the optical fiber's theoretical or set profile.

The exemplary optical fiber of FIGS. 5A and 5B includes a graded-index core profile having a first alpha value $\alpha_1$ of 2.07, a second alpha value $\alpha_2$ of 2.02, a ratio $r_t/a$ of 0.6, and a delta $\Delta$ value of 2.0 percent. The comparative optical fiber of FIGS. 5A and 5B has a graded-index core profile having a single alpha value of 2.07 (i.e., the same alpha value as the exemplary optical fiber's first alpha value $\alpha_1$) and delta $\Delta$ value of 2.0 percent. In FIGS. 5A and 5B, the left-hand y-axis provides the refractive index difference of the exemplary and comparative optical fibers with respect to pure silica. The right-hand y-axis provides the comparative optical fiber's refractive index difference with respect to the exemplary optical fiber's refractive index. FIG. 5B clearly shows that the refractive index of the optical fiber of the invention is greater throughout the central core's outer zone in comparison with a conventional, graded-index multimode optical fiber.

Figure 6A:
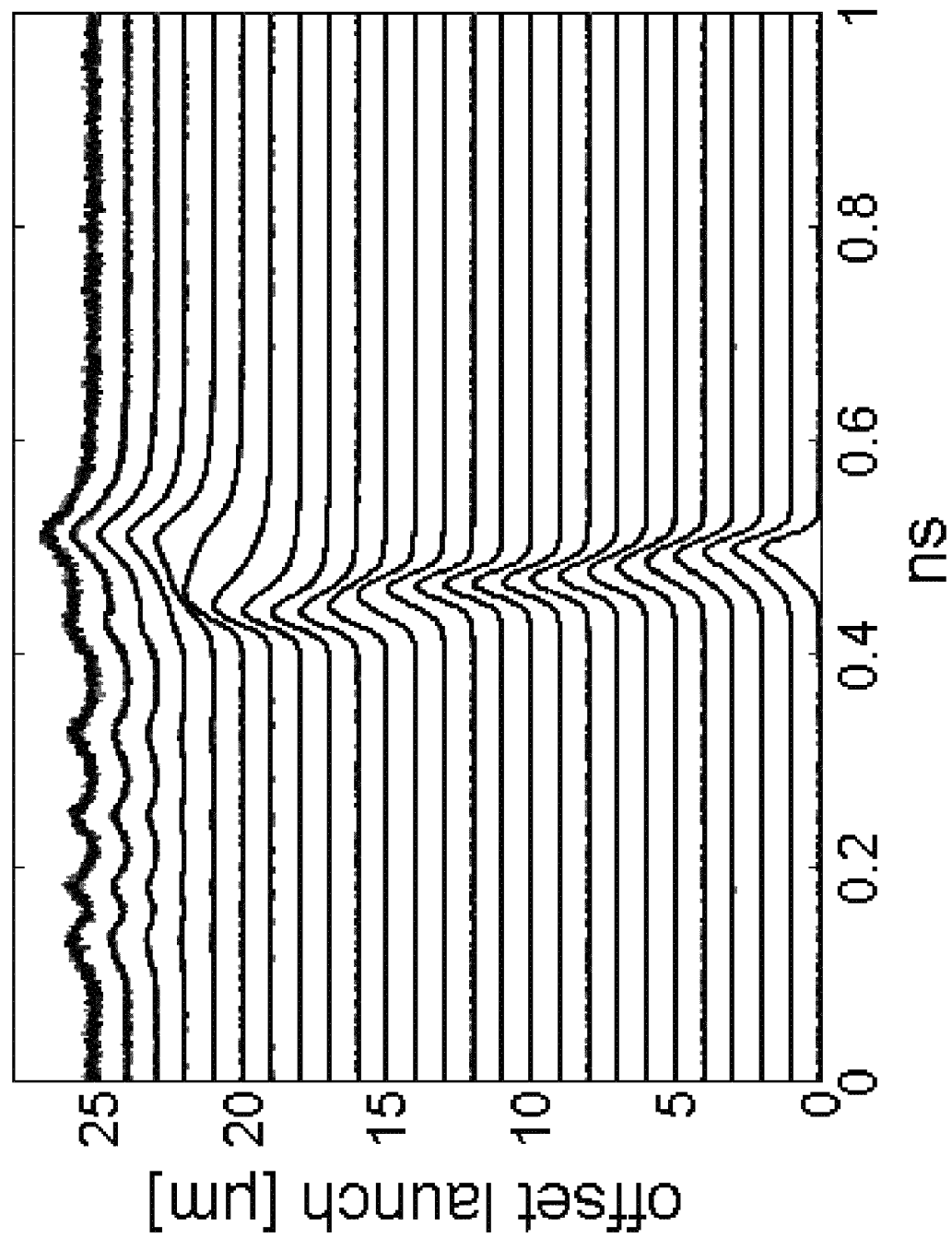
FIGS. 6A and 6B, respectively, graphically depict DMD plots of a comparative 50-micron core multimode optical fiber having a graded-index core following Equation 1 and an exemplary 50-micron core multimode optical fiber according to the present invention.
Figure 6B:
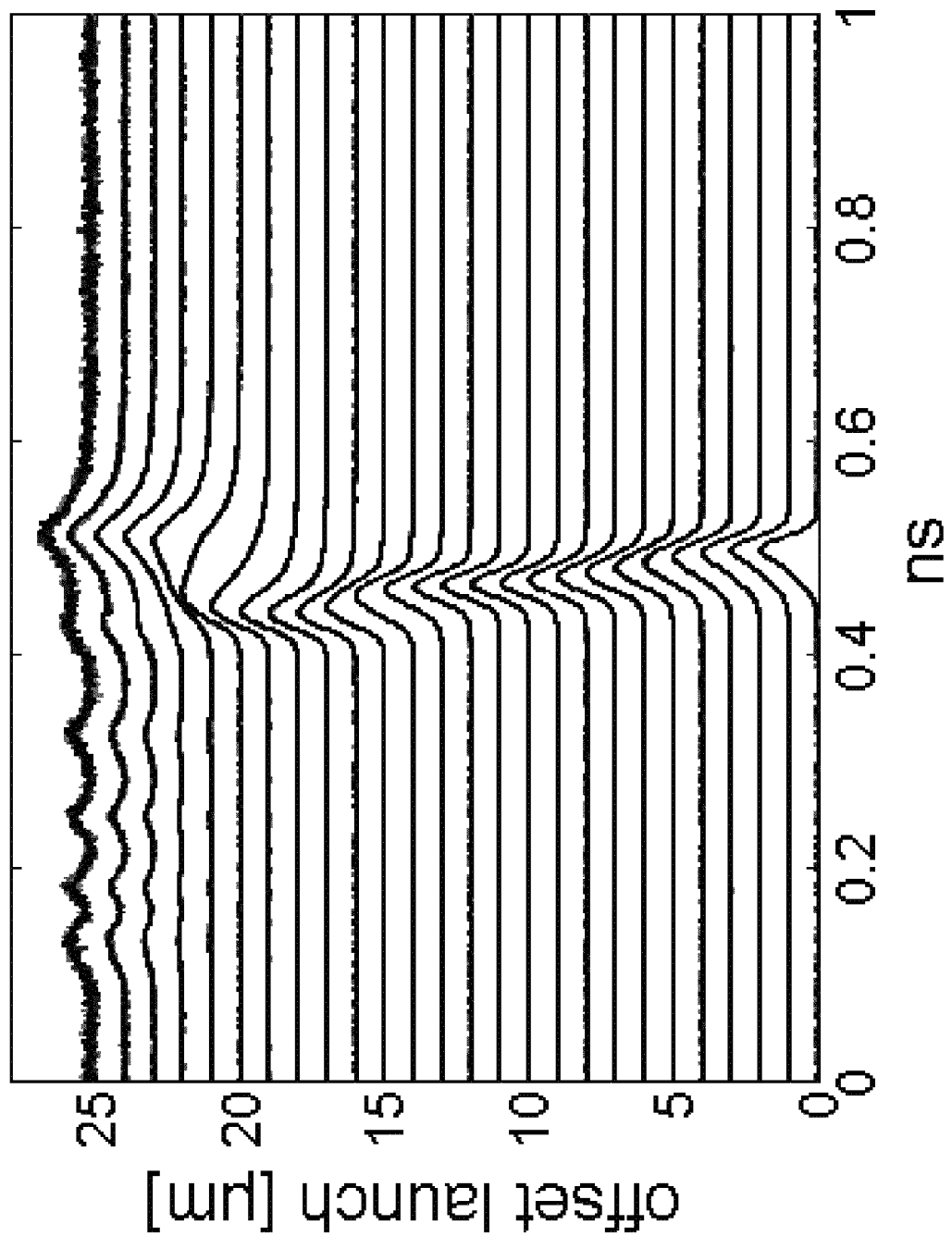

FIGS. 6A and 6B, respectively, graphically depict, for a wavelength of 850 nanometers, DMD plots of a prophetic comparative 50-micron core multimode optical fiber having a graded-index core following Equation 1 and a prophetic exemplary 50-micron core multimode optical fiber according to the present invention. The comparative multimode optical fiber has a standard alpha-profile with an alpha value of 2.06 and a delta value of 2.0 percent. The exemplary multimode optical fiber has a first alpha value $\alpha_1$ of 2.08, a second alpha value $\alpha_2$ of 2.04, a ratio $r_t/a$ of 0.5, and a delta $\Delta$ value of 2.0 percent. Both multimode optical fibers have constant outer claddings.

As shown in FIG. 6B, the exemplary optical fiber according to the present invention produces a DMD plot with a delay that is substantially constant over the entire central core, particularly as compared to the comparative optical fiber's DMD plot in FIG. 6A. At a wavelength of 850 nanometers, the exemplary optical fiber's DMD value on the outer mask 0-23 microns is less than 0.40 ps/m. Such a low DMD value typically ensures a high effective modal bandwidth (EMB). In particular, at a wavelength of 850 nanometers, exemplary optical fibers exhibit an EMB of more than 1000 MHz·km (e.g., more than 3000 MHz·km).

Table 1 (below) shows simulated fiber-profile-parameters and performance characteristics of comparative standard multimode optical fibers with a graded-index profile according to Equation 1 (i.e., a graded-index profile having a single alpha value).

TABLE 1

| delta [%] | a [μm] | Alpha | EMBc [MHz·km] | OFL [MHz·km] | $DMD_{outer}$ [ps/m] |
|---|---|---|---|---|---|
| 2.2 | 25 | 2.06 | 2818 | 1390 | 0.23 |
| 2.2 | 25 | 2.07 | 2028. | 1021 | 0.35 |
| 2.2 | 25 | 2.08 | 1332 | 747 | 0.49 |
| 2 | 31.25 | 2.06 | 2153 | 1739 | 0.20 |
| 2 | 31.25 | 2.07 | 1303 | 1120 | 0.31 |
| 2 | 31.25 | 2.08 | 996 | 841 | 0.46 |
| 2.2 | 40 | 2.07 | 1405 | 817 | 0.56 |
| 2.2 | 40 | 2.08 | 1024 | 648 | 0.73 |
| 2.2 | 40 | 2.09 | 806 | 536 | 0.93 |

The $DMD_{outer}$ values are determined according to the recommendations of the FOTP-220 standard for 50-micron core multimode optical fibers with outer masks that depend on core size. For 50-micron core optical fibers, the outer mask is 0-23 microns. The outer masks for 62.5-micron core and 80-micron core multimode optical fibers are not defined in the FOTP-220 standard, but are defined herein, respectively, as 0-29 microns and 0-37 microns.

Figure 11:
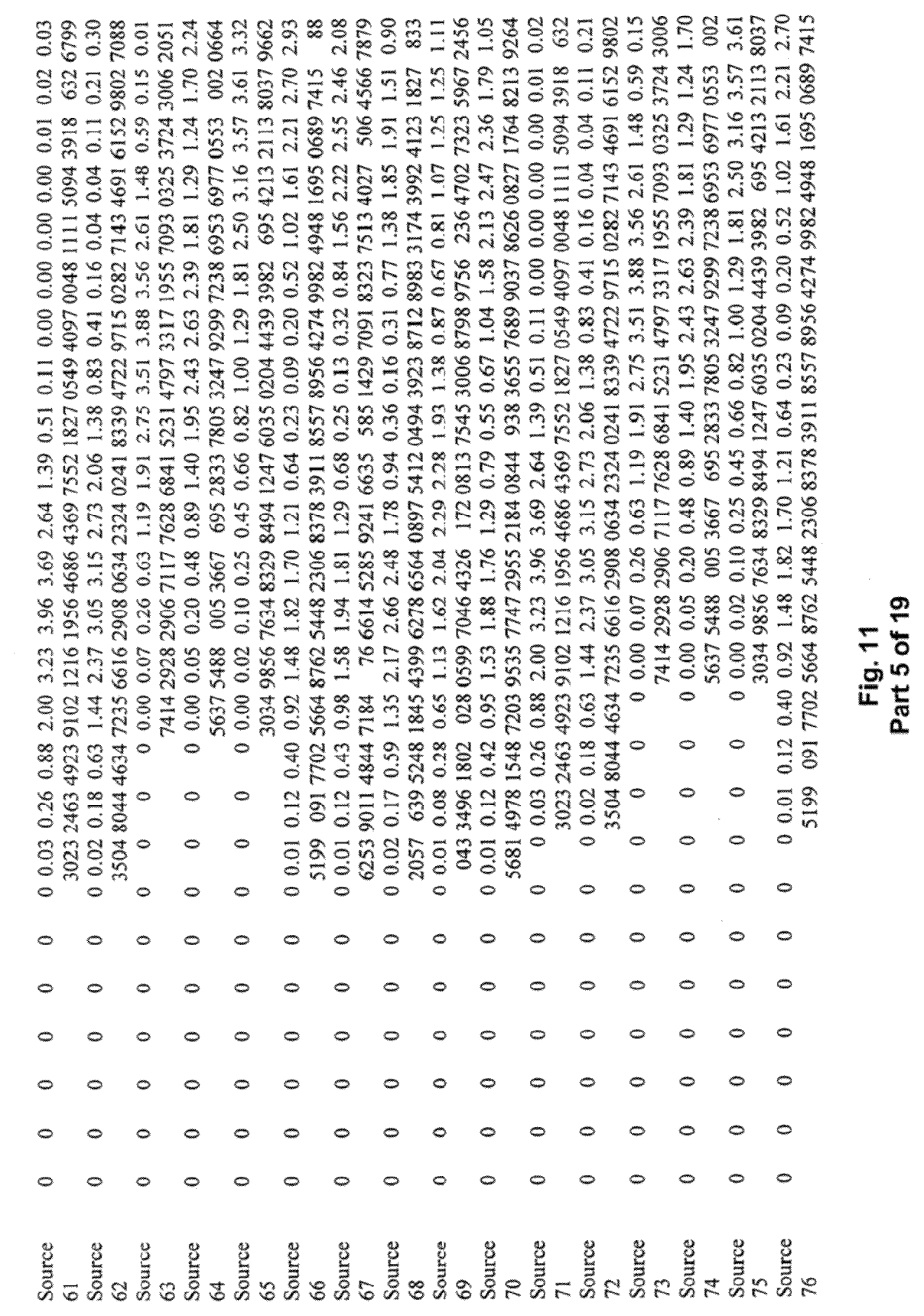
Figure 11:
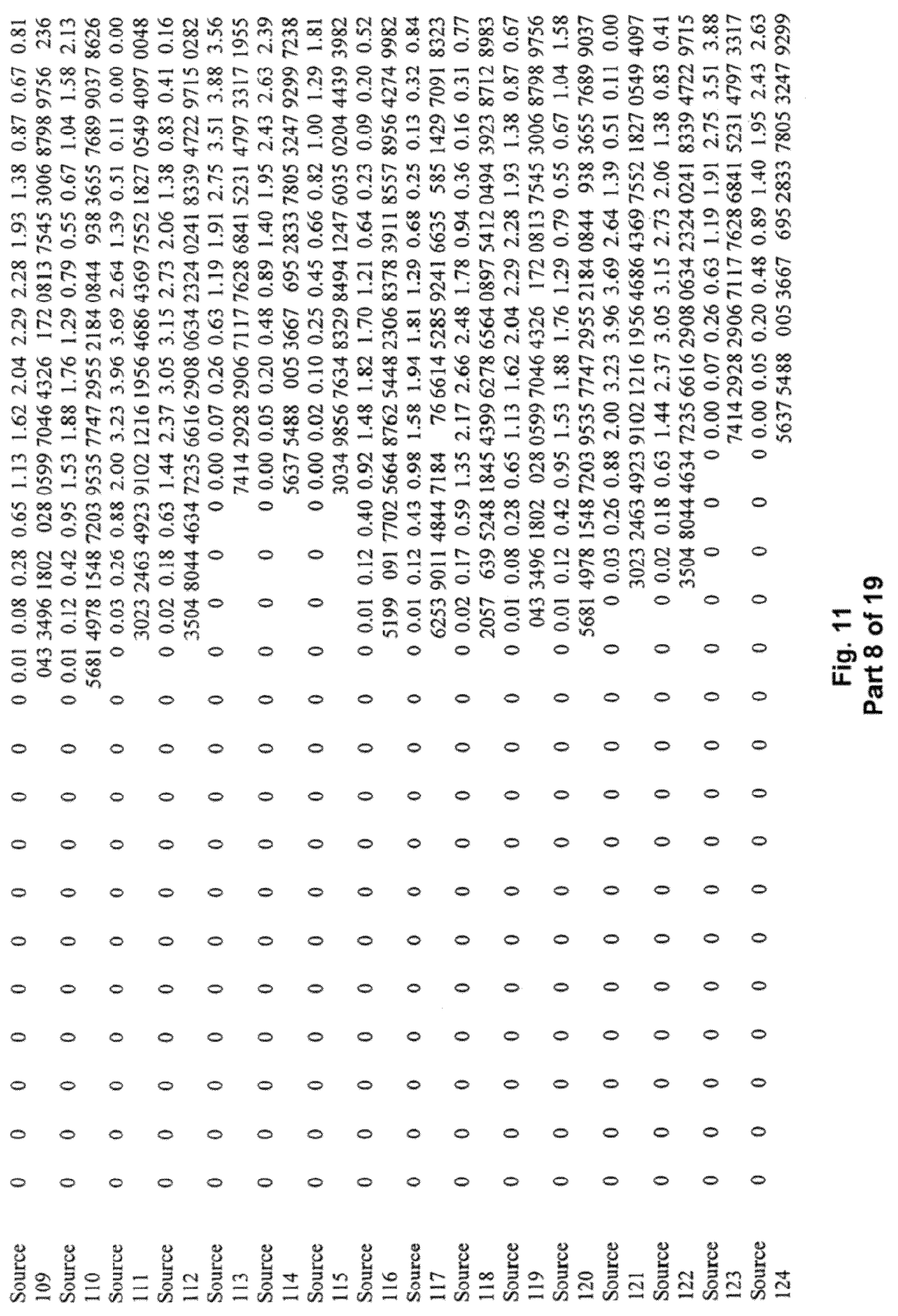
Figure 11:
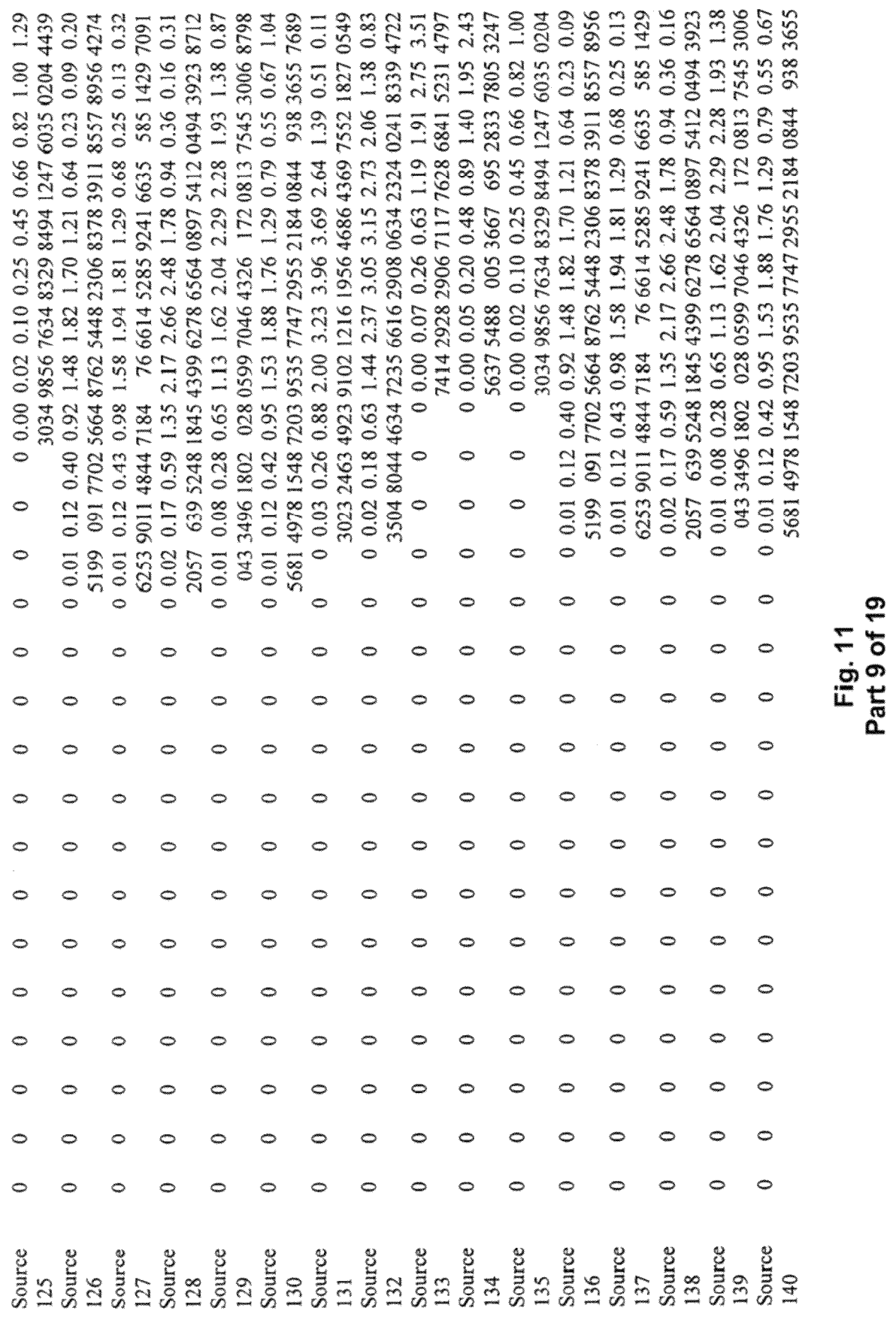
Figure 11:
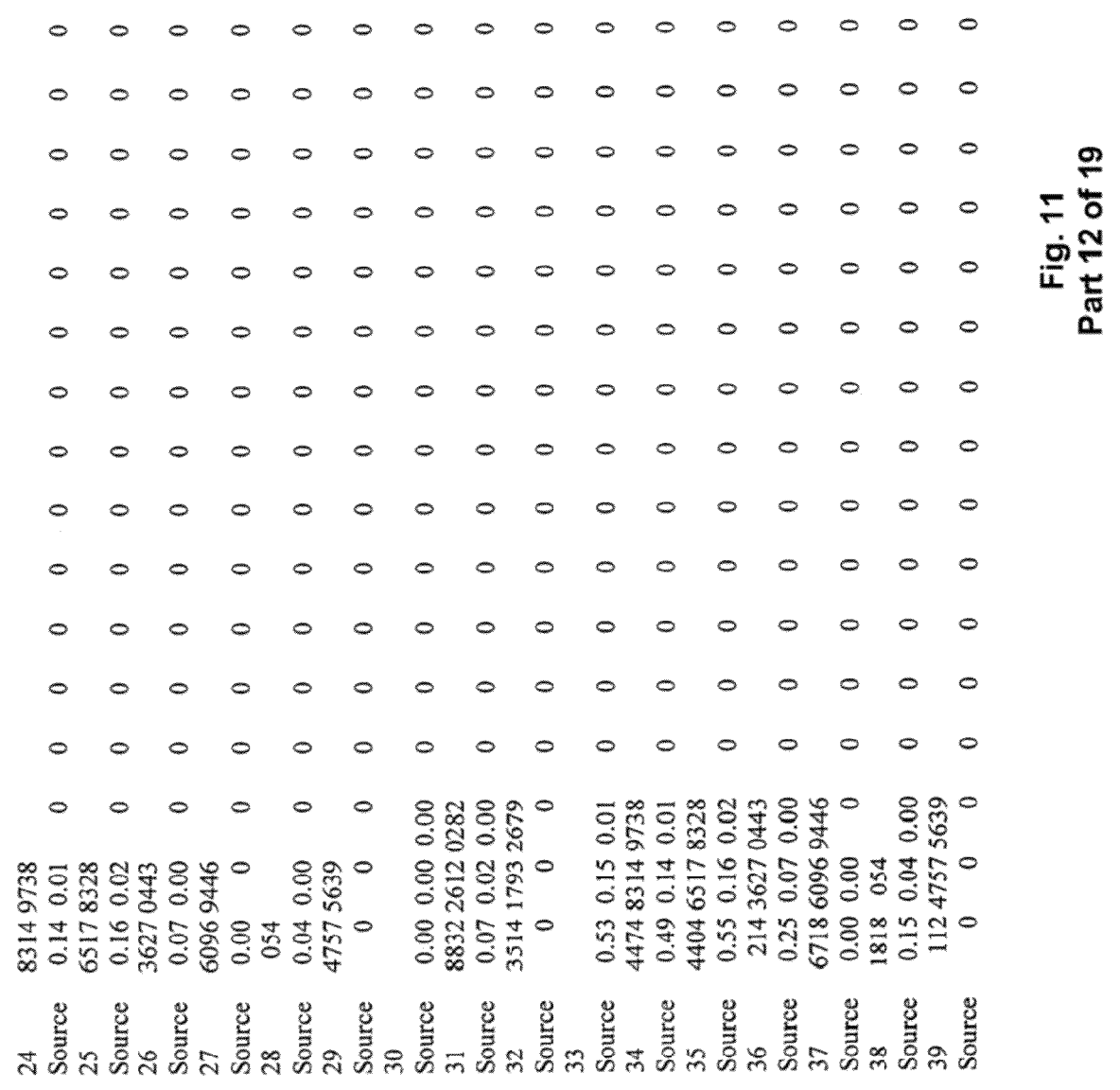

For 62.5-micron core and 80-micron core multimode optical fibers, the EMBc was computed from DMD measurements using a method similar to the recommendations of the FOTP-220 standard for 50-micron core multimode optical fibers. In particular, the EMBc was computed with a 1-micron step from radial offsets of 0-40 microns using the weight functions reported in FIG. 11.

Table 2 (below) shows simulated fiber-profile-parameters and performance characteristics of exemplary multimode optical fibers according to the present invention (e.g., in accordance with Equation 4).

TABLE 2

| Delta [%] | a [μm] | $r_t/a$ | $r_t$ [μm] | Alpha 1 | Alpha 2 | Alpha 1 − Alpha 2 | EMBc [MHz·km] | OFL [MHz·km] | $DMD_{outer}$ [ps/m] |
|---|---|---|---|---|---|---|---|---|---|
| 2.2 | 25 | 0.5 | 12.5 | 2.060 | 2.055 | 0.004 | 3031 | 1649 | 0.18 |
| 2.2 | 25 | 0.5 | 12.5 | 2.070 | 2.035 | 0.034 | 3361 | 3089 | 0.17 |
| 2.2 | 25 | 0.5 | 12.5 | 2.070 | 2.040 | 0.029 | 3877 | 2656 | 0.15 |
| 2.2 | 25 | 0.5 | 12.5 | 2.070 | 2.045 | 0.024 | 4236 | 2106 | 0.13 |
| 2.2 | 25 | 0.5 | 12.5 | 2.070 | 2.050 | 0.020 | 4048 | 1786 | 0.15 |
| 2.2 | 25 | 0.5 | 12.5 | 2.070 | 2.055 | 0.014 | 3541 | 1478 | 0.19 |
| 2.2 | 25 | 0.5 | 12.5 | 2.080 | 2.025 | 0.055 | 3354 | 2654 | 0.16 |
| 2.2 | 25 | 0.5 | 12.5 | 2.080 | 2.030 | 0.050 | 4344 | 2879 | 0.12 |
| 2.2 | 25 | 0.5 | 12.5 | 2.080 | 2.035 | 0.044 | 5547 | 2679 | 0.09 |
| 2.2 | 25 | 0.5 | 12.5 | 2.080 | 2.040 | 0.040 | 6201 | 2220 | 0.08 |
| 2.2 | 25 | 0.5 | 12.5 | 2.080 | 2.045 | 0.035 | 5646 | 1855 | 0.12 |
| 2.2 | 25 | 0.5 | 12.5 | 2.080 | 2.050 | 0.030 | 4282 | 1550 | 0.16 |
| 2.2 | 25 | 0.5 | 12.5 | 2.080 | 2.055 | 0.024 | 3185 | 1331 | 0.22 |
| 2.2 | 25 | 0.6 | 15 | 2.060 | 2.035 | 0.024 | 3033 | 2817 | 0.19 |
| 2.2 | 25 | 0.6 | 15 | 2.060 | 2.040 | 0.020 | 3144 | 2459 | 0.18 |
| 2.2 | 25 | 0.6 | 15 | 2.060 | 2.045 | 0.015 | 3246 | 2029 | 0.18 |
| 2.2 | 25 | 0.6 | 15 | 2.060 | 2.050 | 0.010 | 3291 | 1806 | 0.17 |
| 2.2 | 25 | 0.6 | 15 | 2.060 | 2.055 | 0.004 | 3069 | 1571 | 0.19 |
| 2.2 | 25 | 0.6 | 15 | 2.070 | 2.010 | 0.060 | 3536 | 2350 | 0.22 |
| 2.2 | 25 | 0.6 | 15 | 2.070 | 2.015 | 0.054 | 4245 | 2592 | 0.17 |
| 2.2 | 25 | 0.6 | 15 | 2.070 | 2.020 | 0.049 | 5166 | 2779 | 0.13 |
| 2.2 | 25 | 0.6 | 15 | 2.070 | 2.025 | 0.044 | 5909 | 2703 | 0.10 |
| 2.2 | 25 | 0.6 | 15 | 2.070 | 2.030 | 0.040 | 6291 | 2500 | 0.09 |
| 2.2 | 25 | 0.6 | 15 | 2.070 | 2.035 | 0.034 | 5950 | 2096 | 0.09 |
| 2.2 | 25 | 0.6 | 15 | 2.070 | 2.040 | 0.029 | 5150 | 1863 | 0.11 |
| 2.2 | 25 | 0.6 | 15 | 2.070 | 2.045 | 0.024 | 4357 | 1653 | 0.15 |
| 2.2 | 25 | 0.6 | 15 | 2.070 | 2.050 | 0.020 | 3630 | 1447 | 0.19 |
| 2.2 | 25 | 0.6 | 15 | 2.070 | 2.055 | 0.014 | 3053 | 1311 | 0.23 |
| 2.2 | 25 | 0.6 | 15 | 2.080 | 1.990 | 0.090 | 3004 | 1437 | 0.29 |
| 2.2 | 25 | 0.6 | 15 | 2.080 | 1.995 | 0.085 | 3578 | 1587 | 0.29 |
| 2.2 | 25 | 0.6 | 15 | 2.080 | 2.000 | 0.080 | 4417 | 1754 | 0.23 |
| 2.2 | 25 | 0.6 | 15 | 2.080 | 2.005 | 0.075 | 5555 | 1967 | 0.16 |

TABLE 2-continued

| Delta [%] | a [μm] | $r_t/a$ | $r_t$ [μm] | Alpha 1 | Alpha 2 | Alpha 1 − Alpha 2 | EMBc [MHz·km] | OFL [MHz·km] | $DMD_{outer}$ [ps/m] |
|---|---|---|---|---|---|---|---|---|---|
| 2.2 | 25 | 0.6 | 15 | 2.080 | 2.010 | 0.070 | 7062 | 2135 | 0.09 |
| 2.2 | 25 | 0.6 | 15 | 2.080 | 2.015 | 0.064 | 8811 | 2174 | 0.05 |
| 2.2 | 25 | 0.6 | 15 | 2.080 | 2.020 | 0.060 | 8967 | 2038 | 0.04 |
| 2.2 | 25 | 0.6 | 15 | 2.080 | 2.025 | 0.055 | 6891 | 1888 | 0.07 |
| 2.2 | 25 | 0.6 | 15 | 2.080 | 2.030 | 0.050 | 5154 | 1756 | 0.11 |
| 2.2 | 25 | 0.6 | 15 | 2.080 | 2.035 | 0.044 | 4094 | 1594 | 0.14 |
| 2.2 | 25 | 0.6 | 15 | 2.080 | 2.040 | 0.040 | 3332 | 1421 | 0.18 |
| 2.2 | 25 | 0.7 | 17.5 | 2.060 | 1.980 | 0.080 | 3005 | 2070 | 0.38 |
| 2.2 | 25 | 0.7 | 17.5 | 2.060 | 1.985 | 0.075 | 3192 | 2215 | 0.34 |
| 2.2 | 25 | 0.7 | 17.5 | 2.060 | 1.990 | 0.070 | 3305 | 2357 | 0.27 |
| 2.2 | 25 | 0.7 | 17.5 | 2.060 | 1.995 | 0.064 | 3341 | 2517 | 0.26 |
| 2.2 | 25 | 0.7 | 17.5 | 2.060 | 2.000 | 0.060 | 3371 | 2686 | 0.23 |
| 2.2 | 25 | 0.7 | 17.5 | 2.060 | 2.005 | 0.055 | 3400 | 2783 | 0.20 |
| 2.2 | 25 | 0.7 | 17.5 | 2.060 | 2.010 | 0.050 | 3427 | 2765 | 0.17 |
| 2.2 | 25 | 0.7 | 17.5 | 2.060 | 2.015 | 0.044 | 3449 | 2650 | 0.17 |
| 2.2 | 25 | 0.7 | 17.5 | 2.060 | 2.020 | 0.040 | 3456 | 2533 | 0.17 |
| 2.2 | 25 | 0.7 | 17.5 | 2.060 | 2.025 | 0.035 | 3464 | 2380 | 0.17 |
| 2.2 | 25 | 0.7 | 17.5 | 2.060 | 2.030 | 0.030 | 3467 | 2118 | 0.17 |
| 2.2 | 25 | 0.7 | 17.5 | 2.060 | 2.035 | 0.024 | 3464 | 1957 | 0.17 |
| 2.2 | 25 | 0.7 | 17.5 | 2.060 | 2.040 | 0.020 | 3460 | 1844 | 0.17 |
| 2.2 | 25 | 0.7 | 17.5 | 2.060 | 2.045 | 0.015 | 3333 | 1730 | 0.17 |
| 2.2 | 25 | 0.7 | 17.5 | 2.060 | 2.050 | 0.010 | 3153 | 1599 | 0.18 |
| 2.2 | 25 | 0.7 | 17.5 | 2.070 | 1.925 | 0.145 | 3098 | 931 | 0.53 |
| 2.2 | 25 | 0.7 | 17.5 | 2.070 | 1.930 | 0.140 | 3269 | 994 | 0.48 |
| 2.2 | 25 | 0.7 | 17.5 | 2.070 | 1.935 | 0.135 | 3447 | 1076 | 0.51 |
| 2.2 | 25 | 0.7 | 17.5 | 2.070 | 1.940 | 0.130 | 3639 | 1171 | 0.48 |
| 2.2 | 25 | 0.7 | 17.5 | 2.070 | 1.945 | 0.125 | 3843 | 1257 | 0.45 |
| 2.2 | 25 | 0.7 | 17.5 | 2.070 | 1.950 | 0.120 | 4077 | 1338 | 0.42 |
| 2.2 | 25 | 0.7 | 17.5 | 2.070 | 1.955 | 0.115 | 4344 | 1416 | 0.39 |
| 2.2 | 25 | 0.7 | 17.5 | 2.070 | 1.960 | 0.110 | 4649 | 1492 | 0.35 |
| 2.2 | 25 | 0.7 | 17.5 | 2.070 | 1.965 | 0.105 | 5008 | 1573 | 0.29 |
| 2.2 | 25 | 0.7 | 17.5 | 2.070 | 1.970 | 0.099 | 5352 | 1657 | 0.25 |
| 2.2 | 25 | 0.7 | 17.5 | 2.070 | 1.975 | 0.094 | 5704 | 1749 | 0.27 |
| 2.2 | 25 | 0.7 | 17.5 | 2.070 | 1.980 | 0.089 | 6055 | 1841 | 0.23 |
| 2.2 | 25 | 0.7 | 17.5 | 2.070 | 1.985 | 0.084 | 6331 | 1913 | 0.19 |
| 2.2 | 25 | 0.7 | 17.5 | 2.070 | 1.990 | 0.079 | 6417 | 1942 | 0.15 |
| 2.2 | 25 | 0.7 | 17.5 | 2.070 | 1.995 | 0.074 | 6090 | 1922 | 0.09 |
| 2.2 | 25 | 0.7 | 17.5 | 2.070 | 2.000 | 0.069 | 5652 | 1879 | 0.09 |
| 2.2 | 25 | 0.7 | 17.5 | 2.070 | 2.005 | 0.064 | 5210 | 1830 | 0.09 |
| 2.2 | 25 | 0.7 | 17.5 | 2.070 | 2.010 | 0.060 | 4697 | 1779 | 0.10 |
| 2.2 | 25 | 0.7 | 17.5 | 2.070 | 2.015 | 0.054 | 4301 | 1720 | 0.12 |
| 2.2 | 25 | 0.7 | 17.5 | 2.070 | 2.020 | 0.049 | 3929 | 1649 | 0.13 |
| 2.2 | 25 | 0.7 | 17.5 | 2.070 | 2.025 | 0.044 | 3592 | 1560 | 0.15 |
| 2.2 | 25 | 0.7 | 17.5 | 2.070 | 2.030 | 0.040 | 3303 | 1465 | 0.17 |
| 2.2 | 25 | 0.7 | 17.5 | 2.070 | 2.035 | 0.034 | 3062 | 1386 | 0.19 |
| 2.2 | 25 | 0.7 | 17.5 | 2.080 | 1.925 | 0.155 | 3014 | 929 | 0.48 |
| 2.2 | 25 | 0.7 | 17.5 | 2.080 | 1.930 | 0.150 | 3109 | 973 | 0.45 |
| 2.2 | 25 | 0.7 | 17.5 | 2.080 | 1.935 | 0.145 | 3193 | 1022 | 0.42 |
| 2.2 | 25 | 0.7 | 17.5 | 2.080 | 1.940 | 0.140 | 3279 | 1075 | 0.38 |
| 2.2 | 25 | 0.7 | 17.5 | 2.080 | 1.945 | 0.135 | 3359 | 1133 | 0.32 |
| 2.2 | 25 | 0.7 | 17.5 | 2.080 | 1.950 | 0.130 | 3420 | 1189 | 0.36 |
| 2.2 | 25 | 0.7 | 17.5 | 2.080 | 1.955 | 0.125 | 3462 | 1242 | 0.33 |
| 2.2 | 25 | 0.7 | 17.5 | 2.080 | 1.960 | 0.120 | 3481 | 1288 | 0.30 |
| 2.2 | 25 | 0.7 | 17.5 | 2.080 | 1.965 | 0.115 | 3475 | 1327 | 0.27 |
| 2.2 | 25 | 0.7 | 17.5 | 2.080 | 1.970 | 0.110 | 3435 | 1353 | 0.19 |
| 2.2 | 25 | 0.7 | 17.5 | 2.080 | 1.975 | 0.105 | 3367 | 1370 | 0.16 |
| 2.2 | 25 | 0.7 | 17.5 | 2.080 | 1.980 | 0.100 | 3281 | 1376 | 0.16 |
| 2.2 | 25 | 0.7 | 17.5 | 2.080 | 1.985 | 0.095 | 3141 | 1369 | 0.15 |
| 2.2 | 25 | 0.8 | 20 | 2.060 | 1.900 | 0.160 | 3492 | 1809 | 0.33 |
| 2.2 | 25 | 0.8 | 20 | 2.060 | 1.905 | 0.155 | 3490 | 1827 | 0.32 |
| 2.2 | 25 | 0.8 | 20 | 2.060 | 1.910 | 0.150 | 3488 | 1843 | 0.30 |
| 2.2 | 25 | 0.8 | 20 | 2.060 | 1.915 | 0.145 | 3488 | 1857 | 0.29 |
| 2.2 | 25 | 0.8 | 20 | 2.060 | 1.920 | 0.140 | 3488 | 1867 | 0.26 |
| 2.2 | 25 | 0.8 | 20 | 2.060 | 1.925 | 0.135 | 3485 | 1872 | 0.21 |
| 2.2 | 25 | 0.8 | 20 | 2.060 | 1.930 | 0.130 | 3483 | 1875 | 0.20 |
| 2.2 | 25 | 0.8 | 20 | 2.060 | 1.935 | 0.125 | 3478 | 1872 | 0.23 |
| 2.2 | 25 | 0.8 | 20 | 2.060 | 1.940 | 0.120 | 3478 | 1865 | 0.23 |
| 2.2 | 25 | 0.8 | 20 | 2.060 | 1.945 | 0.115 | 3476 | 1857 | 0.21 |
| 2.2 | 25 | 0.8 | 20 | 2.060 | 1.950 | 0.110 | 3472 | 1846 | 0.19 |
| 2.2 | 25 | 0.8 | 20 | 2.060 | 1.955 | 0.105 | 3470 | 1834 | 0.17 |
| 2.2 | 25 | 0.8 | 20 | 2.060 | 1.960 | 0.100 | 3467 | 1822 | 0.17 |
| 2.2 | 25 | 0.8 | 20 | 2.060 | 1.965 | 0.095 | 3464 | 1810 | 0.17 |
| 2.2 | 25 | 0.8 | 20 | 2.060 | 1.970 | 0.090 | 3460 | 1799 | 0.17 |
| 2.2 | 25 | 0.8 | 20 | 2.060 | 1.975 | 0.085 | 3458 | 1786 | 0.17 |
| 2.2 | 25 | 0.8 | 20 | 2.060 | 1.980 | 0.080 | 3459 | 1775 | 0.17 |
| 2.2 | 25 | 0.8 | 20 | 2.060 | 1.985 | 0.075 | 3456 | 1761 | 0.17 |
| 2.2 | 25 | 0.8 | 20 | 2.060 | 1.990 | 0.070 | 3439 | 1748 | 0.17 |

TABLE 2-continued

| Delta [%] | a [µm] | $r_t$/a | $r_t$ [µm] | Alpha 1 | Alpha 2 | Alpha 1 – Alpha 2 | EMBc [MHz·km] | OFL [MHz·km] | $DMD_{outer}$ [ps/m] |
|---|---|---|---|---|---|---|---|---|---|
| 2.2 | 25 | 0.8 | 20 | 2.060 | 1.995 | 0.064 | 3397 | 1732 | 0.17 |
| 2.2 | 25 | 0.8 | 20 | 2.060 | 2.000 | 0.060 | 3355 | 1715 | 0.17 |
| 2.2 | 25 | 0.8 | 20 | 2.060 | 2.005 | 0.055 | 3303 | 1696 | 0.17 |
| 2.2 | 25 | 0.8 | 20 | 2.060 | 2.010 | 0.050 | 3259 | 1674 | 0.17 |
| 2.2 | 25 | 0.8 | 20 | 2.060 | 2.015 | 0.044 | 3210 | 1649 | 0.17 |
| 2.2 | 25 | 0.8 | 20 | 2.060 | 2.020 | 0.040 | 3165 | 1622 | 0.17 |
| 2.2 | 25 | 0.8 | 20 | 2.060 | 2.025 | 0.035 | 3121 | 1591 | 0.17 |
| 2.2 | 25 | 0.8 | 20 | 2.060 | 2.030 | 0.030 | 3074 | 1558 | 0.18 |
| 2.2 | 25 | 0.8 | 20 | 2.060 | 2.035 | 0.024 | 3030 | 1526 | 0.19 |
| 2.2 | 40 | 0.55 | 22 | 2.08 | 2.02 | 0.06 | 5070 | 1649 | 0.18 |
| 2.2 | 40 | 0.55 | 22 | 2.08 | 2.02 | 0.06 | 5066 | 3089 | 0.17 |
| 2.2 | 40 | 0.55 | 22 | 2.08 | 2.02 | 0.06 | 5066 | 2656 | 0.15 |
| 2.2 | 40 | 0.55 | 22 | 2.08 | 2.02 | 0.06 | 5155 | 2106 | 0.13 |
| 2.2 | 40 | 0.55 | 22 | 2.08 | 2.02 | 0.06 | 5152 | 1786 | 0.15 |
| 2.2 | 40 | 0.55 | 22 | 2.08 | 2.02 | 0.06 | 5154 | 1478 | 0.19 |
| 2.2 | 40 | 0.55 | 22 | 2.08 | 2.02 | 0.06 | 5031 | 2654 | 0.16 |
| 2 | 31.25 | 0.5 | 15.625 | 2.07 | 2.035 | 0.035 | 3752 | 3660 | 0.17 |
| 2 | 31.25 | 0.5 | 15.625 | 2.07 | 2.04 | 0.03 | 3711 | 3414 | 0.14 |
| 2 | 31.25 | 0.5 | 15.625 | 2.08 | 2.03 | 0.05 | 4094 | 3347 | 0.12 |
| 2 | 31.25 | 0.5 | 15.625 | 2.08 | 2.035 | 0.045 | 3867 | 3370 | 0.09 |
| 2 | 31.25 | 0.6 | 18.75 | 2.07 | 2.015 | 0.055 | 3521 | 2937 | 0.19 |
| 2 | 31.25 | 0.6 | 18.75 | 2.07 | 2.02 | 0.05 | 4079 | 3288 | 0.15 |
| 2 | 31.25 | 0.6 | 18.75 | 2.07 | 2.025 | 0.045 | 5373 | 3439 | 0.11 |
| 2 | 31.25 | 0.6 | 18.75 | 2.07 | 2.03 | 0.04 | 4020 | 3271 | 0.09 |
| 2 | 31.25 | 0.6 | 18.75 | 2.07 | 2.035 | 0.035 | 3686 | 2857 | 0.08 |
| 2 | 31.25 | 0.6 | 18.75 | 2.08 | 2.02 | 0.06 | 3739 | 2619 | 0.04 |
| 2 | 31.25 | 0.6 | 18.75 | 2.08 | 2.025 | 0.055 | 3785 | 2476 | 0.04 |
| 2 | 31.25 | 0.6 | 18.75 | 2.08 | 2.03 | 0.05 | 3577 | 2275 | 0.07 |
| 2 | 31.25 | 0.7 | 21.875 | 2.06 | 2.02 | 0.04 | 3501 | 3455 | 0.15 |
| 2 | 31.25 | 0.7 | 21.875 | 2.06 | 2.025 | 0.035 | 3502 | 3220 | 0.15 |
| 2 | 31.25 | 0.7 | 21.875 | 2.06 | 2.03 | 0.03 | 3505 | 2932 | 0.15 |
| 2 | 31.25 | 0.7 | 21.875 | 2.07 | 2.005 | 0.065 | 3650 | 2469 | 0.07 |
| 2 | 31.25 | 0.7 | 21.875 | 2.07 | 2.01 | 0.06 | 3796 | 2373 | 0.07 |
| 2 | 31.25 | 0.7 | 21.875 | 2.07 | 2.015 | 0.055 | 3774 | 2266 | 0.08 |
| 2 | 31.25 | 0.7 | 21.875 | 2.07 | 2.02 | 0.05 | 3627 | 2162 | 0.10 |
| 2.2 | 40 | 0.5 | 20 | 2.07 | 2.03 | 0.04 | 3518 | 2855 | 0.20 |
| 2.2 | 40 | 0.5 | 20 | 2.08 | 2.04 | 0.04 | 4511 | 1816 | 0.22 |
| 2.2 | 40 | 0.5 | 20 | 2.08 | 2.03 | 0.05 | 4698 | 2664 | 0.13 |
| 2.2 | 40 | 0.5 | 20 | 2.09 | 2.04 | 0.04 | 3873 | 1583 | 0.24 |
| 2.2 | 40 | 0.5 | 20 | 2.09 | 2.03 | 0.06 | 5230 | 2271 | 0.14 |
| 2.2 | 40 | 0.5 | 20 | 2.09 | 2.02 | 0.06 | 3264 | 2621 | 0.12 |
| 2.2 | 40 | 0.55 | 22 | 2.07 | 2.03 | 0.04 | 5335 | 2635 | 0.14 |
| 2.2 | 40 | 0.55 | 22 | 2.07 | 2.02 | 0.04 | 3770 | 3000 | 0.20 |
| 2.2 | 40 | 0.55 | 22 | 2.08 | 2.04 | 0.04 | 3790 | 1516 | 0.26 |
| 2.2 | 40 | 0.55 | 22 | 2.08 | 2.03 | 0.05 | 6029 | 2121 | 0.15 |
| 2.2 | 40 | 0.55 | 22 | 2.08 | 2.02 | 0.06 | 5067 | 2725 | 0.10 |
| 2.2 | 40 | 0.55 | 22 | 2.09 | 2.03 | 0.06 | 4772 | 1696 | 0.21 |
| 2.2 | 40 | 0.55 | 22 | 2.09 | 2.02 | 0.06 | 5564 | 2186 | 0.10 |
| 2.2 | 40 | 0.55 | 22 | 2.09 | 2.01 | 0.08 | 3661 | 2295 | 0.11 |
| 2.2 | 40 | 0.6 | 24 | 2.07 | 2.03 | 0.04 | 5440 | 2100 | 0.16 |
| 2.2 | 40 | 0.6 | 24 | 2.07 | 2.02 | 0.04 | 5425 | 2844 | 0.12 |
| 2.2 | 40 | 0.6 | 24 | 2.07 | 2.01 | 0.06 | 4612 | 2899 | 0.17 |
| 2.2 | 40 | 0.6 | 24 | 2.08 | 2.03 | 0.05 | 3833 | 1608 | 0.23 |
| 2.2 | 40 | 0.6 | 24 | 2.08 | 2.02 | 0.06 | 6904 | 2080 | 0.13 |
| 2.2 | 40 | 0.6 | 24 | 2.08 | 2.01 | 0.07 | 5798 | 2478 | 0.05 |
| 2.2 | 40 | 0.6 | 24 | 2.08 | 2 | 0.08 | 3763 | 2287 | 0.12 |
| 2.2 | 40 | 0.6 | 24 | 2.09 | 2.02 | 0.06 | 3673 | 1575 | 0.22 |
| 2.2 | 40 | 0.6 | 24 | 2.09 | 2.01 | 0.08 | 4266 | 1877 | 0.13 |
| 2.2 | 40 | 0.6 | 24 | 2.09 | 2 | 0.08 | 4239 | 1988 | 0.09 |
| 2.2 | 40 | 0.65 | 26 | 2.07 | 2.03 | 0.04 | 3681 | 1636 | 0.23 |
| 2.2 | 40 | 0.65 | 26 | 2.07 | 2.02 | 0.04 | 5467 | 2085 | 0.15 |
| 2.2 | 40 | 0.65 | 26 | 2.07 | 2.01 | 0.06 | 5459 | 2659 | 0.09 |
| 2.2 | 40 | 0.65 | 26 | 2.07 | 2 | 0.06 | 5455 | 2864 | 0.12 |
| 2.2 | 40 | 0.65 | 26 | 2.07 | 1.99 | 0.07 | 4165 | 2401 | 0.19 |
| 2.2 | 40 | 0.65 | 26 | 2.08 | 2.01 | 0.07 | 4103 | 1796 | 0.16 |
| 2.2 | 40 | 0.65 | 26 | 2.08 | 2 | 0.08 | 5155 | 2087 | 0.08 |
| 2.2 | 40 | 0.65 | 26 | 2.08 | 1.99 | 0.09 | 4764 | 2151 | 0.08 |
| 2.2 | 40 | 0.65 | 26 | 2.08 | 1.98 | 0.1 | 3468 | 1912 | 0.15 |
| 2.2 | 40 | 0.7 | 28 | 2.07 | 2.01 | 0.06 | 3674 | 1796 | 0.18 |
| 2.2 | 40 | 0.7 | 28 | 2.07 | 2 | 0.06 | 4784 | 2114 | 0.12 |
| 2.2 | 40 | 0.7 | 28 | 2.07 | 1.99 | 0.07 | 5465 | 2418 | 0.09 |
| 2.2 | 40 | 0.7 | 28 | 2.07 | 1.98 | 0.08 | 5463 | 2476 | 0.10 |
| 2.2 | 40 | 0.7 | 28 | 2.07 | 1.97 | 0.09 | 4488 | 2229 | 0.15 |
| 2.2 | 40 | 0.7 | 28 | 2.08 | 1.98 | 0.1 | 3058 | 1730 | 0.13 |

The data of Tables 1 and 2 demonstrate that, for high numerical aperture values, the exemplary optical fibers in accordance with the present invention exhibit significantly higher bandwidths than the comparative standard optical fibers.

Moreover, Table 2 demonstrates that exemplary optical fibers having a graded-index profile in accordance with Equation 4 exhibit desirable performance characteristics when (i) the first alpha-value $\alpha_1$ is between 2.05 and 2.1, (ii) the second alpha-value $\alpha_2$ is at least 0.04 less than the first alpha-value $\alpha_1$ (i.e., $\alpha_1 > \alpha_2 + 0.04$), and/or (iii) the normalized transition radius $r_t/a$ is between 0.5 and 0.7.

FIGS. 7-9 graphically depict DMD values as a function of radial position for the comparative optical fibers of Table 1 and the exemplary optical fibers of Table 2.

Figure 7A:
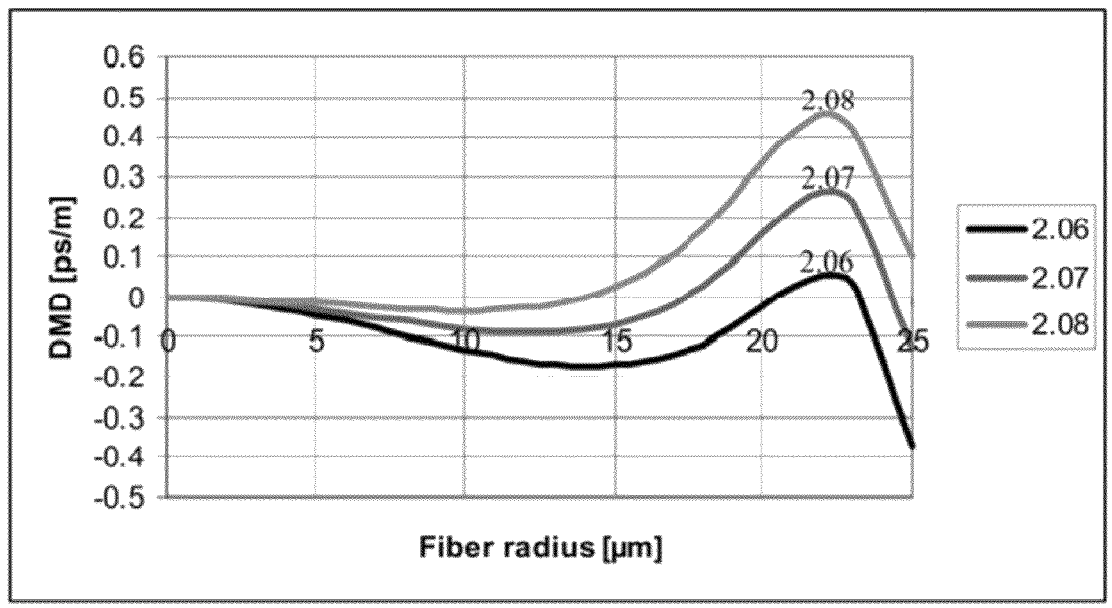
FIGS. 7A and 7B, respectively, graphically depict DMD values as a function of radial position for comparative 50-micron core multimode optical fibers having a graded-index core following Equation 1 and exemplary 50-micron core multimode optical fibers according to the present invention.
Figure 7B:
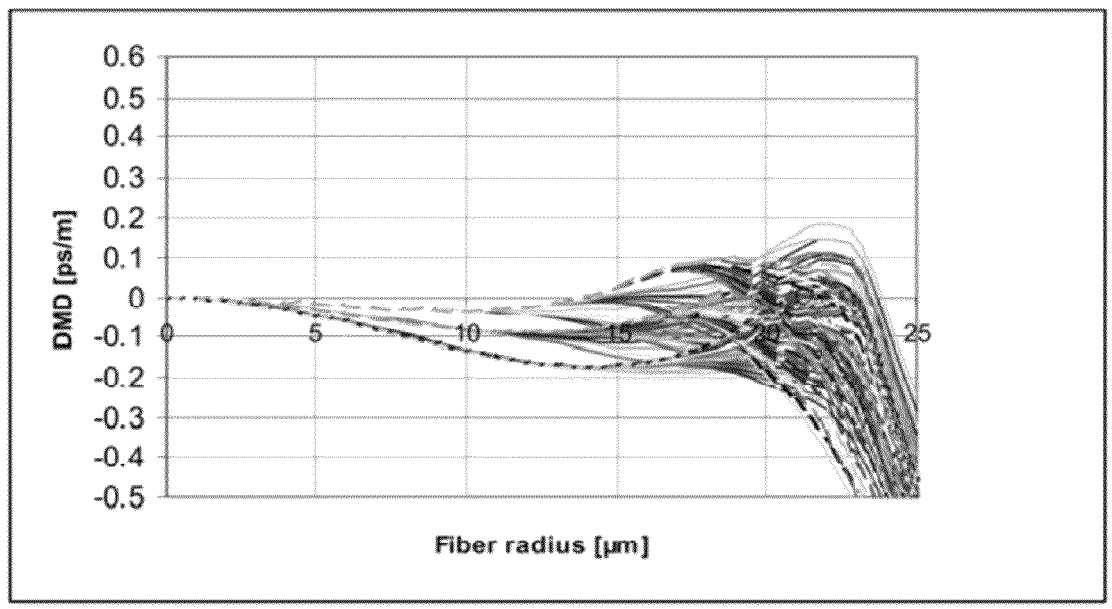
Figure 8A:
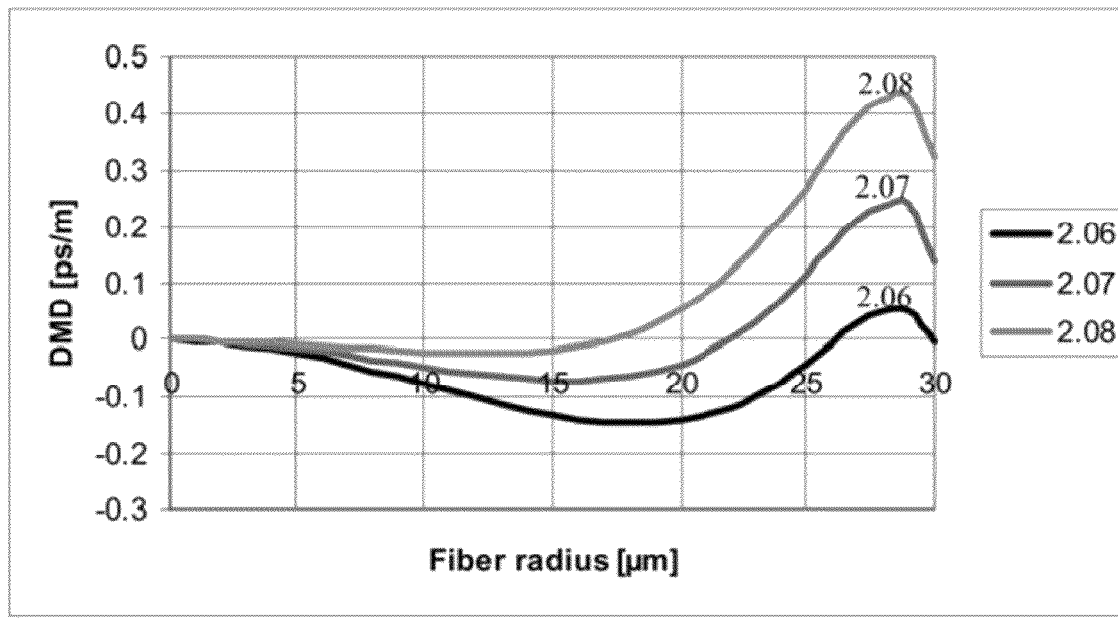
FIGS. 8A and 8B, respectively, graphically depict DMD values as a function of radial position for comparative 62.5-micron core multimode optical fibers having a graded-index core following Equation 1 and exemplary 62.5-micron core multimode optical fibers according to the present invention.

FIGS. 7A and 7B, respectively, graphically depict DMD values as a function of radial position for the comparative 50-micron core multimode optical fibers of Table 1 and the exemplary 50-micron core multimode optical fibers of Table 2. Similarly, FIGS. 8A and 8B, respectively, graphically depict DMD values as a function of radial position for the comparative 62.5-micron core multimode optical fibers of Table 1 and the exemplary 62.5-micron core multimode optical fibers of Table 2. Finally, FIGS. 9A and 9B, respectively, graphically depict DMD values as a function of radial position for the comparative 80-micron core multimode optical fibers of Table 1 and the exemplary 80-micron core multimode optical fibers of Table 2.

Figure 8B:
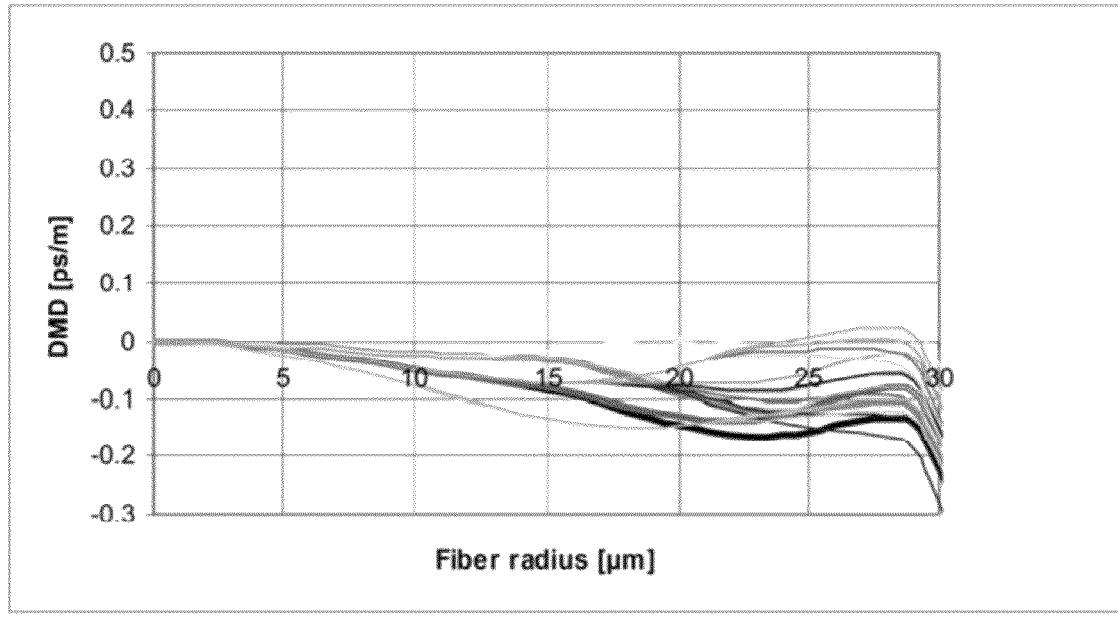
Figure 9A:
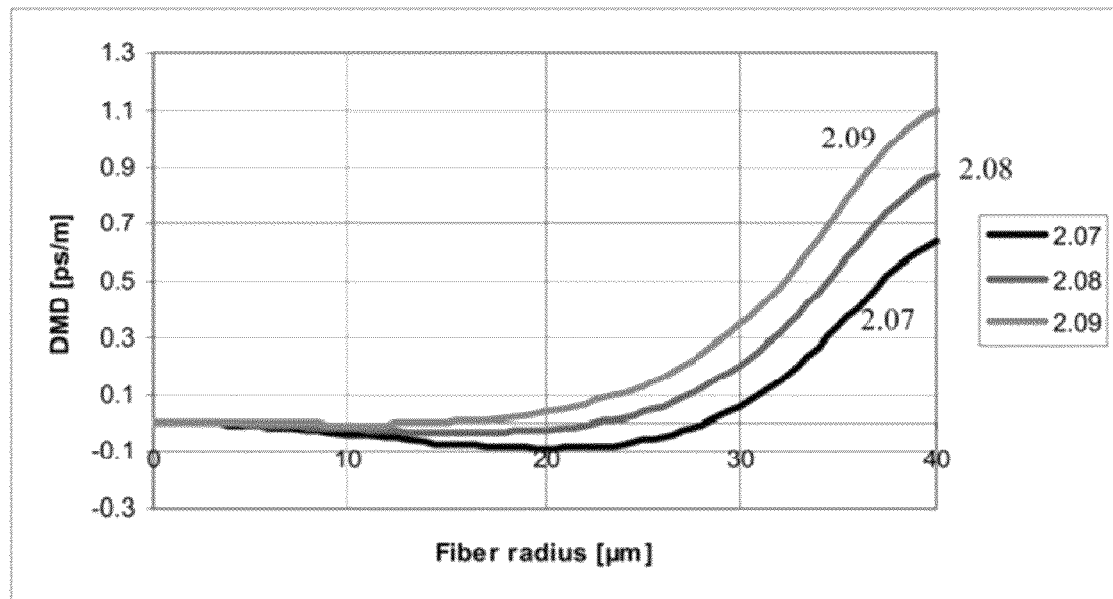
FIGS. 9A and 9B, respectively, graphically depict DMD values as a function of radial position for comparative 80-micron core multimode optical fibers having a graded-index core following Equation 1 and exemplary 80-micron core multimode optical fibers according to the present invention.
Figure 9B:
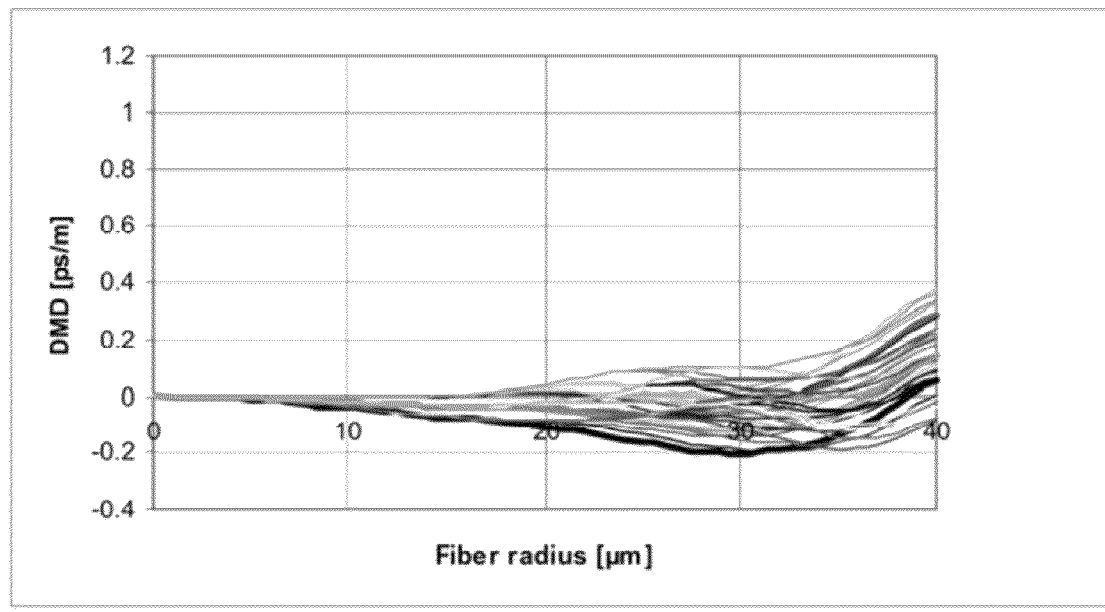

As depicted in FIGS. 7B, 8B, and 9B, the exemplary optical fibers in accordance with the present invention typically exhibit $DMD_{outer}$ values of less than 0.40 ps/m (e.g., even less than 0.14 ps/m). More typically, the exemplary optical fibers exhibit $DMD_{outer}$ values of less than 0.20 ps/m. For those exemplary optical fibers having a $DMD_{outer}$ value that exceeds 0.40 ps/m, the calculated effective modal bandwidth (EMBc) nevertheless remains high.

Indeed, FIGS. 7-9 demonstrate that the slope of plots of DMD as a function of radial position (i.e., the DMD slope) for exemplary optical fibers is much smaller than the DMD slope for comparative optical fibers. Thus, along radial positions within the central core, the differences in DMD remain small, which reduces intermodal dispersion and increases effective modal bandwidth.

Figure 10:
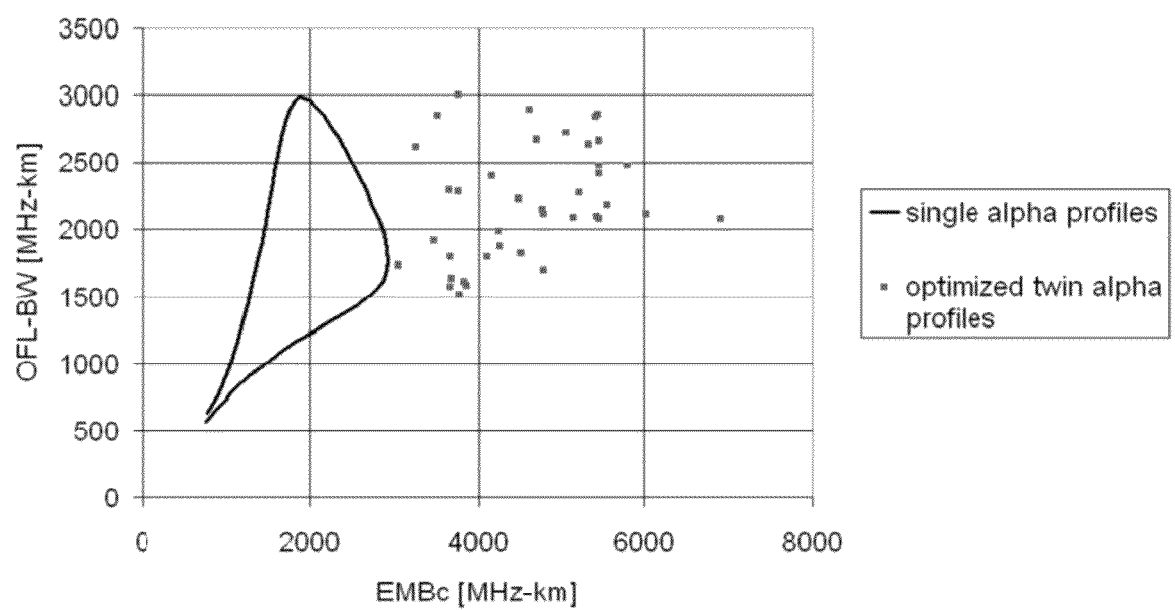
FIG. 10 graphically depicts overfilled launch bandwidth (OFL-BW) values as a function of calculated effective modal bandwidth (EMBc) for exemplary optical fibers according to the present invention.

FIG. 10 graphically depicts overfilled launch bandwidth (OFL-BW) values as a function of calculated effective modal bandwidth (EMBc) for exemplary optical fibers according to the present invention. The exemplary multimode optical fibers of FIG. 10 have large numerical apertures of at least 0.28, typically greater. The plot line labeled "single alpha profiles" shows the values that may be achieved by comparative standard multimode optical fibers with a graded-index profile according to Equation 1 (i.e., a graded-index profile having a single alpha value).

As shown in FIG. 10, the exemplary multimode optical fibers have higher calculated effective modal bandwidth (EMBc) values than the comparative standard multimode optical fibers. In particular embodiments (not shown in FIG. 10, the exemplary multimode optical fibers also have generally higher overfilled launch bandwidth (OFL-BW) values than comparative standard multimode optical fibers.

Notably, Table 2 and FIG. 10 demonstrate that each exemplary multimode optical fiber exhibits a calculated effective modal bandwidth (EMBc) of 1000 MHz·km or greater. For most of the exemplary multimode optical fibers, the calculated effective modal bandwidth (EMBc) is 2000 MHz·km or greater (e.g., 3000 MHz·km or greater).

In view of the exemplary optical fiber's performance characteristics, the exemplary multimode optical fiber may be used in an Ethernet optical system with an improved bandwidth, notably for use in a LAN (Local Area Network).

It should be noted that the present invention is not limited to the exemplary embodiments. For example, a power-law equation different from Equation 4 could be employed for the graded-index profile of the core. In particular, a power-law equation providing (i) an alpha value that diminishes from the inner part to the outer part of the central core and (ii) that the profile n(r) and its first derivative dn(r)/dr are continuous over the entire graded-index core.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (µm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, the primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No.

7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burov et al.); U.S. Pat. No. 8,009,950 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Publication No. US2011/0116160 A1 for a Rare-Earth-Doped Optical Fiber Having Small Numerical Aperture, filed Nov. 11, 2010, (Boivin et al.); U.S. Patent Publication No. US2011/0123161 A1 for a High-Bandwidth, Multimode Optical Fiber with Reduced Cladding Effect, filed Nov. 24, 2010, (Molin et al.); U.S. Patent Publication No. US2011/0123162 A1 for a High-Bandwidth, Dual-Trench-Assisted Multimode Optical Fiber, filed Nov. 24, 2010, (Molin et al.); U.S. Patent Publication No. US2011/0135262 A1 for a Multimode Optical Fiber with Low Bending Losses and Reduced Cladding Effect, filed Dec. 3, 2010, (Molin et al.); U.S. Patent Publication No. US2011/0135263 A1 for a High-Bandwidth Multimode Optical Fiber Having Reduced Bending Losses, filed Dec. 3, 2010, (Molin et al.); U.S. Patent Publication No. US2011/0188826 A1 for a Non-Zero Dispersion Shifted Optical Fiber Having a Large Effective Area, filed Jan. 31, 2011, (Sillard et al.); U.S. Patent Publication No. US2011/0188823 A1 for a Non-Zero Dispersion Shifted Optical Fiber Having a Short Cutoff Wavelength, filed Jan. 31, 2011, (Sillard et al.); U.S. Patent Publication No. 2011/0217012 A1 for a Broad-Bandwidth Multimode Optical Fiber Having Reduced Bending Losses, filed Mar. 1, 2011, (Bigot-Astruc et al.); U.S. Patent Publication No. 2011/0229101 A1 for a Single-Mode Optical Fiber, filed Mar. 15, 2011, (de Montmorillon et al.); U.S. patent application Ser. No. 13/175,181 for a Single-Mode Optical Fiber, filed Jul. 1, 2011, (Bigot-Astruc et al.); U.S. patent application Ser. No. 13/206,943 for a Method of Fabricating an Optical Fiber Preform, filed Aug. 10, 2011, (de Montmorillon et al.); U.S. patent application Ser. No. 13/275,921 for a Multimode Optical Fiber Insensitive to Bending Losses, filed Oct. 18, 2011, (Molin et al.); U.S. patent application Ser. No. 13/303,967 for a Radiation-Insensitive Optical Fiber Doped with Rare Earths, filed Nov. 23, 2011, (Burov et al.); and U.S. patent application Ser. No. 13/315,712 for a Rare-Earth-Doped Optical Fiber, filed Dec. 9, 2011, (Boivin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Lovie et al.); U.S. Pat. No. 7,970,247 for a Buffer Tubes for Mid-Span Storage (Barker); U.S. Pat. No. 8,081,853 for Single-Fiber Drop Cables for MDU Deployments, filed Nov. 9, 2009, (Overton); U.S. Pat. No. 8,041,167 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Pat. No. 8,041,168 for Reduced-Diameter Ribbon Cables with High-Performance Optical Fiber, filed Nov. 10, 2009, (Overton); U.S. Pat. No. 8,031,997 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. Patent Publication No. 2011/0176782 A1 for a Water-Soluble Water-Blocking Element, filed Jan. 19, 2011, (Parris); U.S. Patent Publication No. 2011/0268400 A1 for a Data-Center Cable, filed Apr. 28, 2011, (Lovie et al.); U.S. Patent Publication No. 2011/0268398 A1 for a Bundled Fiber Optic Cables, filed May 3, 2011, (Quinn et al.); U.S. Patent Publication No. 2011/0287195 A1 for a Curing Apparatus Employing Angled UVLEDs, filed May 19, 2011, (Molin); U.S. patent application Ser. No. 13/116,141 for a Low-Smoke and Flame-Retardant Fiber Optic Cables, filed May 26, 2011, (Lovie et al.); U.S. Patent Publication No. 2012/0009358 for a Curing Apparatus Having UV Sources That Emit Differing Ranges of UV Radiation, filed Jun. 3, 2011, (Gharbi et al.); U.S. Patent Publication No. 2012/0014652 A1 for a Adhesively Coupled Optical Fibers and Enclosing Tape, filed Jul. 13, 2011, (Parris); U.S. patent application Ser. No. 13/206,601 for a Method and Apparatus Providing Increased UVLED Intensity, filed Aug. 10, 2011, (Overton); U.S. patent application Ser. No. 13/222,329 for an Optical-Fiber Module Having Improved Accessibility, filed Aug. 31, 2011, (Tatat); and U.S. patent application Ser. No. 13/310,299 for a Buffer Tubes Having Reduced Stress Whitening, filed Dec. 2, 2010, (Risch).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
  a central core surrounded by an outer optical cladding, said central core having (i) an outer radius a, (ii) a transition radius $r_t$ that is less than the outer radius a, (iii) a maximum refractive index $n_0$, (iv) a minimum refractive index $n_{c1}$, and (v) a graded-index profile $n(r)$ that is a function of the radial distance r from the center of said central core;

wherein said central core's graded-index profile $n(r)$ is defined by the following equation:

$$n(r) = n_0 \sqrt{1 - 2\Delta\left(\frac{r}{a}\right)^{\alpha(r)}}$$

where:

$$\Delta = \frac{(n_0^2 - n_{cl}^2)}{2n_0^2}$$

wherein $\Delta$ is about 1.9 percent or greater;

wherein the alpha parameter $\alpha(r)$ is a function of the radial distance r from the center of said central core, said alpha parameter $\alpha(r)$ having two or more different values along radial positions from said central core's center to said central core's outer radius a;

wherein, for a radial position less than said central core's transition radius $r_t$, the alpha parameter $\alpha(r)$ has a first alpha-value $\alpha_1$;

wherein, for a radial position greater than said central core's transition radius $r_t$, the alpha parameter $\alpha(r)$ has a second alpha-value $\alpha_2$;

wherein the first alpha-value $\alpha_1$ is greater than the second alpha-value $\alpha_2$; and wherein said central core's graded-index profile $n(r)$ and the graded-index profile's first derivative $dn(r)/dr$ are substantially continuous along radial positions from said central core's center to said central core's outer radius a.

2. The multimode optical fiber according to claim 1, wherein, at a wavelength of 850 nanometers, the multimode optical fiber has an effective modal bandwidth (EMB) of about 1000 MHz·km or greater.

3. The multimode optical fiber according to claim 1, wherein, at a wavelength of 850 nanometers, the multimode optical fiber has an effective modal bandwidth (EMB) of about 3000 MHz·km or greater.

4. The multimode optical fiber according to claim 1, wherein, at a wavelength of 850 nanometers, the multimode optical fiber has an overfilled launch bandwidth (OFL-BW) of about 1000 MHz·km or greater.

5. The multimode optical fiber according to claim 1, wherein, at a wavelength of 850 nanometers, the multimode optical fiber has an overfilled launch bandwidth (OFL-BW) of about 3000 MHz·km or greater.

6. The multimode optical fiber according to claim 1, wherein said central core's graded-index profile $n(r)$ is defined by the following power equation:

$$n(r) = \begin{cases} n_1 \cdot \sqrt{1 - 2 \cdot \Delta_1 \cdot \left(\frac{r}{a}\right)^{\alpha_1}} & 0 \leq r \leq r_t \\ n_2 \cdot \sqrt{1 - 2 \cdot \Delta_2 \cdot \left(\frac{r}{a}\right)^{\alpha_2}} & r_t \leq r \leq a \\ n_{cl}(r) & a < r \end{cases}$$

where:

$$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}},$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1},$$

$$n_1 = \frac{n_{cl}}{\sqrt{1 - 2\Delta}}, \text{ and}$$

$$n_2 = n_{cl} \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left[(\alpha_1 - \alpha_2) \cdot \left(\frac{r_t}{a}\right)^{\alpha_2} - \alpha_1\right]}}.$$

7. The multimode optical fiber according to claim 1, wherein the first alpha-value $\alpha_1$ is between about 2.05 and 2.10.

8. The multimode optical fiber according to claim 1, wherein the second alpha-value $\alpha_2$ is at least 0.04 less than the first alpha-value $\alpha_1$ such that $\alpha_1 > \alpha_2 + 0.04$.

9. The multimode optical fiber according to claim 1, wherein the ratio $r_t/a$ of the transition radius $r_t$ to the central core's outer radius a is between about 0.5 and 0.7.

10. The multimode optical fiber according to claim 1, wherein:
said central core has a diameter of about 50 microns; and
at a wavelength of 850 nanometers, the multimode optical fiber has a DMD value on the outer mask 0-23 microns of about 0.40 ps/m or less.

11. The multimode optical fiber according to claim 1, wherein:
said central core has a diameter of about 50 microns; and
at a wavelength of 850 nanometers, the multimode optical fiber has a DMD value on the outer mask 0-23 microns of about 0.14 ps/m or less.

12. The multimode optical fiber according to claim 1, wherein:
said central core has a diameter of about 80 microns; and
at a wavelength of 850 nanometers, the multimode optical fiber has a DMD value on the outer mask 0-37 microns of about 0.40 ps/m or less.

13. The multimode optical fiber according to claim 1, wherein:
said central core has a diameter of about 80 microns; and
at a wavelength of 850 nanometers, the multimode optical fiber has a DMD value on the outer mask 0-37 microns of about 0.20 ps/m or less.

14. The multimode optical fiber according to claim 1, wherein:
said central core has a diameter of about 62.5 microns; and
at a wavelength of 850 nanometers, the multimode optical fiber has a DMD value on the outer mask 0-29 microns of about 0.40 ps/m or less.

15. The multimode optical fiber according to claim 1, wherein:
said central core has a diameter of about 62.5 microns; and
at a wavelength of 850 nanometers, the multimode optical fiber has a DMD value on the outer mask 0-29 microns of about 0.14 ps/m or less.

16. The multimode optical fiber according to claim 1, comprising a depressed trench positioned between said central core and said outer optical cladding.

17. The multimode optical fiber according to claim 1, comprising:
   a step cladding positioned between said central core and said outer optical cladding; and
   a depressed trench positioned between said step cladding and said outer optical cladding.

18. An optical system comprising the multimode optical fiber according to claim 1.

19. The optical system according to claim 18, wherein the optical system is a Local Area Network.

20. A multimode optical fiber, comprising:
   a central core surrounded by an outer optical cladding, said central core having (i) an outer radius a, (ii) a transition radius $r_t$ that is less than the outer radius a, (iii) a maximum refractive index $n_0$, (iv) a minimum refractive index $n_{c1}$, and (v) a graded-index profile n(r) that is a function of the radial distance r from the center of said central core;
   wherein said central core's graded-index profile n(r) has a first alpha-value $\alpha_1$ and a second alpha-value $\alpha_2$;
   wherein the first alpha-value $\alpha_1$ defines said central core's graded-index profile n(r) from said central core's center to said central core's transition radius $r_t$;
   wherein the second alpha-value $\alpha_2$ defines said central core's graded-index profile n(r) from said central core's transition radius $r_t$ to said central core's outer radius a;
   wherein the first alpha-value $\alpha_1$ is greater than the second alpha-value $\alpha_2$; and
   wherein said central core's graded-index profile n(r) and the graded-index profile's first derivative dn(r)/dr are substantially continuous along radial positions from said central core's center to said central core's outer radius a.

21. The multimode optical fiber according to claim 20, comprising a depressed trench positioned between said central core and said outer optical cladding.

22. The multimode optical fiber according to claim 20, wherein, at a wavelength of 850 nanometers, the multimode optical fiber has an effective modal bandwidth (EMB) of about 2000 MHz·km or greater.

23. The multimode optical fiber according to claim 20, wherein, at a wavelength of 850 nanometers, the multimode optical fiber has an overfilled launch bandwidth (OFL-BW) of about 1500 MHz·km or greater.

24. A multimode optical fiber, comprising:
   a central core surrounded by an outer optical cladding, said central core having (i) an outer radius a, (ii) a transition radius $r_t$ that is less than the outer radius a, (iii) a maximum refractive index $n_0$, (iv) a minimum refractive index $n_{c1}$, and (v) a graded-index profile n(r) that is a function of the radial distance r from the center of said central core;
   wherein said central core's graded-index profile n(r) is defined by the following power equation:

$$n(r) = \begin{cases} n_1 \cdot \sqrt{1 - 2 \cdot \Delta_1 \cdot \left(\frac{r}{a}\right)^{\alpha_1}} & 0 \le r \le r_t \\ n_2 \cdot \sqrt{1 - 2 \cdot \Delta_2 \cdot \left(\frac{r}{a}\right)^{\alpha_2}} & r_t \le r \le \alpha \\ n_{cl}(r) & a < r, \end{cases}$$

where:

$$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}},$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1},$$

$$n_1 = \frac{n_{cl}}{\sqrt{1 - 2\Delta}},$$

$$n_2 = n_{cl} \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left((\alpha_1 - \alpha_2) \cdot \left(\frac{r_t}{a}\right)^{\alpha_2} - \alpha_1\right)}};$$

wherein first exponent value $\alpha_1$ defines the graded-index profile for an inner zone within said central core;
wherein second exponent value $\alpha_2$ defines the graded-index profile for an outer zone within said central core;
wherein $\alpha_1 > \alpha_2 + 0.04$;
wherein:

$$1.9 \le \frac{(n_0^2 - n_{cl}^2)}{2n_0^2};$$

and
   wherein said central core's graded-index profile n(r) and the graded-index profile's first derivative dn(r)/dr are substantially continuous along radial positions from said central core's center to said central core's outer radius a.

25. The multimode optical fiber according to claim 24, comprising:
   a step cladding positioned between said central core and said outer optical cladding; and
   a depressed trench positioned between said step cladding and said outer optical cladding.

* * * * *